United States Patent
Takano et al.

(10) Patent No.: US 7,324,702 B2
(45) Date of Patent: Jan. 29, 2008

(54) IMAGE PROCESSING METHOD, IMAGE PROCESSING APPARATUS, IMAGE RECORDING APPARATUS, PROGRAM, AND RECORDING MEDIUM

(75) Inventors: Hiroaki Takano, Hachioji (JP); Tsukasa Ito, Musashino (JP); Chizuko Ikeda, Tokyo (JP)

(73) Assignee: Konica Corporation, Tokyo (JP)

( * ) Notice: Subject to any disclaimer, the term of this patent is extended or adjusted under 35 U.S.C. 154(b) by 892 days.

(21) Appl. No.: 10/647,646

(22) Filed: Aug. 25, 2003

(65) Prior Publication Data

US 2004/0042681 A1    Mar. 4, 2004

(30) Foreign Application Priority Data

Aug. 30, 2002    (JP) .............................. 2002-256068

(51) Int. Cl.
   *B06K 9/40*    (2006.01)
   *G03F 3/08*    (2006.01)
(52) U.S. Cl. ..................... 382/274; 382/169; 358/521
(58) Field of Classification Search ........ 382/167–169, 382/260, 266, 274–275, 305, 312; 358/1.9, 358/518, 521, 532
   See application file for complete search history.

(56) References Cited

U.S. PATENT DOCUMENTS

| | | | | |
|---|---|---|---|---|
| 5,585,927 A | * | 12/1996 | Fukui et al. | ................ 358/518 |
| 5,978,522 A | | 11/1999 | Ishii et al. | |
| 6,313,924 B2 | * | 11/2001 | Kanamori | ................... 358/1.9 |
| 6,701,024 B1 | * | 3/2004 | Sasai | .......................... 382/260 |

FOREIGN PATENT DOCUMENTS

| | | |
|---|---|---|
| EP | 0 901 104 A2 | 3/1999 |
| EP | 1 052 845 A2 | 11/2000 |

* cited by examiner

*Primary Examiner*—Kanjibhai Patel
(74) *Attorney, Agent, or Firm*—Lucas & Mercanti, LLP

(57) ABSTRACT

An image processing method for subjecting captured-image data outputting from an image-capturing device to an optimization processing for appreciation to produce viewing image referred image data. The image processing method has the step of conducting a pre-processing before the optimization processing is carried out, wherein the pre-processing includes the transformation of the frequency characteristic of the captured-image data into the scene-referred frequency characteristic by removing the effect of a frequency characteristic specific to the image-capturing device from the frequency characteristic of the captured-image data.

72 Claims, 19 Drawing Sheets

IMAGE PROCESSING METHOD, IMAGE PROCESSING APPARATUS, IMAGE RECORDING APPARATUS, PROGRAM, AND RECORDING MEDIUM

BACKGROUND OF THE INVENTION

This invention relates to an image processing method to apply an optimization processing to digital image data which have been obtained by an image-capturing device for forming an image for viewing on a recording medium, an image processing apparatus using said image processing method, an image recording apparatus for forming an image for viewing on an output medium using said image processing method, a program for making a computer practice said image processing method, and a recording medium capable of being read by a computer having said program recorded on it.

CONVENTIONAL TECHNOLOGY

Recently, it has been put into practice that digital image data obtained through photographing by an image-capturing device such as a digital camera are displayed and/or printed by various methods. Such digital image data are displayed, for example, on a display monitor such as a CRT (Cathode Ray Tube), a liquid crystal display, and a plasma display and a display device of a small-sized liquid crystal monitor of a cellular phone, or they are printed as a hard copy by an output device such as a digital printer, an ink jet printer, and a thermal printer.

When digital image data are displayed and/or printed for the purpose of appreciation, image processings such as gradation adjustment, luminance adjustment, color balance adjustment, and sharpness enhancement are applied in order that a desired image quality may be obtained in a display monitor image or a hard copy image to be used for appreciation.

Up to now, development of such image processing methods as to be capable of coping with the above-mentioned various kinds of displaying/printing methods has been progressing. For example, it is practiced an attempt to standardize a color space expressed by digital RGB signals into a color space independent of image-capturing device characteristic, and at present, most digital image data adopt sRGB as a standardized color space (refer to "Multimedia Systems and Equipment, Color Measurement and Management, Part 2-1: Color Management, Default RGB Color Space-sRGB" IEC 61966-2-1). The color space of this sRGB is defined in correspondence to the color reproduction domain of a standard CRT display monitor.

Further, generally used digital cameras are equipped with a CCD-type image sensor (hereinafter referred to also as a CCD simply) have a charge transferring function by a CCD (Charge Coupled Device) and a photoelectric conversion function provided with a color sensitivity by the use of a combination of color filters having a checkered pattern.

Digital image data outputted from a digital camera are data which are obtained through the application of image processings such as gradation compensation, cross talk compensation of spectral sensitivity, dark current noise suppression, sharpening, white balance adjustment, and chroma adjustment to original electrical signals converted by a CCD, and are subjected to a file transformation into a data format standardized to be able to be read and displayed by the use of an image edition software, a compression processing, etc.

For such a data format, for example, Baseline Tiff Rev. 6. ORGB Full Color Image adopted as a non-compressed file of an Exif (Exchangeable image format file) file and a compressed data file format based on a JPEG (Joint Photographic Experts Group) format are known.

An Exif file is one based on sRGB. The compensation for the photoelectric conversion function of a CCD is designed in a way to make the image quality become optimum on a display monitor based on sRGB.

Generally speaking, a digital camera of any type, so long as it is equipped with a function to write tag information instructing that colors are displayed in a standard color space of a display monitor based on sRGB signals (hereinafter referred to also as a monitor profile) and supplementary information indicating model-dependent data such as the number of pixels, the pixel arrangement, and the number of bits per pixel as meta-data in the file header of digital image data, can analyze tag information by an image edition software for displaying digital image data on a display monitor, to urge an operator to change the monitor profile into sRGB or automatically apply an altering processing; therefore, the difference between different display devices is reduced, which makes it possible to appreciate an image in its optimum state.

Further, for the supplementary information, in addition to the model-dependent information, it is used a tag (code) indicating, for example, information directly relating to the kind of a camera (model) such as the name of a camera, or the number of code, information determining the photographing conditions such as the exposure time, shutter speed, stop value (f-number), ISO sensitivity, luminance value, object distance range, light source, strobe light emitted or not, object area, white balance, zoom magnification, object structure, photographing scene type, reflection light quantity of the strobe light, and photographing chroma, information relating to the kind of the photographic object, etc. An image edition software and an output device are equipped with a function to read the above-mentioned supplementary information to make the image quality of a hard copy more suitable.

PROBLEM TO BE SOLVED BY THE INVENTION

Incidentally, an image displayed on a display device such as a CRT display monitor, or a hard copy image printed by various kinds of print device has different color reproduction domain depending on the composition of the fluorescent substance or the coloring material used. For example, the color reproduction domain of a CRT display monitor corresponding to the sRGB standard color space has a broad light green and blue domain, and there is a portion not to be reproduced by a hard copy of a silver halide print or an ink jet print in said color reproduction domain. On the contrary, in the cyan domain of an ink jet print or in the yellow domain of a silver halide print, there is a portion not to be reproduced by a CRT display monitor corresponding to the sRGB standard color space (refer to, for example, "Fine Imaging and Digital photography" p. 444, edited by the publishing committee of The Society of Photographic Science and Technology of Japan, published by Corona publishing Co., Ltd.).

Further, between a display using an additive color mixing method and a printer using a subtractive color mixing method, there is a difference in the domain regarded as important for tone reproduction, and a difference is produced in the expression of shadow between prints. For this reason, in the case where an image recorded in the sRGB standard color space is to be printed, it is practiced a processing in which mapping is done again on the basis of the difference in the color gamut and luminance range between both.

However, even if digital cameras are based on sRGB, gradation characteristic, design of color reproduction space, or frequency response characteristic depending on the difference in the number of pixels or the setting is different from one model to another of the digital cameras of different makers or of different models even though made by the same maker; this has been prevented that hard copies printed by various kinds of print device reproduce a high quality image stably.

In the publications of the unexamined patent applications 2002-16807 and 2002-16821, it is described a method in which a model gradation reproduction characteristic curve for absorbing the model gradation reproduction characteristic (a model gradation characteristic) which is different for each model of digital cameras is produced for each model of digital cameras independently of other gradation compensation (compensation) curves, and the influence due to the gradation characteristic specific to the model of digital cameras is removed by a transformation using this model gradation reproduction characteristic curve, which gives a high-quality processed image.

This method is characterized by it that the AE (automatic exposure control) and AWB (automatic white balance adjustment) of a printer are carried out, after a pre-processing for absorbing the model gradation reproduction characteristic of a digital camera is carried out by the use of a model gradation reproduction characteristic profile.

However, by the experiment of the inventors of this invention on image processing using the above-mentioned method for a large number of images, it has been found that there is a problem that an error of white balance adjustment tends to occur in a close-up photograph of a person wearing red or green clothes, a photograph with a lawn, woods, or the like as the background, a close-up photograph of a flower, or the like.

In view of the above-mentioned situation, it is an object of this invention to provide an image processing method to achieve the improvement of quality by eliminating the dispersion of quality produced for each image-capturing device from an image for viewing formed on an output medium by the use of captured-image data and enhancing the stability, an image processing apparatus using said image processing method, an image recording apparatus for forming an image for viewing on an output medium using said image processing method, a program for making a computer practice said image processing method, and a recording medium capable of being read by a computer having said program recorded on

SUMMARY OF THE INVENTION

The above-mentioned problem can be solved by any one of the following features of this invention.

(1) An image processing method in which captured-image data outputted from an image-capturing device is subjected to an optimization processing for appreciation to produce viewing image referred image data, characterized by it that,
before said optimization processing is carried out, a pre-processing to transform the frequency characteristic of said captured-image data into the scene-referred frequency characteristic by removing the effect of the frequency characteristic specific to said image-capturing device from the frequency characteristic of said captured-image data (by dividing the frequency characteristic of said captured-image data by the frequency response characteristic specific to said image-capturing device) is carried out.

(2) An image processing method in which captured-image data outputted from an image-capturing device is subjected to an optimization processing for appreciation to produce viewing image referred image data, characterized by it that,
before said optimization processing is carried out, a pre-processing to transform the frequency characteristic of said captured-image data into the scene-referred frequency characteristic by removing the model frequency characteristic specific to said image-capturing device from the frequency characteristic of said captured-image data (by dividing the frequency characteristic of said captured-image data by the model frequency response characteristic specific to said image-capturing device) is carried out.

(3) An image processing method in which captured-image data outputted from an image-capturing device is subjected to an optimization processing for appreciation to produce viewing image referred image data, characterized by it that,
before said optimization processing is carried out, a pre-processing in which the frequency characteristic of said captured-image data is transformed into the scene-referred frequency characteristic by removing the frequency characteristic specific to said image-capturing device from the frequency characteristic of said captured-image data (by dividing the frequency characteristic of said captured-image data by the frequency response characteristic specific to said image-capturing device) and the gradation characteristic of said captured-image data is transformed into the scene-referred gradation characteristic by removing the effect of the gradation characteristic specific to said image-capturing device from the gradation characteristic of said captured-image data is carried out.

(4) An image processing method in which captured-image data outputted from an image-capturing device is subjected to an optimization processing for appreciation to produce viewing image referred image data, characterized by it that,
before said optimization processing is carried out, a pre-processing in which the frequency characteristic of said captured-image data is transformed into the scene-referred frequency characteristic by removing the model frequency characteristic specific to said image-capturing device from the frequency characteristic of said captured-image data (by dividing the frequency characteristic of said captured-image data by the model frequency response characteristic specific to said image-capturing device) and the gradation characteristic of said captured-image data is transformed into the scene-referred gradation characteristic by removing the effect of the gradation characteristic specific to said image-capturing device from the gradation characteristic of said captured-image data is carried out.

(5) An image processing method in which captured-image data outputted from an image-capturing device is subjected to an optimization processing for appreciation to produce viewing image referred image data, characterized by it that,
before said optimization processing is carried out, a pre-processing in which the frequency characteristic of said captured-image data is transformed into the scene-referred frequency characteristic by removing the frequency characteristic specific to said image-capturing device from the frequency characteristic of said captured-image data (by dividing the frequency characteristic of said captured-image data by the frequency response characteristic specific to said image-capturing device) and the gradation characteristic of said captured-image data is transformed into the scene-referred gradation characteristic by removing the effect of the model gradation characteristic specific to said image-capturing device from the gradation characteristic of said captured-image data is carried out.

(6) An image processing method in which captured-image data outputted from an image-capturing device is subjected to an optimization processing for appreciation to produce viewing image referred image data, characterized by it that,
before said optimization processing is carried out, a pre-processing in which the frequency characteristic of said captured-image data is transformed into the scene-referred frequency characteristic by removing the model frequency characteristic specific to said image-capturing device from the frequency characteristic of said captured-image data (by dividing the frequency characteristic of said captured-image data by the frequency response characteristic specific to said image-capturing device) and the gradation characteristic of said captured-image data is transformed into the scene-referred gradation characteristic by removing the effect of the model gradation characteristic specific to said image-capturing device from the gradation characteristic of said captured-image data is carried out.

(7) An image processing method in which captured-image data outputted from an image-capturing device is subjected to an optimization processing for appreciation to produce viewing image referred image data, characterized by it that,
before said optimization processing is carried out, on the basis of condition data for carrying out a pre-processing to transform the frequency characteristic of said captured-image data into the scene-referred frequency characteristic by removing the frequency characteristic specific to said image-capturing device from the frequency characteristic of said captured-image data (by dividing the frequency characteristic of said captured-image data by the frequency response characteristic specific to said image-capturing device) and condition data for carrying out said optimization processing, condition data for outputting said captured-image data to an output medium are generated.

(8) An image processing method in which captured-image data outputted from an image-capturing device is subjected to an optimization processing for appreciation to produce viewing image referred image data, characterized by it that,
before said optimization processing is carried out, on the basis of condition data for carrying out a pre-processing to transform the frequency characteristic of said captured-image data into the scene-referred frequency characteristic by removing the model frequency characteristic specific to said image-capturing device from the frequency characteristic of said captured-image data (by dividing the frequency characteristic of said captured-image data by the model frequency response characteristic specific to said image-capturing device), and condition data for carrying out said optimization processing, condition data for outputting said captured-image data to an output medium are generated.

(9) An image processing method in which captured-image data outputted from an image-capturing device is subjected to an optimization processing for appreciation to produce viewing image referred image data, characterized by it that,
before said optimization processing is carried out, on the basis of condition data for carrying out a pre-processing in which the frequency characteristic of said captured-image data is transformed into the scene-referred frequency characteristic by removing the frequency characteristic specific to said image-capturing device from the frequency characteristic of said captured-image data (by dividing the frequency characteristic of said captured-image data by the frequency response characteristic specific to said image-capturing device) and the gradation characteristic of said captured-image data is transformed into the scene-referred gradation characteristic by removing the effect of the gradation characteristic specific to said image-capturing device from the gradation characteristic of said captured-image data is carried out, and condition data for carrying out said optimization processing, condition data for outputting said captured-image data to an output medium are generated.

(10) An image processing method in which captured-image data outputted from an image-capturing device is subjected to an optimization processing for appreciation to produce viewing image referred image data, characterized by it that,
before said optimization processing is carried out, on the basis of condition data for carrying out a pre-processing in which the frequency characteristic of said captured-image data is transformed into the scene-referred frequency characteristic by removing the model frequency characteristic specific to said image-capturing device from the frequency characteristic of said captured-image data (by dividing the frequency characteristic of said captured-image data by the model frequency response characteristic specific to said image-capturing device) and the gradation characteristic of said captured-image data is transformed into the scene-referred gradation characteristic by removing the effect of the gradation characteristic specific to said image-capturing device from the gradation characteristic of said captured-image data is carried out, and condition data for carrying out said optimization processing, condition data for outputting said captured-image data to an output medium are generated.

(11) An image processing method in which captured-image data outputted from an image-capturing device is subjected to an optimization processing for appreciation to produce viewing image referred image data, characterized by it that,
before said optimization processing is carried out, on the basis of condition data for carrying out a pre-processing in which the frequency characteristic of said captured-image data is transformed into the scene-referred frequency characteristic by removing the frequency characteristic specific to said image-capturing device from the frequency characteristic of said captured-image data (by and the gradation characteristic of said captured-image data is transformed into the scene-referred gradation characteristic by removing the effect of the model gradation characteristic specific to said image-capturing device from the gradation characteristic of said captured-image data is carried out, and condition data for carrying out said optimization processing, condition data for outputting said captured-image data to an output medium are generated.

(12) An image processing method in which captured-image data outputted from an image-capturing device is subjected to an optimization processing for appreciation to produce viewing image referred image data, characterized by it that, before said optimization processing is carried out, on the basis of condition data for carrying out a pre-processing in which the frequency characteristic of said captured-image data is transformed into the scene-referred frequency characteristic by removing the model frequency characteristic specific to said image-capturing device from the frequency characteristic of said captured-image data (by dividing the frequency characteristic of said captured-image data by the model frequency response characteristic specific to said image-capturing device), and the gradation characteristic of said captured-image data is transformed into the scene-referred gradation characteristic by removing the effect of the model gradation characteristic specific to said image-capturing device from the gradation characteristic of said captured-image data is carried out, and condition data for carrying out said optimization processing, condition data for outputting said captured-image data to an output medium are generated.

(13) An image processing method as set forth in any one of the features (2), (4), (6), (8), (10), and (12), wherein the information on the aforesaid model frequency characteristic is obtained from the aforesaid captured-image data.

(14) An image processing method as set forth in any one of the features (5), (6), (11), and (12), wherein the information on the aforesaid model gradation characteristic is obtained from the aforesaid captured-image data.

(15) An image processing method as set forth in any one of the features (1) to (14), wherein the frequency characteristic of the captured-image data is transformed into the scene-referred frequency characteristic by compensating for the difference in the frequency band between each of the image-capturing device.

(16) An image processing method as set forth in any one of the features (1) to (14), wherein, in the case where the frequency characteristic of the aforesaid captured-image data is transformed into the aforesaid scene-referred frequency characteristic, the frequency characteristic of the captured-image data is transformed into a predetermined standard frequency characteristic.

(17) An image processing method as set forth in the feature (16), wherein the aforesaid standard frequency response characteristic is a frequency response characteristic such that the resolution vs. frequency varies linearly.

(18) An image processing method as set forth in the feature (16), wherein the aforesaid standard frequency response characteristic is a frequency response characteristic such that resolution vs. frequency varies in accordance with the visual characteristic of the human eyes.

(19) An image processing method as set forth in any one of the features (1) to (18), wherein,
when captured-image data after the aforesaid pre-processing are optimized for appreciation to generate the aforesaid viewing image referred image data, after said captured-image data are subjected to an exposure control processing for correcting the brightness and a gray balance adjustment processing for correcting the color bias, said captured-image data are subjected to a gradation compensation processing for correcting the gradation.

(20) An image processing method as set forth in the feature (19), wherein, when the aforesaid gradation compensation processing is carried out, the captured-image data are corrected to become non-linear.

(21) An image processing apparatus in which captured-image data outputted from an image-capturing device are subjected to an optimization processing for appreciation to produce viewing image referred image data, characterized by comprising
a storage means (section) for storing the model frequency response characteristics of a plurality of kinds of image-capturing device,
an acquisition means (section) for obtaining the model frequency response characteristic corresponding to the designated image-capturing device out of the aforesaid plural kinds of model frequency response characteristics stored,
a frequency characteristic compensation means (section) for transforming the frequency characteristic of said captured-image data into the scene-referred frequency characteristic by removing said obtained model frequency response characteristic from the frequency characteristic of said captured-image data (by dividing the frequency characteristic of said captured-image data by the obtained model frequency response characteristic), to correct the frequency characteristic of said captured-image data, and
a control means (section) for practicing a control to carry out a pre-processing to make said frequency characteristic compensation means (section) correct the frequency characteristic of captured-image data, before said optimization processing is carried out.

(22) An image processing apparatus in which captured-image data outputted from an image-capturing device is subjected to an optimization processing for appreciation to produce viewing image referred image data, characterized by comprising
a storage means (section) for storing the model frequency response characteristics and the model gradation characteristics of a plurality of kinds of image-capturing device,
an acquisition means (section) for obtaining the model frequency response characteristic and the model gradation reproduction characteristic corresponding to the designated image-capturing device out of the aforesaid plural kinds of model frequency response characteristics and model gradation characteristics stored,
a frequency characteristic compensation means (section) for transforming the frequency characteristic of said captured-image data into the scene-referred frequency characteristic by removing said obtained model frequency response characteristic from the frequency characteristic of said captured-image data (by dividing the frequency characteristic of said captured-image data by the obtained model frequency response characteristic), to correct the frequency characteristic of said captured-image data,
a gradation characteristic compensation means (section) for transforming the gradation characteristic of said captured-image data into the scene-referred gradation characteristic by removing the effect of said obtained model gradation characteristic from the gradation characteristic of said captured-image data, to correct the gradation characteristic of captured-image data, and
a control means (section) for practicing a control to carry out a pre-processing in which said frequency characteristic compensation means (section) corrects the frequency characteristic of captured-image data and said gradation characteristic compensation means (section) corrects the gradation characteristic of captured-image data, before said optimization processing is carried out.

(23) An image processing apparatus in which captured-image data outputted from an image-capturing device is subjected to an optimization processing for appreciation to produce viewing image referred image data, characterized by comprising a storage means (section) for storing the model frequency response characteristics of a plurality of kinds of image-capturing device, an acquisition means (section) for obtaining the model frequency response characteristic corresponding to the designated image-capturing device out of the aforesaid plural kinds of model frequency response characteristics stored, a pre-processing condition calculating means (section) for calculating condition data for carrying out a pre-processing to transform the frequency characteristic of said captured-image data into the scene-referred frequency characteristic by removing said obtained model frequency response characteristic from the frequency characteristic of said captured-image data (by dividing the frequency characteristic of said captured-image data by said obtained model frequency response characteristic), an optimization condition calculating means (section) for calculating condition data for carrying out said optimization processing, an output condition calculating means (section) for calculating condition data for outputting said captured-image data to an output medium on the basis of the condition data calculated by said pre-processing condition calculating means (section) and said optimization condition calculating means (section), and an image data generating means (section) for generating image data for output on the basis of condition data calculated by said output condition calculating means (section).

(24) An image processing apparatus in which captured-image data outputted from an image-capturing device is subjected to an optimization processing for appreciation to produce viewing image referred image data, characterized by comprising a storage means (section) for storing the model frequency response characteristics and the model gradation reproduction characteristics of a plurality of kinds of image-capturing device, an acquisition means (section) for obtaining the model frequency response characteristic and the model gradation characteristic corresponding to the designated image-capturing device out of the aforesaid plural kinds of model frequency response characteristics and the model gradation characteristics stored, a pre-processing condition calculating means (section) for calculating condition data for carrying out a pre-processing for transforming the frequency characteristic of said captured-image data into the scene-referred frequency characteristic by removing said obtained model frequency response characteristic from the frequency characteristic of said captured-image data (by dividing the frequency characteristic of said captured-image data by said obtained model frequency response characteristic) and transforming the gradation characteristic of said captured-image data into the scene-referred gradation characteristic by removing the effect of said obtained model gradation characteristic from the gradation characteristic of said captured-image data, an optimization condition calculating means (section) for calculating condition data for carrying out said optimization processing, an output condition calculating means (section) for calculating condition data for outputting said captured-image data to an output medium on the basis of the condition data calculated by said pre-processing condition calculating means (section) and said optimization condition calculating means (section), and an image data generating means (section) for generating image data for output on the basis of condition data calculated by said output condition calculating means (section).

(25) An image processing apparatus as set forth in the feature (22) or (24), wherein the aforesaid acquisition means (section) obtains the information on the aforesaid model gradation characteristic from captured-image data.

(26) An image processing apparatus as set forth in any one of the features (21) to (25), wherein the aforesaid acquisition means (section) obtains the information on the aforesaid model frequency response characteristic from captured-image data.

(27) An image processing apparatus as set forth in any one of the features (21) to (26), wherein the aforesaid transformation processing into scene-referred frequency characteristic is carried out by the compensation for the difference in the frequency band between image-capturing device.

(28) An image processing apparatus as set forth in any one of the features (21) to (26), wherein the aforesaid transformation processing into scene-referred frequency characteristic is carried out by subjected to a transformation into a standard frequency response characteristic set beforehand.

(29) An image processing apparatus as set forth in the feature (28), wherein the aforesaid standard frequency (response) characteristic is a frequency (response) characteristic in which resolution varies linearly against frequency.

(30) An image processing apparatus as set forth in the feature (28), wherein the aforesaid standard frequency (response) characteristic is a frequency (response) characteristic such that resolution vs. frequency varies in accordance with the visual characteristic of the human eyes.

(31) An image processing apparatus as set forth in any one of the features (21), (22), and (25) to (30), wherein the aforesaid control means (section), when the aforesaid optimization processing is carried out, generates the aforesaid viewing image referred image data through correcting the gradation after it has corrected the brightness and the color bias of the aforesaid captured-image data.

(32) An image processing apparatus as set forth in any one of the features (23) to (30), wherein the aforesaid optimization condition calculating means (section) calculates condition data for generating the aforesaid viewing image referred image data through correcting the gradation after it has corrected the brightness and the color bias of the aforesaid captured-image data.

(33) An image processing apparatus as set forth in the feature (31) or (32), wherein the aforesaid processing to correct the gradation includes a non-linear compensation processing.

(34) An image recording apparatus which applies an optimization processing for appreciation to captured-image data outputted from an image-capturing device, to produce viewing image referred image data, and forms a pickup image represented by said viewing image referred image data on an output medium, characterized by comprising a storage means (section) for storing the model frequency response characteristics of a plurality of kinds of image-capturing device, an acquisition means (section) for obtaining the model frequency response characteristic corresponding to the designated image-capturing device out of the aforesaid plural kinds of model frequency response characteristics stored, a frequency characteristic compensation means (section) for transforming the frequency characteristic of said captured-image data into the scene-referred frequency characteristic by removing said obtained model frequency response characteristic from the frequency characteristic of said captured-image data (by dividing the frequency characteristic of said captured-image data by said obtained model frequency response characteristic), to correct the frequency characteristic of said captured-image data, and a control means (section) for practicing a control to carry out a pre-processing to make said frequency characteristic compensation means (section) correct the frequency characteristic of captured-image data before said optimization processing is carried out.

An image recording apparatus which applies an optimization processing for appreciation to captured-image data outputted from an image-capturing device, to produce viewing image referred image data, and forms a pickup image represented by said viewing image referred image data on an output medium, characterized by comprising a storage means (section) for storing the model frequency response characteristics and model gradation characteristics of a plurality of kinds of image-capturing device, an acquisition means (section) for obtaining the model frequency response characteristic and the model gradation characteristic corresponding to the designated image-capturing device out of the aforesaid stored plural kinds of model frequency response characteristics and model gradation characteristics respectively, a frequency characteristic compensation means (section) for transforming the frequency characteristic of said captured-image data into the scene-referred frequency characteristic by removing said obtained model frequency response characteristic from the frequency characteristic of said captured-image data (by dividing the frequency characteristic of said captured-image data by said obtained model frequency response characteristic specific to said image-capturing device), to correct the frequency characteristic of said captured-image data, a gradation characteristic compensation means (section) for transforming the gradation characteristic of said captured-image data into the scene-referred gradation characteristic by removing the effect of said obtained model gradation characteristic from the gradation characteristic of said captured-image data, to correct the gradation characteristic of said captured-image data, and a control means (section) for practicing a control to carry out a pre-processing in which said frequency characteristic compensation means (section) corrects the frequency characteristic of captured-image data and said gradation compensation means (section) corrects the gradation characteristic of said captured-image data, before said optimization processing is carried out.

(36) An image recording apparatus which applies an optimization processing for appreciation to captured-image data outputted from an image-capturing device, to produce viewing image referred image data, and forms a pickup image represented by said viewing image referred image data on an output medium, characterized by comprising a storage means (section) for storing the model frequency response characteristics of a plurality of kinds of image-capturing device, an acquisition means (section) for obtaining the model frequency response characteristic corresponding to the designated image-capturing device out of the aforesaid plural kinds of model frequency response characteristics stored, a pre-processing condition calculating means (section) for calculating condition data for carrying out a pre-processing to transform the frequency characteristic of said captured-image data into the scene-referred frequency characteristic by removing said obtained model frequency response from the frequency characteristic of said captured-image data (by dividing the frequency characteristic of said captured-image data by said obtained model frequency response characteristic specific to said image-capturing device), an optimization condition calculating means (section) for calculating condition data for carrying out said optimization processing, an output condition calculating means (section) for calculating condition data for outputting said captured-image data to an output recording medium on the basis of condition data calculated by said pre-processing condition calculating means (section) and said optimization condition calculating means (section), and an image data generating means (section) for generating image data for output on the basis of the condition data calculated by said output condition calculating means (section).

(37) An image recording apparatus which applies an optimization processing for appreciation to captured-image data outputted from an image-capturing device, to produce viewing image referred image data, and forms a pickup image represented by said viewing image referred image data on an output medium, characterized by comprising a storage means (section) for storing the model frequency response characteristics and the model gradation characteristics of a plurality of kinds of image-capturing device, an acquisition means (section) for obtaining the model frequency response characteristic and the model gradation characteristic corresponding to the designated image-capturing device out of the aforesaid plural kinds of model frequency response characteristics and the model gradation characteristics stored, a pre-processing condition calculating means (section) for calculating condition data for carrying out a pre-processing in which the frequency characteristic of said captured-image data are transformed into the scene-referred frequency characteristic by removing said obtained model frequency response characteristic from the frequency characteristic of said captured-image data (by dividing the frequency characteristic of said captured-image data by said obtained model frequency response characteristic specific to said image-capturing device) and the gradation characteristic of said captured-image data are transformed into the scene-referred gradation characteristic by removing the effect of said obtained model gradation characteristic from the gradation characteristic of said pickup image, an optimization condition calculating means (section) for calculating condition data for carrying out said optimization processing, an output condition calculating means (section) for calculating condition data for outputting said captured-image data to an output recording medium on the basis of condition data calculated by said pre-processing condition calculating means (section) and said optimization condition calculating means (section), and an image data generating means (section) for generating image data for output on the basis of the condition data calculated by said output condition calculating means (section).

(38) An image recording apparatus as set forth in the feature (35) or (37), wherein the aforesaid acquisition means (section) obtains the information on the aforesaid model gradation characteristic from the captured-image data.

(39) An image recording apparatus as set forth in any one of the features (34) to (38), wherein the aforesaid acquisition means (section) obtains the information on the aforesaid model frequency response characteristic from the captured-image data.

(40) An image recording apparatus as set forth in any one of the features (34) to (39), wherein the transformation processing into the aforesaid scene-referred frequency characteristic is carried out by the compensation for the difference in the frequency band between image-capturing device.

(41) An image recording apparatus as set forth in any one of the features (34) to (39), wherein the transformation processing into the aforesaid scene-referred frequency characteristic is carried out by the transformation into a standard frequency response characteristic set beforehand.

(42) An image recording apparatus as set forth in the feature (41), wherein the aforesaid standard frequency response characteristic is a frequency response characteristic such that resolution vs. frequency varies linearly.

(43) An image recording apparatus as set forth in the feature (41), wherein the aforesaid standard frequency response characteristic is a frequency response characteristic such that resolution vs. frequency varies in accordance with the visual characteristic of the human eyes.

(44) An image recording apparatus as set forth in any one of the features (34), (35), (38) to (43), wherein the aforesaid control means (section), when it carries out the aforesaid optimization processing, generates the aforesaid viewing image referred image data through correcting the gradation after it has corrected the brightness and the color bias for the aforesaid captured-image data.

(45) An image recording apparatus as set forth in any one of the features (36) to (43), wherein the aforesaid optimization condition calculating means (section) calculates the condition data for generating the aforesaid viewing image referred image data through correcting the gradation, after it has corrected the brightness and the color bias for the aforesaid captured-image data.

(46) An image recording apparatus as set forth in the feature (44) or (45), wherein the aforesaid processing to correct the gradation includes a non-linear compensation processing.

(47) A recording medium capable of being read by a computer having recorded a program to make a computer carrying out an image processing in which captured-image data outputted from an image-capturing device are subjected to an optimization processing for appreciation to produce viewing image referred image data actualize a function to carry out a pre-processing to transform the frequency characteristic of said image data into the scene-referred frequency characteristic by removing the frequency response characteristic specific to said image-capturing device from the frequency characteristic of said captured-image data (by dividing the frequency characteristic of said captured-image data by the frequency response characteristic specific to said image-capturing device), before the practice of the aforesaid optimization processing.

(48) A recording medium capable of being read by a computer having recorded a program to make a computer carrying out an image processing in which captured-image data outputted from an image-capturing device is subjected to an optimization processing for appreciation to produce viewing image referred image data actualize a function to carry out a pre-processing to transform the frequency characteristic of said image data into the scene-referred frequency characteristic by removing the model frequency response characteristic specific to said image-capturing device from the frequency characteristic of said captured-image data (by dividing the frequency characteristic of said captured-image data by the model frequency response characteristic specific to said image-capturing device), before the practice of the aforesaid optimization processing.

(49) A recording medium capable of being read by a computer having recorded a program to make a computer carrying out an image processing in which captured-image data outputted from an image-capturing device are subjected to an optimization processing for appreciation to produce viewing image referred image data actualize a function to carry out a pre-processing for transforming the frequency characteristic of said image data into the scene-referred frequency characteristic by removing the frequency response characteristic specific to said image-capturing device from the frequency characteristic of said captured-image data (by dividing the frequency characteristic of said captured-image data by the frequency response characteristic specific to said image-capturing device) and transforming the gradation characteristic of said image data into the scene-referred gradation characteristic by removing the effect of the gradation characteristic specific to said image-capturing device from the gradation characteristic of said captured-image data, before the practice of the aforesaid optimization processing.

(50) A recording medium capable of being read by a computer having recorded a program to make a computer carrying out an image processing in which captured-image data outputted from an image-capturing device is subjected to an optimization processing for appreciation to produce viewing image referred image data actualize a function to carry out a pre-processing for transforming the frequency characteristic of said image data into the scene-referred frequency characteristic by removing the model frequency response characteristic specific to said image-capturing device from the frequency characteristic of said captured-image data (by dividing the frequency characteristic of said captured-image data by the model frequency response characteristic specific to said image-capturing device) and transforming the gradation characteristic of said image data into the scene-referred gradation characteristic by removing the effect of the gradation characteristic specific to said image-capturing device from the gradation characteristic of said captured-image data, before the practice of the aforesaid optimization processing.

(51) A recording medium capable of being read by a computer having recorded a program to make a computer carrying out an image processing in which captured-image data outputted from an image-capturing device are subjected to an optimization processing for appreciation to produce viewing image referred image data actualize a function to carry out a pre-processing for transforming the frequency characteristic of said image data into the scene-referred frequency characteristic by removing the frequency response characteristic specific to said image-capturing device from the frequency characteristic of said captured-image data (by dividing the frequency characteristic of said captured-image data by the frequency response characteristic specific to said image-capturing device) and transforming the gradation characteristic of said image data into the scene-referred gradation characteristic by removing the effect of the model gradation characteristic specific to said image-capturing device from the gradation characteristic of said captured-image data, before the practice of the aforesaid optimization processing.

(52) A recording medium capable of being read by a computer having recorded a program to make a computer carrying out an image processing in which captured-image data outputted from an image-capturing device are subjected to an optimization processing for appreciation to produce viewing image referred image data actualize a function to carry out a pre-processing for transforming the frequency characteristic of said image data into the scene-referred frequency characteristic by removing the model frequency response characteristic specific to said image-capturing device from the frequency characteristic of said captured-image data (by dividing the frequency characteristic of said captured-image data by the model frequency response characteristic specific to said image-capturing device), and transforming the gradation characteristic of said image data into the scene-referred gradation characteristic by removing the effect of the model gradation characteristic specific to said image-capturing device from the gradation characteristic of said captured-image data, before the practice of the aforesaid optimization processing.

(53) A recording medium capable of being read by a computer having recorded a program to make a computer carrying out an image processing in which captured-image data outputted from an image-capturing device are subjected to an optimization processing for appreciation to produce viewing image referred image data actualize a function to generate condition data for outputting said captured-image data to an output medium, on the basis of condition data for carrying out a pre-processing to transform the frequency characteristic of said image data into the scene-referred frequency characteristic by removing the frequency response characteristic specific to said image-capturing device from the frequency characteristic of said captured-image data (by dividing the frequency characteristic of said captured-image data by the frequency response characteristic specific to said image-capturing device), and condition data for carrying out said optimization processing, before the practice of the aforesaid optimization processing.

(54) A recording medium capable of being read by a computer having recorded a program to make a computer carrying out an image processing in which captured-image data outputted from an image-capturing device are subjected to an optimization processing for appreciation to produce viewing image referred image data actualize a function to generate condition data for outputting said captured-image data to an output medium, on the basis of condition data for carrying out a pre-processing to transform the frequency characteristic of said image data into the scene-referred frequency characteristic by removing the model frequency response characteristic specific to said image-capturing device from the frequency characteristic of said captured-image data (by dividing the frequency characteristic of said captured-image data by the model frequency response characteristic specific to said image-capturing device), and condition data for carrying out said optimization processing, before the practice of the aforesaid optimization processing.

(55) A recording medium capable of being read by a computer having recorded a program to make a computer carrying out an image processing in which captured-image data outputted from an image-capturing device are subjected to an optimization processing for appreciation to produce viewing image referred image data actualize a function to generate condition data for outputting said captured-image data to an output medium, on the basis of condition data for carrying out a pre-processing for transforming the frequency characteristic of said image data into the scene-referred frequency characteristic by removing the frequency response characteristic specific to said image-capturing device from the frequency characteristic of said captured-image data (by dividing the frequency characteristic of said captured-image data by the frequency response characteristic specific to said image-capturing device) and transforming the gradation characteristic of said image data into the scene-referred gradation characteristic by removing the effect of the gradation characteristic specific to said image-capturing device from the gradation characteristic of said captured-image data, and condition data for carrying out said optimization processing, before the practice of the aforesaid optimization processing.

(56) A recording medium capable of being read by a computer having recorded a program to make a computer carrying out an image processing in which captured-image data outputted from an image-capturing device are subjected to an optimization processing for appreciation to produce viewing image referred image data actualize a function to generate condition data for outputting said captured-image data to an output medium, on the basis of condition data for carrying out a pre-processing for transforming the frequency characteristic of said image data into the scene-referred frequency characteristic by removing the model frequency response characteristic specific to said image-capturing device from the frequency characteristic of said captured-image data (by dividing the frequency characteristic of said captured-image data by the model frequency response characteristic specific to said image-capturing device), and transforming the gradation characteristic of said image data into the scene-referred gradation characteristic by removing the effect of the gradation characteristic specific to said image-capturing device from the gradation characteristic of said captured-image data, and condition data for carrying out said optimization processing, before the practice of the aforesaid optimization processing.

(57) A recording medium capable of being read by a computer having recorded a program to make a computer carrying out an image processing in which captured-image data outputted from an image-capturing device are subjected to an optimization processing for appreciation to produce viewing image referred image data actualize a function to generate condition data for outputting said captured-image data to an output medium, on the basis of condition data for carrying out a pre-processing for transforming the frequency characteristic of said image data into the scene-referred frequency characteristic by removing the frequency response characteristic specific to said image-capturing device from the frequency characteristic of said captured-image data (by dividing the frequency characteristic of said captured-image data by the frequency response characteristic specific to said image-capturing device), and transforming the gradation characteristic of said image data into the scene-referred gradation characteristic by removing the effect of the model gradation characteristic specific to said image-capturing device from the gradation characteristic of said captured-image data, and condition data for carrying out said optimization processing, before the practice of the aforesaid optimization processing.

(58) A recording medium capable of being read by a computer having recorded a program to make a computer carrying out an image processing in which captured-image data outputted from an image-capturing device is subjected to an optimization processing for appreciation to produce viewing image referred image data actualize a function to generate the condition data for outputting said captured-image data to an output medium, on the basis of condition data for carrying out a pre-processing for transforming the frequency characteristic of said image data into the scene-referred frequency characteristic by removing the model frequency response characteristic specific to said image-capturing device from the frequency characteristic of said captured-image data (by dividing the frequency characteristic of said captured-image data by the model frequency response characteristic specific to said image-capturing device), and transforming the gradation characteristic of said image data into the scene-referred gradation characteristic by removing the effect of the model gradation characteristic specific to said image-capturing device from the gradation characteristic of said captured-image data, and condition data for carrying out said optimization processing, before the practice of the aforesaid optimization processing.

(59) A recording medium capable of being read by a computer as set forth in any one of the features (48), (50), (52), (54), (56), and (58), wherein the aforesaid model frequency response characteristic is obtained from the aforesaid captured-image data.

(60) A recording medium capable of being read by a computer as set forth in any one of the features (51), (52), (57), and (58), wherein the aforesaid model gradation characteristic is obtained from the aforesaid captured-image data.

(61) A recording medium capable of being read by a computer as set forth in any one of the features (47) to (60), wherein the frequency characteristic of the aforesaid captured-image data is transformed into the aforesaid scene-referred frequency characteristic by the compensation for the difference in the frequency band between image-capturing device.

(62) A recording medium capable of being read by a computer as set forth in any one of the features (47) to (60), wherein when the frequency characteristic of the captured-image data is transformed into the scene-referred frequency characteristic, the frequency characteristic of the captured-image data is transformed into a predetermined standard frequency characteristic.

(63) A recording medium capable of being read by a computer as set forth in the feature (62), wherein the aforesaid standard frequency characteristic is a frequency characteristic such that resolution vs. frequency varies linearly.

(64) A recording medium capable of being read by a computer as set forth in the feature (62), wherein the aforesaid standard frequency characteristic is a frequency characteristic such that resolution vs. frequency varies in accordance with the visual characteristic of the human eyes.

(65) A recording medium capable of being read by a computer as set forth in any one of the features (47) to (64), wherein, when the captured-image data after the aforesaid pre-processing is optimized for appreciation to generate the aforesaid viewing image referred image data, a gradation compensation processing to correct the gradation is applied to said captured-image data, after an exposure control processing to correct the brightness and a gray balance adjustment control to correct the color bias is applied to said captured-image data.

(66) A recording medium capable of being read by a computer as set forth in the feature (65), wherein, when the aforesaid gradation compensation processing is carried out, the captured-image data are corrected non-linearly.

(67) A program to make a computer carrying out an image processing in which captured-image data outputted from an image-capturing device are subjected to an optimization processing for appreciation to produce viewing image referred image data actualize a function to carry out a pre-processing to transform the frequency characteristic of said captured-image data into the scene-referred frequency characteristic by removing the frequency response characteristic specific to said image-capturing device from the frequency characteristic of said captured-image data (by dividing the frequency characteristic of said captured-image data by the frequency response characteristic specific to said image-capturing device), before the practice of the aforesaid optimization processing.

(68) A program to make a computer carrying out an image processing in which captured-image data outputted from an image-capturing device are subjected to an optimization processing for appreciation to produce viewing image referred image data actualize a function to carry out a pre-processing to transform the frequency characteristic of said captured-image data into the scene-referred frequency characteristic by removing the model frequency response characteristic specific to said image-capturing device from the frequency characteristic of said captured-image data (by dividing the frequency characteristic of said captured-image data by the model frequency response characteristic specific to said image-capturing device), before the practice of the aforesaid optimization processing.

(69) A program to make a computer carrying out an image processing in which captured-image data outputted from an image-capturing device are subjected to an optimization processing for appreciation to produce viewing image referred image data actualize a function to carry out a pre-processing for transforming the frequency characteristic of said captured-image data into the scene-referred frequency characteristic by removing the frequency response characteristic specific to said image-capturing device from the frequency characteristic of said captured-image data (by dividing the frequency characteristic of said captured-image data by the frequency response characteristic specific to said image-capturing device) and transforming the gradation characteristic of said captured-image data into the scene-referred gradation characteristic by removing the effect of the gradation characteristic specific to said image-capturing device from the gradation characteristic of said captured-image data, before the practice of the aforesaid optimization processing.

(70) A program to make a computer carrying out an image processing in which captured-image data outputted from an image-capturing device are subjected to an optimization processing for appreciation to produce viewing image referred image data actualize a function to carry out a pre-processing for transforming the frequency characteristic of said captured-image data into the scene-referred frequency characteristic by removing the model frequency response characteristic specific to said image-capturing device from the frequency characteristic of said captured-image data (by dividing the frequency characteristic of said captured-image data by the model frequency response characteristic specific to said image-capturing device) and transforming the gradation characteristic of said captured-image data into the scene-referred gradation characteristic by removing the effect of gradation characteristic specific to said image-capturing device from the gradation characteristic of said captured-image data, before the practice of the aforesaid optimization processing.

(71) A program to make a computer carrying out an image processing in which captured-image data outputted from an image-capturing device are subjected to an optimization processing for appreciation to produce viewing image referred image data actualize a function to carry out a pre-processing for transforming the frequency characteristic of said captured-image data into the scene-referred frequency characteristic by removing the frequency response characteristic specific to said image-capturing device from the frequency characteristic of said captured-image data (by dividing the frequency characteristic of said captured-image data by the frequency response characteristic specific to said image-capturing device), and transforming the gradation characteristic of said captured-image data into the scene-referred gradation characteristic by removing the effect of the model gradation characteristic specific to said image-capturing device from the gradation characteristic of said captured-image data, before the practice of the aforesaid optimization processing.

(72) A program to make a computer carrying out an image processing in which captured-image data outputted from an image-capturing device are subjected to an optimization processing for appreciation to produce viewing image referred image data actualize a function to carry out a pre-processing for transforming the frequency characteristic of said captured-image data into the scene-referred frequency characteristic by removing the model frequency response characteristic specific to said image-capturing device from the frequency characteristic of said captured-image data (by dividing the frequency characteristic of said captured-image data by the model frequency response characteristic specific to said image-capturing device) and transforming the gradation characteristic of said captured-image data into the scene-referred gradation characteristic by removing the effect of the model gradation characteristic specific to said image-capturing device from the gradation characteristic of said captured-image data, before the practice of the aforesaid optimization processing.

(73) A program to make a computer carrying out an image processing in which captured-image data outputted from an image-capturing device are subjected to an optimization processing for appreciation to produce viewing image referred image data actualize a function to generate condition data for outputting said captured-image data to an output medium, on the basis of condition data for carrying out a pre-processing to transform the frequency characteristic of said captured-image data into the scene-referred frequency characteristic by removing the frequency response characteristic specific to said image-capturing device from the frequency characteristic of said captured-image data (by dividing the frequency characteristic of said captured-image data by the frequency response characteristic specific to said image-capturing device), and condition data for carrying out said optimization processing, before the practice of the aforesaid optimization processing.

(74) A program to make a computer carrying out an image processing in which captured-image data outputted from an image-capturing device are subjected to an optimization processing for appreciation to produce viewing image referred image data actualize a function to generate condition data for outputting said captured-image data to an output medium, on the basis of condition data for carrying out a pre-processing to transform the frequency characteristic of said captured-image data into the scene-referred frequency characteristic by removing the model frequency response characteristic specific to said image-capturing device from the frequency characteristic of said captured-image data (by dividing the frequency characteristic of said captured-image data by the model frequency response characteristic specific to said image-capturing device), and condition data for carrying out said optimization processing, before the practice of the aforesaid optimization processing.

(75) A program to make a computer carrying out an image processing in which captured-image data outputted from an image-capturing device are subjected to an optimization processing for appreciation to produce viewing image referred image data actualize a function to generate condition data for outputting said captured-image data to an output medium, on the basis of condition data for carrying out a pre-processing for transforming the frequency characteristic of said captured-image data into the scene-referred frequency characteristic by removing the frequency response characteristic specific to said image-capturing device from the frequency characteristic of said captured-image data (by dividing the frequency characteristic of said captured-image data by the frequency response characteristic specific to said image-capturing device) and transforming the gradation characteristic of said captured-image data into the scene-referred gradation characteristic by removing the effect of the gradation characteristic specific to said image-capturing device from the gradation characteristic of said captured-image data, and condition data for carrying out said optimization processing, before the practice of the aforesaid optimization processing.

(76) A program to make a computer carrying out an image processing in which captured-image data outputted from an image-capturing device are subjected to an optimization processing for appreciation to produce viewing image referred image data actualize a function to generate condition data for outputting said captured-image data to an output medium, on the basis of condition data for carrying out a pre-processing for transforming the frequency characteristic of said captured-image data into the scene-referred frequency characteristic by removing the model frequency response characteristic specific to said image-capturing device from the frequency characteristic of said captured-image data (by dividing the frequency characteristic of said captured-image data by the model frequency response characteristic specific to said image-capturing device) and transforming the gradation characteristic of said captured-image data into the scene-referred gradation characteristic by removing the effect of the gradation characteristic specific to said image-capturing device from the gradation characteristic of said captured-image data, and condition data for carrying out said optimization processing, before the practice of the aforesaid optimization processing.

(77) A program to make a computer carrying out an image processing in which captured-image data outputted from an image-capturing device are subjected to an optimization processing for appreciation to produce viewing image referred image data actualize a function to generate condition data for outputting said captured-image data to an output medium, on the basis of condition data for carrying out a pre-processing for transforming the frequency characteristic of said captured-image data into the scene-referred frequency characteristic by removing the frequency response characteristic specific to said image-capturing device from the frequency characteristic of said captured-image data (by dividing the frequency characteristic of said captured-image data by the frequency response characteristic specific to said image-capturing device) and transforming the gradation characteristic of said captured-image data into the scene-referred gradation characteristic by removing the effect of the model gradation characteristic specific to said image-capturing device from the gradation characteristic of said captured-image data, and condition data for carrying out said optimization processing, before the practice of the aforesaid optimization processing.

(78) A program to make a computer carrying out an image processing in which captured-image data outputted from an image-capturing device are subjected to an optimization processing for appreciation to produce viewing image referred image data actualize a function to generate condition data for outputting said captured-image data to an output medium, on the basis of condition data for carrying out a pre-processing for transforming the frequency characteristic of said captured-image data into the scene-referred frequency characteristic by removing the model frequency response characteristic specific to said image-capturing device from the frequency characteristic of said captured-image data (by dividing the frequency characteristic of said captured-image data by the model frequency response characteristic specific to said image-capturing device) and transforming the gradation characteristic of said captured-image data into the scene-referred gradation characteristic by removing the effect of the model gradation characteristic specific to said image-capturing device from the gradation characteristic of said captured-image data, and condition data for carrying out said optimization processing, before the practice of the aforesaid optimization processing.

(79) A program as set forth in any one of the features (68), (70), (72), (74), (76), and (78), wherein the aforesaid model frequency response characteristic is obtained from the aforesaid captured-image data.

(80) A program as set forth in any one of the features (71), (72), (77), and (78), wherein the aforesaid model gradation characteristic is obtained from the aforesaid captured-image data.

(81) A program as set forth in any one of the features (67) to (80), wherein the frequency characteristic of the aforesaid captured-image data is transformed into the aforesaid scene-referred frequency characteristic by the correction for the difference in the frequency band between image-capturing device.

(82) A program as set forth in any one of the features (67) to (80), wherein, in the case where the frequency characteristic of the captured-image data is transformed into the scene-referred frequency characteristic, the frequency characteristic of the captured-image data is transformed into a predetermined standard frequency characteristic.

(83) A program as set forth in the feature (82), wherein the aforesaid standard frequency characteristic is a frequency characteristic such that resolution vs. frequency varies linearly.

(84) A program as set forth in the feature (82), wherein the aforesaid standard frequency response characteristic is a frequency response characteristic such that resolution vs. frequency varies in accordance with the visual characteristic of the human eyes.

(85) A program as set forth in any one of the features (67) to (84), wherein, when the captured-image data after the aforesaid pre-processing is optimized for appreciation to generate the aforesaid viewing image referred image data, a gradation compensation processing to correct the gradation is applied to said captured-image data after an exposure control processing to correct the brightness and a gray balance adjustment control to correct the color bias is applied to said captured-image data.

(86) A program as set forth in the feature (85), wherein, when the aforesaid gradation compensation processing is carried out, the captured-image data are corrected non-linearly.

(87) An image processing method as set forth in any one of the features (1) to (20), wherein the aforesaid pre-processing includes a processing to transform the color characteristic of the aforesaid captured-image data into the scene-referred color space characteristic by removing the effect of the color characteristic specific to the pertinent image-capturing device from the color characteristic of said captured-image data.

(88) An image processing apparatus as set forth in any one of the features (21) to (33), further comprising a color characteristic compensation means (section) for correcting the gradation characteristic of the aforesaid pickup image, through transforming the color characteristic of said captured-image data into the scene-referred color space characteristic, by removing the effect of the color characteristic specific to the pertinent image-capturing device from the color characteristic of said captured-image data.

(89) An image recording apparatus as set forth in any one of the features (34) to (46), further comprising a color characteristic compensation means (section) for correcting the gradation characteristic of the aforesaid pickup image, through transforming the color characteristic of said captured-image data into the scene-referred color space characteristic, by removing the effect of the color characteristic specific to the pertinent image-capturing device from the color characteristic of said captured-image data.

(90) A recording medium capable being read by a computer as set forth in any one of the features (47) to (66), wherein the aforesaid pre-processing includes a processing to transform the color characteristic of the aforesaid captured-image data into the scene-referred color space characteristic by removing the effect of the color characteristic specific to the pertinent image-capturing device from the color characteristic of said captured-image data.

(91) A program as set forth in any one of the features (67) to (86), wherein the aforesaid pre-processing includes a processing to transform the color characteristic of the aforesaid captured-image data into the scene-referred color space characteristic by removing the effect of the color characteristic specific to the pertinent image-capturing device from the color characteristic of said captured-image data.

(92) An image processing method as set forth in the feature (87), wherein the aforesaid transformation processing into the scene-referred color space characteristic is carried out by the use of the model color characteristic specific to the pertinent image-capturing device.

(93) An image processing apparatus as set forth in the feature (88), wherein the aforesaid color characteristic compensation means (section) transforms the color characteristic of the aforesaid captured-image data into the scene-referred color space characteristic, by removing the effect of the model color characteristic specific to the pertinent image-capturing device from the color characteristic of said captured-image data.

(94) An image recording apparatus as set forth in the feature (89), wherein the aforesaid color characteristic compensation means (section) transforms the color characteristic of the aforesaid captured-image data into the scene-referred color space characteristic, by removing the effect of the model color characteristic specific to the pertinent image-capturing device from the color characteristic of said captured-image data.

(95) A recording medium capable of being read by a computer as set forth in the feature (90), wherein the aforesaid transformation processing into the scene-referred color space characteristic is carried out by the use of the model color characteristic specific to the pertinent image-capturing device.

(96) A program as set forth in the feature (91), wherein the aforesaid transformation processing into the scene-referred color space characteristic is carried out by the use of the model color characteristic specific to the pertinent image-capturing device.

DETAILED DESCRIPTION OF THE PREFERRED EMBODIMENT

Figure 1:
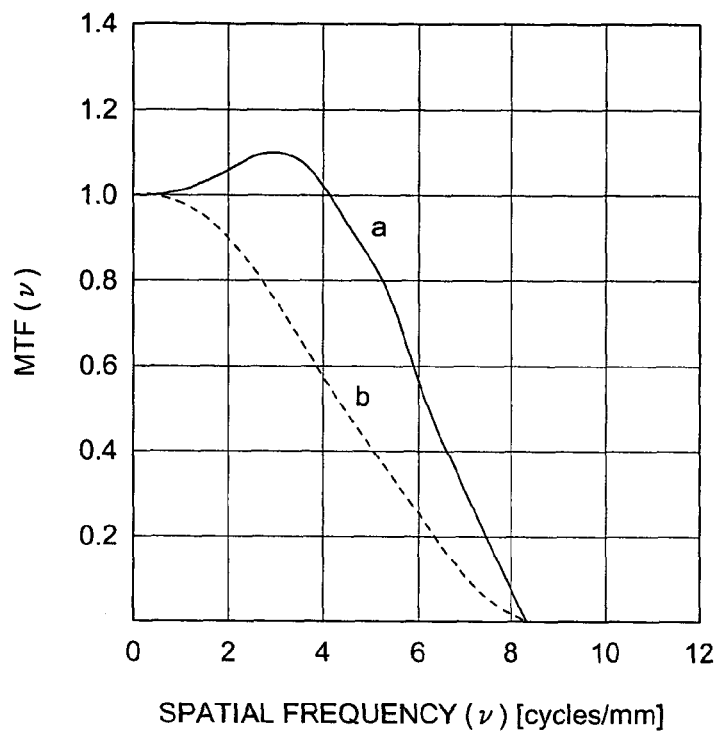
FIG. 1 is a graph showing the relation between the spatial frequency and the MTF value.

First, terms to be used in each of the features of this application will be explained as a supplement.

The term "generation" means that a program running on an image-capturing device, an image processing apparatus, and an image recording apparatus of this invention produces an electronic file newly. Hereinafter the term "production" is used as a synonym of "generation".

The "image processing method" of this invention set forth in the feature (1) is characterized by it that a pre-processing to transform the frequency characteristic of captured-image data into the scene-referred frequency characteristic is practiced.

As the result of a diligent investigation based on the experiments, the inventors have found that, by the application of a gradation transformation processing etc. to digital image data after the frequency response of a pickup image has once been transformed into the scene-referred frequency characteristic, variation of image quality from one digital camera to another is reduced, and the problem that a close-up photograph of a person having fine lines, a photograph with a lawn or a building as the background, or a close-up photograph including characters or hairs gives an impression of disorder in the sharpness of the image has no more been produced.

General digital cameras practice a processing to selectively enhance or suppress the response of frequency bands (resolution of the frequency bands) in accordance with the number of pixels of the image sensor loaded. Further, a frequency response characteristic has information on not only the difference in whether or not the detail of a photographic object is resolved but also the difference in the contrast. Thus, it is obtained a conclusion that this is because the frequency response characteristic of a camera changes from that designed by the camera maker for each model, accompanied by the adjustment of the gradation characteristic.

Now, a supplementary explanation about the "frequency response characteristic" will be given.

As regards an index representing the frequency response characteristic (that is, the resolution) which an image-capturing device such as a digital camera has, MTF (Modulation Transfer Function) is known. An MTF is a function expressing to how much degree the contrast of a photographic object is maintained for each spatial frequency evaluated as a transfer ratio. A spatial frequency (lines/mm) is represented by how many rectangular patterns composed of black and white stripes are included in 1 mm.

The degree of lowering of contrast can be considered as a function of the spatial frequency ν of a light-and-dark pattern, and the contrast C(ν) of a digital image is defined in the following way.

$$C(v) = \frac{I_{bright} - I_{dark}}{I_{bright} + I_{dark}} \quad [\text{M1}]$$

where $I_{bright}$ denotes the luminance at the lightest part in the light-and-dark pattern, and $I_{dark}$ denotes the luminance at the darkest part. By this definition, the relation between the contrast of an input image $C_{before}(v)$ and the contrast of the output image $C_{after}(v)$ is expressed by the expression shown in [M2] below using a transfer function MTF(ν). From this expression, the MTF(ν) is determined. [M2]

$$C_{after}(v) = MTF(v) \times C_{before}(v).$$

When one observes a light-and-dark pattern with the lowermost spatial frequency, that is, of an infinitely long period, the light-and-dark pattern appears with a contrast transfer ratio of 1, that is, with the same contrast of the actual object. The narrower the intervals of the light-and-dark pattern becomes, the contrast transfer ratio becomes smaller, and at the highest side of the spatial frequency, the MTF becomes 0 (that is, the contrast becomes zero), which means that the light-and-dark pattern cannot be resolved at all.

In the case of a digital camera of a model called a single chip type equipped with a single image sensor such as a CCD, color separation function is given by means of a filter having a Bayer arrangement or the like. Further, as regards the pixel arrangement of an image sensor such as a CCD, a lattice-shaped arrangement pattern in which pixels are arranged equally in the vertical and horizontal directions and a honeycomb-shaped arrangement pattern in which pixels are arranged obliquely are known.

In the case of a Bayer arrangement, in accordance with the visual characteristic of the human eyes, pixels of G are arranged at every other position occupying a half of the total pixel areas against pixels of B and R. Further, for the positions which have B or R pixels arranged and are deficient in the information on G, data of G are interpolated by an image processing using the data of the surrounding pixels.

In an image sensor having such a structure, in accordance with the arrangement pattern and the total number of pixels of the used CCD, the Nyquist frequency, which is the theoretical limit of resolution based on the sampling theorem, is set at the high-frequency side of the above-mentioned MTF.

Further, for the purpose of preventing the interference fringes due to the pixel arrangement of a CCD, a filter for cutting the specified high frequency band (a low pass filter) is provided, and with the optical characteristic of the lens taken into account, it can be said that various MTF's which are different from one model to another of digital cameras exist.

Concerning an image having such a characteristic, it is inferred that, in the case where only a model gradation reproduction characteristic profile produced by such a gray patch as is disclosed in the publication of the unexamined patent application 2002-16807, for example, is applied, the difference in the frequency response characteristic depending on the camera model, which is originally present, is not corrected, but rather enlarged, and this produces an extreme degree of disordered impression in the sharpness of an image.

"Image-capturing device" is an apparatus equipped with an image sensor having a function of photoelectric conversion, and what is called a digital camera or a scanner is included in this. For an example of the above-mentioned image sensor, the aforesaid CCD-type image sensor and a CMOS-type image sensor can be cited. The output current of these image sensors is digitized by an A/D converter. The content of each color channel at this stage is a signal strength based on the spectral sensitivity which is specific to the image sensor.

"Captured-image data" are digital image data which are obtained from data digitized by an A/D converter obtained from the output signals indicating high-fidelity information of a photographic object recorded by an image-capturing device by the application of image processings such as gradation transformation, sharpness enhancement, and chroma enhancement for improving the effect at the time of appreciation of the image, a processing for mapping the signals of color channels based on the spectral sensitivity which is specific to the image sensor to a standard color space such as RIMM RGB or ERIMM RGB (refer to Journal of Imaging Science and Technology, Vol. 45 pp. 418-426 (2001)), etc, after the correction of noises such as a fixed pattern noise and a dark current noise has been practiced.

As regards the "output medium", the following are to be noted as an example: a display device such as a CRT, a liquid crystal display, a plasma display, or the like, and a material for producing a hard copy image such as a silver halide photographic paper, an ink jet paper, a thermal printer paper, or the like.

"Viewing image referred image data" are image data generated on the basis of an image processing method of this invention, and mean image data to be used when an image is displayed on a display device such as a CRT, a liquid crystal display, a plasma display, or the like, or to be used when a hard copy image is generated on an output medium such as a silver halide photographic paper, an ink jet paper, a thermal printer paper, or the like. The viewing image referred image data have been subjected to optimization processing for obtaining an optimum image for viewing on the above-mentioned display device or on the above-mentioned output medium.

Image data obtained from captured-image data by removing the (model) frequency response characteristic and/or gradation characteristic which are specific to the image-capturing device (hereinafter referred to as scene-referred image data) mean image data obtained from the signals of color channels based on the spectral sensitivity of the image sensor itself having been already mapped to a standard color space such as RIMM RGB or ERIMM RGB but not subjected to image processes such as gradation transformation, sharpness enhancing, and chroma enhancing for improving the effect at the time of appreciation of the image.

However, this literature does not refer to frequency characteristic, and it is one of the feature of this invention that the concept of scene-referred image data are broadened to include the concept of frequency.

Further, as regards scene-referred image data, it is desirable to apply the correction for the photoelectric conversion characteristic of the image-capturing device (opto-electronic conversion function defined by ISO1452, refer to, for example, "Fine Imaging and Digital Photography" p. 479, edited by the publishing committee of The Society of Photographic Science and Technology of Japan, published by Corona Publishing Co., Ltd.) to the scene-referred image data.

It is desirable that the information volume of scene-referred image data (the number of gray scales, for example) is equal to or greater than the information volume required for viewing image referred image data (the number of gray scales, for example). For example, in the case where the number of gray scales of viewing image referred image data is 8 bit per 1 channel, the number of gray scales of scene-referred image data is desirably not less than 12 bits per 1 channel, more desirably not less than 14 bits, and further more desirably not less than 16 bits per 1 channel.

"Scene-referred frequency characteristic" means, in the above-mentioned scene-referred image data, the frequency characteristic of the image data in the state where the application of frequency transformation processing is omitted particularly among the image processes to alter the data content for improving the effect at the time of appreciation of the image.

The difference in the frequency response characteristic between cameras is caused by two factors, the difference in the number of pixels and the difference in the contrast setting for each frequency band in the same way as the gradation setting.

The inventors have directed their attention to this point in this invention; thus, this invention is characterized by it that a processing of standardization to correct the contrast in each frequency band to one based on a condition specified beforehand in accordance with the number of pixels or the model of the camera.

Supposing that the processing to transform the frequency characteristic into the scene-referred frequency characteristic is the compensation processing for the frequency response characteristic of each image-capturing device (difference in the frequency band) as the invention set forth in the feature (15), the frequency characteristic can be corrected at a high accuracy together with the change of the frequency characteristic accompanied by the above-mentioned transformation processing into the above-mentioned scene-referred gradation characteristic.

Supposing that the processing to transform the frequency characteristic into the scene-referred frequency characteristic is the processing to transform the frequency characteristic into the standard frequency characteristic as the invention set forth in the feature (16), the improvement of accuracy of the processing and the raise of efficiency can be achieved.

The image processing method set forth in the feature (2) is characterized by it that a pre-processing to generate scene-referred image data by transforming the frequency characteristic of captured-image data into the scene-referred frequency characteristic by the use of model frequency response characteristic information is applied to the captured-image data.

"Model frequency response characteristic information (model frequency characteristic information)" is data to make it possible to practice the compensation for the model frequency response characteristic of each image-capturing device, and is the information representing directly the frequency response characteristic, or the name, mark, code of the model, or the like for identifying the image-capturing device.

The model frequency response characteristic information is inputted manually by an operator or automatically by the use of information recorded in the captured-image data only, to an image processing apparatus or an image recording apparatus practicing this process.

In the mode of practice where model frequency response characteristic information is the name, mark, or code of a model for identifying an image-capturing device, and is automatically inputted, it is necessary that an image processing apparatus or an image recording apparatus to practice this processing keeps a correspondence table. This correspondence table need not be stored directly in a storage device of the image processing apparatus, but a mode of practice in which the table is read out from a server at a remote site connected through a network may be also appropriate.

Now, the method of preparing "information directly representing a frequency response characteristic" will be explained in detail. In the present invention, it is desirable to use an MTF for the information directly representing the frequency response characteristic of an image-capturing device.

As regards the calculation of an MTF, in order to evaluate to how large a degree the contrast of a photographic object is maintained, a chart composed of black and white rectangular images representing spatial frequencies (hereinafter referred to as "a sharpness evaluation chart") is used.

The above-mentioned sharpness evaluation chart is photographed by an image-capturing device, the 8-bit values of the white parts ($I_{bright}$) and black parts ($I_{dark}$) of the rectangular image areas representing the one and same spatial frequency, and the contrast $C_{after}$ at said spatial frequency is obtained by the expression shown in the above-mentioned [M1]. In particular, the respective 8-bit values of the above-mentioned white and black parts are previously obtained over the total range of spatial frequency $v$.

Further in the same way, the contrast $C_{before}(v)$ of the sharpness evaluation chart itself is obtained, and the $MTF(v)$ is calculated by the expression shown in the above-mentioned [M2].

The values of this MTF(v) are converted into codes, and information directly representing a frequency response characteristic is prepared.

Now, an MTF(v) curve obtained by the above-mentioned method is shown in FIG. 1 with a sign a attached in the drawing.

Next, a supplementary explanation will be given for a compensation method of a frequency response characteristic.

A compensation of a frequency response characteristic is to change the shape of an MTF(v) curve, and it includes cutting or increasing of the response at a specified frequency band.

In particular, "to correct the difference in the frequency response characteristic between image-capturing device" set forth in the features (15), (27), (40), (61), and (81) means to set the MTF(v) of a predetermined image-capturing device as the reference, and apply a processing to make the above-mentioned MTF(v) previously calculated for each image-capturing device agree with the reference.

Further, the term "to transform a frequency response characteristic into a standard frequency response" set forth in the features (16), (28), (41), (62), and (82) means to carry out a processing to make the above-mentioned MTF(v) calculated previously for each image-capturing device agree with a virtual reference MTF(v) which has been previously set.

The term "a frequency response characteristic in which resolution vs. frequency changes linearly" set forth in the features (17), (29), (42), (63), and (83) means a frequency response characteristic represented, for example, by the MTF(v) curve shown in FIG. 1 with a sign b attached in the drawing.

The term "a frequency response characteristic such that resolution vs. varies in accordance with the visual characteristic of the human eyes" set forth in the features (18), (30), (43), (64), and (84) means to make, for example, the above-mentioned virtual reference MTF(v) which has been previously set be an MTF(v) approximating the visual characteristic of the human eyes.

An explanation concerning the above-mentioned MTF(v) of the human visual sensation (hereinafter referred to as the VTF(v)) is described, for example, in "Fine Imaging and Digital Photography" p. 382, edited by the publishing committee of The Society of Photographic Science and Technology of Japan.

Figure 2:
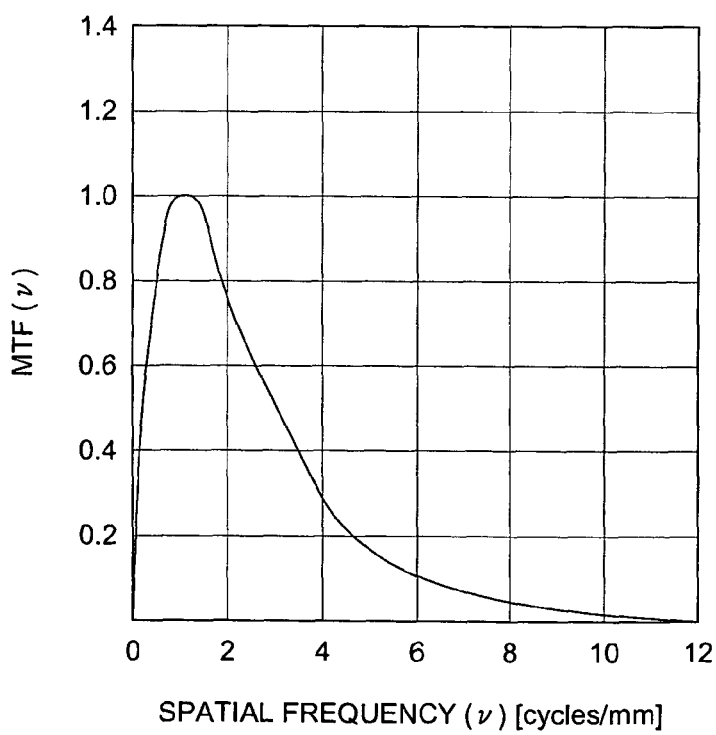
FIG. 2 is graph showing the relation between the spatial frequency and the MTF value.

Now, VTF(v) at the observation distance 300 mm is shown in FIG. 2.

The sentence "the information on the aforesaid model frequency characteristic is obtained from the aforesaid captured-image data" set forth in the feature (13) is based on it that the model frequency response information is recorded as tag information written at the header part in the captured-image data. As regards such a data format, for example, Baseline Tiff Rev. 6. ORGB Full Color Image adopted as a non-compressed file of an Exif file and a compressed data file format based on a JPEG format are known.

In the mode of practice where model frequency response information is reserved in a recording medium independently of captured-image data, it is necessary to give some information for correlating both of them with each other one or both of the model frequency response information and the captured-image data, or to attach a status information file in which relating information is described separately.

As regards the frequency response characteristic of image-capturing device, the setting changes remarkably from one apparatus to another; because it is difficult to estimate this at a high accuracy, in this invention, it is put into practice to use model frequency response information in frequency transformation processing. As the result of it, in the state of this scene-referred frequency characteristic, captured-image data of one and the same photographic object, by whatever image-capturing device they may be obtained, come to have approximately the same frequency characteristic.

The "model gradation reproduction characteristic information (model gradation characteristic information)" is data to make it possible to practice the compensation for the model gradation reproduction characteristic of each image-capturing device, and information directly representing the gradation characteristic, or the name, mark, code, or the like of a model for identifying an image-capturing device.

The model gradation reproduction characteristic information is inputted manually by an operator or automatically by the use of information recorded in the captured-image data only, to an image processing apparatus or an image recording apparatus practicing this process.

In the mode of practice where model gradation reproduction characteristic information is the name, mark, or code of a model for identifying an image-capturing device, and is automatically inputted, it is necessary that an image processing apparatus or an image recording apparatus to practice this processing keeps a correspondence table between the name of models and gradation characteristics. This correspondence table need not be stored directly in a storage device of the image processing apparatus, but a mode of practice in which the table is read out from a server at a remote site connected through a network may be also appropriate.

The sentence "the information on the model gradation reproduction characteristic is obtained from the above-mentioned captured-image data" set forth in the feature (14) is based on it that the information on the model gradation reproduction characteristic is recorded as tag information written at the header part in the captured-image data. As regards such a data format, for example, Baseline Tiff Rev. 6. ORGB Full Color Image adopted as a non-compressed file of an Exif file and a compressed data file format based on a JPEG format are known.

In the mode of practice where the information on the model gradation reproduction characteristic is reserved in a recording medium independently of captured-image data, it is necessary to give some information for correlating both of them with each other one or both of the model gradation reproduction characteristic information and the captured-image data, or to attach a status information file in which relating information is described separately.

"Scene-referred gradation characteristic" means, in the scene-referred image data, the gradation characteristic of the image data in the state where the application of gradation transformation processing is particularly omitted among the image processings to alter the data content for improving the effect at the time of appreciation of the image.

As regards the gradation characteristic of image-capturing device, the setting changes remarkably from one apparatus to another; because it is difficult to estimate this at a high accuracy, in this invention, it is put into practice to use model gradation reproduction characteristic information in gradation transformation processing. As the result of it, in the state of this scene-referred gradation characteristic, captured-image data of one and the same photographic object, by whatever image-capturing device they may be obtained, have approximately the same gradation characteristic.

Further, according to the invention set forth in the features (1) to (6), by the application of a transformation processing into the scene-referred gradation characteristic and that into the scene-referred frequency characteristic to captured-image data, scene-referred image data can be reproduced from the captured-image data. Accordingly, in this state of scene-referred image data, the captured-image data of one and the same photographic object, by whatever image-capturing device they may be obtained, are to exhibit approximately the same gradation characteristic and frequency characteristic.

Further, it is desirable that, as the invention set forth in the features (87) to (91), a transformation processing into the scene-referred color space characteristic is applied to captured-image data together with a transformation processing into the scene-referred gradation characteristic and that into the scene-referred frequency characteristic.

The inventors of this invention recognize that there is a problem that, in a close-up photograph of a person wearing red or green clothes, in a photograph with a lawn or woods taken as the background, or in a close-up photograph of a flower, adjustment error of white balance tends to occur.

Digital cameras practice a processing to selectively enhance the chroma of specified colors such as red and green. It is inferred that, in the case where only the model gradation reproduction characteristic profile produced from a gray patch as disclosed, for example, in the publication of the unexamined patent application 2002-16807 is applied, the color domain after the chroma enhancement does not become of a proper scene-referred gradation characteristic, and this produces an adjustment error of white balance is produced.

"Scene-referred color space characteristic" means, in the scene-referred image data, the frequency characteristic of the image data in the state where the mapping processing into a standard color space such as RIMM RGB or ERIMM RGB and a chroma enhancement processing are particularly omitted among the image processings to alter the data content for improving the effect at the time of appreciation of the image.

It is also appropriate, as the invention set forth in the features 92 to 96, to use model color characteristic information in the transformation processing into the scene-referred color space characteristic in the same way as the transformation processing into the scene-referred gradation characteristic.

"Model color characteristic information" is data to make it possible to practice the compensation for the model color characteristic of each image-capturing device, and it is information directly representing the color characteristic, or the name, mark, or code of a model for identifying an image-capturing device.

The model color characteristic information is inputted manually by an operator or automatically by the use of information attached to the captured-image data only, to an image processing apparatus or an image recording apparatus practicing this process.

In the mode of practice where model color characteristic information is the name, mark, or code of a model for identifying an image-capturing device, and is automatically inputted, it is necessary that an image processing apparatus or an image recording apparatus to practice this processing keeps a correspondence table between the name of models and color characteristics. This correspondence table need not be stored directly in a storage device of the image processing apparatus, but a mode of practice in which the table is read out from a server at a remote site connected through a network may be also appropriate.

"Model color characteristic information is attached to captured-image data" means that model characteristic information is recorded as tag information written at the header part in the captured-image data. As regards such a data format, for example, Baseline Tiff Rev. 6. ORGB Full Color Image adopted as a non-compressed file of an Exif file and a compressed data file format based on a JPEG format are known.

In the state of mode where model color characteristic information is reserved in a recording medium independently of model frequency response information, model gradation reproduction characteristic information, and captured-image data, it is necessary that the information which correlates the model color characteristic information to the other information or a status information file in which relating information is attached to any one of the model frequency response information, model gradation reproduction characteristic information, and captured-image data, or to one of information group of the model frequency response information, model gradation reproduction characteristic information, and captured-image data.

In the case where model gradation reproduction characteristic information is produced by the use of a gray patch, it is desirable that the difference between image-capturing device is corrected first in color characteristic, and then in gradation characteristic. As regards another way, it is possible to carry out the compensation of color space characteristic and gradation characteristic in one step by producing model gradation reproduction characteristic information for each hue angle from the result of the actual photographing of a chart such as a Munsell color chart.

The content of description in the features (7) to (12), (53) to (58), and (73) to (78) means that, in the process of generating the viewing image referred image data, the captured-image data are not actually transformed into the scene-referred image data, and instead of generating the scene-referred image data, they are subjected to an operation processing so as to obtain the targeted frequency characteristic on the output medium.

A frequency characteristic which is subjectively desirable on an output medium (hereinafter referred to as "a target frequency characteristic") can be forecast on the basis of the conditions set beforehand.

For the factors influencing this target frequency characteristic, the following items can be cited for example.
1. Kind of the output medium,
2. Size of the output medium,
3. Size of the main photographic object, for example, the size of the face of a person,
4. Result of scene discrimination, for example, the kind of the main photographic object and the composition of the scene.

In contrast with this, concerning the output in the state without compensation, the frequency characteristic on an output medium is a frequency characteristic which is determined by the kind of the image-capturing device and output device (hereinafter referred to as "an equipment frequency characteristic").

In order to correct the difference between a target frequency and an equipment frequency, a method in which image data obtained through the compensation of the difference in frequency response characteristic between image-capturing device (scene-referred image data) is once produced as interim image data, and a method in which final output image data (viewing image referred image data) only are obtained by the practice of the operation processing only without producing interim image data can be considered, and the invention (described in the features (7) to (12), (53) to (58), and (73) to (78)) corresponds to the latter case.

Now, an image forming method of this invention as set forth in the feature (19) will be explained in detail.

It is desirable that the image forming method set forth in the feature (19) consists of at least 3 steps, which are the first step to make the compensation for the transformation characteristic which is specific to the image-capturing device, the second step for practicing an exposure control processing and a gray balance adjustment processing, and the third step for practicing a gradation compensation processing. Further, it is desirable that a processing to alter the frequency characteristic suitable for producing a picture is practiced in a process other than the above-mentioned first step.

The above-mentioned first step is a transformation process to transform inputted viewing image referred image data into scene-referred image data, the second step has both the aspects of a transformation process into scene-referred image data for achieving the equality of image data by the removal of difference between image-capturing device and a transformation process into viewing image referred image data for making the image quality desirable for appreciation on an output medium, and perform a role of bridging between the first step and the third step. The third step is a transformation process into viewing image referred image data for making the image quality desirable for appreciation on an output medium.

The term "exposure control processing" means a processing to correct the brightness of the whole captured-image data. Although captured-image data is equalized through correcting the way of expressing the photographic object information which is peculiar to each image-capturing device by the first step, the brightness becomes different even with an exposure control practiced, owing to the dispersion of exposure caused by the performance of AE of each image-capturing device and the difference of manual setting by the photographing person.

The term "gray balance adjustment processing" means a processing to correct the color bias of captured-image data as a whole. Although captured-image data is equalized through the compensation of the way expressing the photographic object information which is peculiar to each image-capturing device by the first step, the color bias becomes different even with a gray balance control (for example, color temperature control of the light source for appreciation) practiced, owing to the dispersion of white balance caused by the performance of AWB of each image-capturing device and the difference of manual setting by the photographing person.

As regards the AE processing and AWB processing in the above-mentioned second step, it is desirable a mode of practice in which exposure and white balance are adjusted at the same time by an input-output conversion table (hereinafter referred to also as an "LUT") set for each of the colors R, G, and B. To state it concretely, while the gray balance is adjusted by it that the LUTs of the respective colors R, G, and B are moved parallel separately, the brightness is adjusted by the parallel movement at the same time.

The term "gradation compensation processing" means a processing to adjust the gradation of an image to become desirable for appreciation on a display device such as a CRT, a liquid crystal display, a plasma display, or the like, and an output medium such as a silver halide photographic paper, an ink jet paper, a thermal print paper, or the like. To state it concretely, it includes a non-linear compensation processing, a γ compensation processing, etc. to be described below.

As described in the feature (20), it is desirable that the gradation compensation processing in the third step includes a non-linear compensation processing, and also it is desirable that the third step consists of the two steps, which are a step to correct γ and a step to practice a non-linear processing, and γ is corrected at first.

The term "non-linear processing" means a processing to suppress the whitening at a highlight portion and the fill-in at a shadow portion of an image resulting, for example, from the reproduction density range of the output medium being narrow, by correcting the highlight portion and the shadow portion in a non-linear way. It is desirable that the amount of compensation is obtained in a way described below to be reflected in the compensation curve: In the case where the density of a print is raised by the second step (AE/AWB processing), the tone in the highlight side is made harder, and at the same time the tone in the shadow side is made softer; on the contrary, in the case where the density of a print is lowered by the second step, the tone in the highlight side is made softer, and at the same time the tone in the shadow side is made harder.

The term "to correct γ" means to correct γ in such a way as to make the gradation curve become the reference gradation curve determined for each output medium. In this description, in the case where the output medium is, for example, a silver halide photographic paper, the reference gradation curve is an S-shaped curve, and at its middle part, the γ value is set at 1.6. Such a processing of this invention as to aim at making the tone harder to have a better appearance of the printer output is called "γ compensation processing".

Next, supplementary explanation of the image processing set forth in the features (21), (22), (23), and (24), and the image recording apparatus set forth in the features (34), (35), (36), and (37) will be given.

An image recording apparatus is an image processing apparatus further being equipped with means for forming an image for viewing on an output medium. For this means for forming an image, for example, means of methods such as an ink jet, CRT, laser, thermal, and sublimation method can be cited.

The term "storage means for storing the model frequency response information of each model of image-capturing device" means a compact flash (registered trade mark), a memory stick (registered trade mark), a smart media (registered trade mark), a multi-media card (registered trade mark), a hard disk, a floppy (registered trade mark) disk, a magnetic recording medium (MO), or a CD-R; any one will be appropriate. Further, a unit for writing data on a recording medium may be of any one of the following modes of practice: A unit integrally built with the image-capturing device, a writing unit wire-connected with the image-capturing device through a cord, an independent unit wireless-connected through wireless communication or the Internet, and a unit placed at a remote site.

In the case where information representing the model of an image-capturing device is inputted, a program or a processing circuit for practicing the functions respectively based on the two kinds of method, manual/automatic methods described below is available. One of said functions based on two methods respectively is a function for an operator to select the name of an image-capturing device by means of a touch panel or a keyboard in accordance with the GUI (Graphical User Interface) screen displayed on a CRT display monitor, or to manually input the number, mark, and code, etc. of an image-capturing device, and the other is a function to automatically input the information by the use of information stored in the captured-image data only.

In the case where information stored in the captured-image data is used, there are functions respectively based on the two methods, method of the same file and method of separate files described below; one of these is a function to automatically input the information by a method in which the information is recorded as tag information written at the header part in the captured-image data, and the other is a function to automatically input the information by a method in which a status information file indicating the correlation between the information representing the model of the image-capturing device and the corresponding captured-image data is attached.

In the case where the above-mentioned information representing the model of an image-capturing device is a number, a mark, a code, or the like, it is necessary to keep a table indicating the correspondence of it to the name of the model. This correspondence table need not be stored directly in a storage device in the image-capturing device, but also it is appropriate a mode of practice in which the table is read out from a server at a remote site connected through a network.

For the data format in which the above-mentioned information representing the model of an image-capturing device is recorded as tag information written at the header part in the captured-image data, for example, Baseline Tiff Rev. 6. ORGB Full Color Image adopted as a non-compressed file of Exif file and a compressed data file format based on JPEG format are known.

The term "frequency characteristic compensation means" means a program or a processing circuit for practicing the function to transform the frequency characteristic of captured-image data into the scene-referred frequency characteristic.

The term "frequency characteristic compensation means" set forth in the features (21), (22), (34), and (35) means a program or a circuit for practicing the function selecting the model frequency response characteristic information (model frequency characteristic information) corresponding to the model of an image-capturing device from the storage means, correcting the captured-image data with respect to the model frequency response of the image-capturing device by the use of said selected information, and transforming the frequency characteristic of the image data into the scene-referred frequency characteristic.

Further, model frequency response characteristic information need not be stored directly in a storage device in the image-capturing device, but also it is appropriate a mode of practice in which the information is read out from a server at a remote site connected through a network.

Further, as described in the features (26) and (39), model frequency response characteristic information may be information a part or the whole of which is recorded in captured-image data.

In the case where model frequency response characteristic information is information is information recorded in captured-image data, there are two functions respectively based on the two kinds of method, a method of the same file and a method of separate files described below; one of these is a function to automatically input the information by a method in which the frequency response characteristic information is recorded at the header part in the captured-image data as tag information, and the other is a function to automatically input the information by a method in which a status information file indicating the correlation of the model frequency response characteristic information with the corresponding captured-image data is attached.

For the data format in which the model frequency response characteristic information is recorded as tag information written at the header part in the captured-image data, for example, Baseline Tiff Rev. 6. ORGB Full Color Image adopted as a non-compressed file of Exif file and a compressed data file format based on JPEG format are known.

The term "gradation characteristic compensation means" set forth in the features (22) and (35) means a program or a circuit for practicing the function selecting the model gradation reproduction characteristic information corresponding to the model of an image-capturing device from the storage means, correcting the captured-image data with respect to the model gradation reproduction characteristic of the image-capturing device by the use of said selected information, and transforming the gradation characteristic of the image data into the scene-referred gradation characteristic.

Further, model gradation reproduction characteristic information need not be stored directly in a storage device in the image-capturing device, but also it is appropriate a mode of practice in which the information is read out from a server at a remote site connected through a network.

Further, as described in the features (25) and (38), model gradation reproduction characteristic information may be information a part or the whole of which is recorded in captured-image data.

In the case where model gradation reproduction characteristic information is information recorded in captured-image data, there are two functions respectively based on the two kinds of method, a method of the same file and a method of separate files described below; one of these is a function to automatically input the information by a method in which the gradation characteristic information is recorded at the header part in the captured-image data as tag information, and the other is a function to automatically input the information by a method in which a status information file indicating the correlation of the model gradation reproduction characteristic information with the corresponding captured-image data is attached.

For the data format in which the model gradation reproduction characteristic information is recorded as tag information written at the header part in the captured-image data, for example, Baseline Tiff Rev. 6. ORGB Full Color Image adopted as a non-compressed file of Exif file and a compressed data file format based on JPEG format are known.

The content of description in the features (23), (24), (36), and (37) means that, in the process of generating the viewing image referred image data, the captured-image data are not actually transformed into the scene-referred image data, and instead of it, they are subjected to an operation processing so as to obtain the target frequency characteristic to make the image quality desirable on the output medium at the time of appreciation.

The invention set forth in the features (47) to (66) is a recording medium having a program for actualizing an image processing method of this invention as set forth in the features (1) to (20) recorded, a compact flash (registered trade mark), a memory stick (registered trade mark), a smart media (registered trade mark), a multi-media card (registered trade mark), a hard disk, a floppy (registered trade mark) disk, a magnetic recording medium (MO), or a CD-R; any one will be appropriate. Further, a unit for utilizing information on the recording medium may be of any one of the following modes of practice: A unit integrally built with the image-capturing device, a writing unit wire-connected with the image-capturing device through a cord, an independent unit wireless-connected through wireless communication or the Internet, and a unit placed at a remote site.

The invention set forth in the features (67) to (86) is a program for actualizing an image processing method of this invention set forth in the features (1) to (20), and is preserved in a recording medium of the invention set forth in the features (47) to (66).

EMBODIMENT OF THE INVENTION

In the following, suitable embodiment of an image processing apparatus and an image recording apparatus of this invention will be explained.

In addition, the model gradation/frequency characteristic profile 103c actualizes the function which the storage means set forth in the features of this invention comprises, a compensation processor for model gradation reproduction characteristic 103a actualizes the function which the gradation characteristic compensation means and the pre-processing condition generating means for practicing the pre-processing to transform the gradation characteristic into the scene-referred gradation characteristic comprise, a model color characteristic compensation processor 103d actualizes the function which the color characteristic compensation means comprises, a correction processor for model frequency response characteristic 104 (a compensation processor for model frequency characteristic 104) actualizes the function which the acquisition means, frequency characteristic compensation means, and pre-processing condition generating means for practicing the pre-processing to transform the frequency characteristic into the scene-referred frequency characteristic comprise, an viewing image referred image data generator 107 actualizes the function which the optimizing condition calculating means, the output condition calculating means, and the image data generating means comprise, and a controller 207 actualizes the function which the control means comprises.

(Image Processing Apparatus 117)

Figure 3:
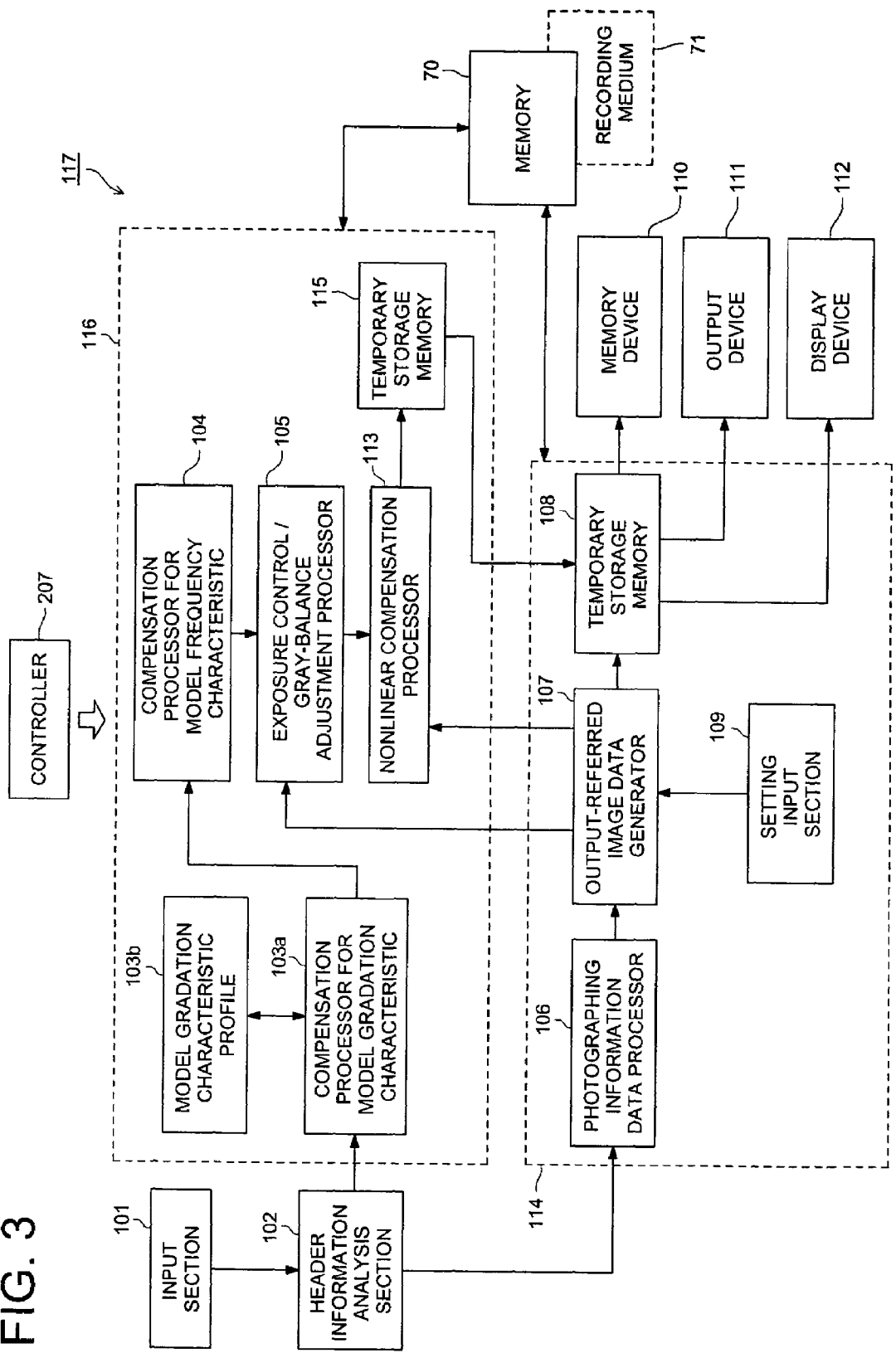
FIG. 3 is a functional block diagram of an image processing apparatus to which this invention is applied.

First, the structure of an image processing apparatus 117 to which this invention is applied will be explained. FIG. 3 is a functional block diagram of the image processing apparatus in this embodiment of the invention.

The image processing apparatus 117 is equipped with an input section 101 for reading out captured-image data from a recording medium and a header information analysis section 102 for analyzing the header information of captured-image data. In this description, a recording medium is, for example, a compact flash (registered trade mark), a memory stick (registered trade mark), a smart media (registered trade mark), a multi-media card (registered trade mark), a hard disk, a floppy (registered trade mark) disk, a magnetic recording medium (MO), or a CD-R; any one will be appropriate.

The image processing apparatus 117 is equipped with an image processor 116 and an viewing image referred image data generation condition determining section 114; to each of the image processor 116 and the viewing image referred image data generation condition determining section 114, the header information analysis section 102 is connected, and it is possible to connect a storage device 110, an output device 111, and a display device 112 to the viewing image referred image data generation condition determining section 114.

The image processing apparatus 117 is equipped with the controller 207, and practices a program recorded in a storage 70 or storage 71. The image processing apparatus 117 practices a program stored in the storage 70 or in the storage 71 for carrying out the processings shown in the flow chart of FIG. 11 to FIG. 14.

The input section 101 reads out captured-image data stored in a recording medium, and the header information analysis section 102 separates input data into captured-image data, information attached to said captured-image data representing the model of an image-capturing device, and photographing information data.

The image processor 116 has a structure equipped with a compensation processor for model gradation reproduction characteristic 103a, a compensation processor for model frequency response 104, an exposure control/gray balance adjustment processor 105, a non-linear compensation processor 113, and a temporary storage 115.

The compensation processor for model gradation reproduction characteristic 103a determines compensation processing conditions for model gradation reproduction characteristic with reference to a model gradation reproduction characteristic profile 103b on the basis of information representing the model of an image-capturing device inputted from the header information analysis section 102. The compensation processor for model gradation reproduction characteristic 103a carries out compensation processing for model gradation reproduction characteristic to generate scene-referred image data on the basis of said compensation processing conditions for model gradation reproduction characteristic.

In addition, the information representing the model of an image-capturing device is not limited to the information inputted from the header information analysis section 102, but may be one directly inputted by an operator.

The compensation processor for model frequency response 104 generates scene-referred image data having been subjected to a compensation processing for model frequency response characteristic from the aforesaid scene-referred image data generated. The exposure control/gray balance adjustment processor 105 applies an exposure control/gray balance adjustment processing to said scene-referred image data generated, and the non-linear compensation processor 113 applies a non-linear compensation processing to scene-referred image data having been subjected to said exposure control/gray balance adjustment processing. The temporary storage 115 temporarily stores the scene-referred image data having been subjected to said non-linear compensation processing (viewing image referred image data).

The viewing image referred image data generation condition determining section 114 has a structure equipped with a photographing information data processor 106, the viewing image referred image data generator 107, a temporary storage 108, and a setting input section 109.

The photographing information data processor 106 determines the generation condition of viewing image referred image data on the basis of photographing information data inputted from the header information analysis section 102.

Operation information on the kinds of a storage device 110 for outputting digital image data inputted from the setting input section 109, an output device 111, and a display device 112 is sent to the viewing image referred image data generator 107.

The viewing image referred image data generator 107 determines generation conditions of final viewing image referred image data on the basis of the generation conditions of viewing image referred image data determined by the photographing information data processor 106 and the operation information on the kinds of the storage device 110, the output device 111, and the display device 112 inputted from the setting input section 109.

The viewing image referred image data which have been generated by the image processor 116 and temporarily stored in the temporary storage 115 are temporarily preserved in the temporary storage 108, and are outputted to any one of the storage device 110, the output device 111, and the display device 112 on the basis of the operation information inputted from the setting input section 109.

(Image Processing Apparatus 117*a*)

Figure 4:
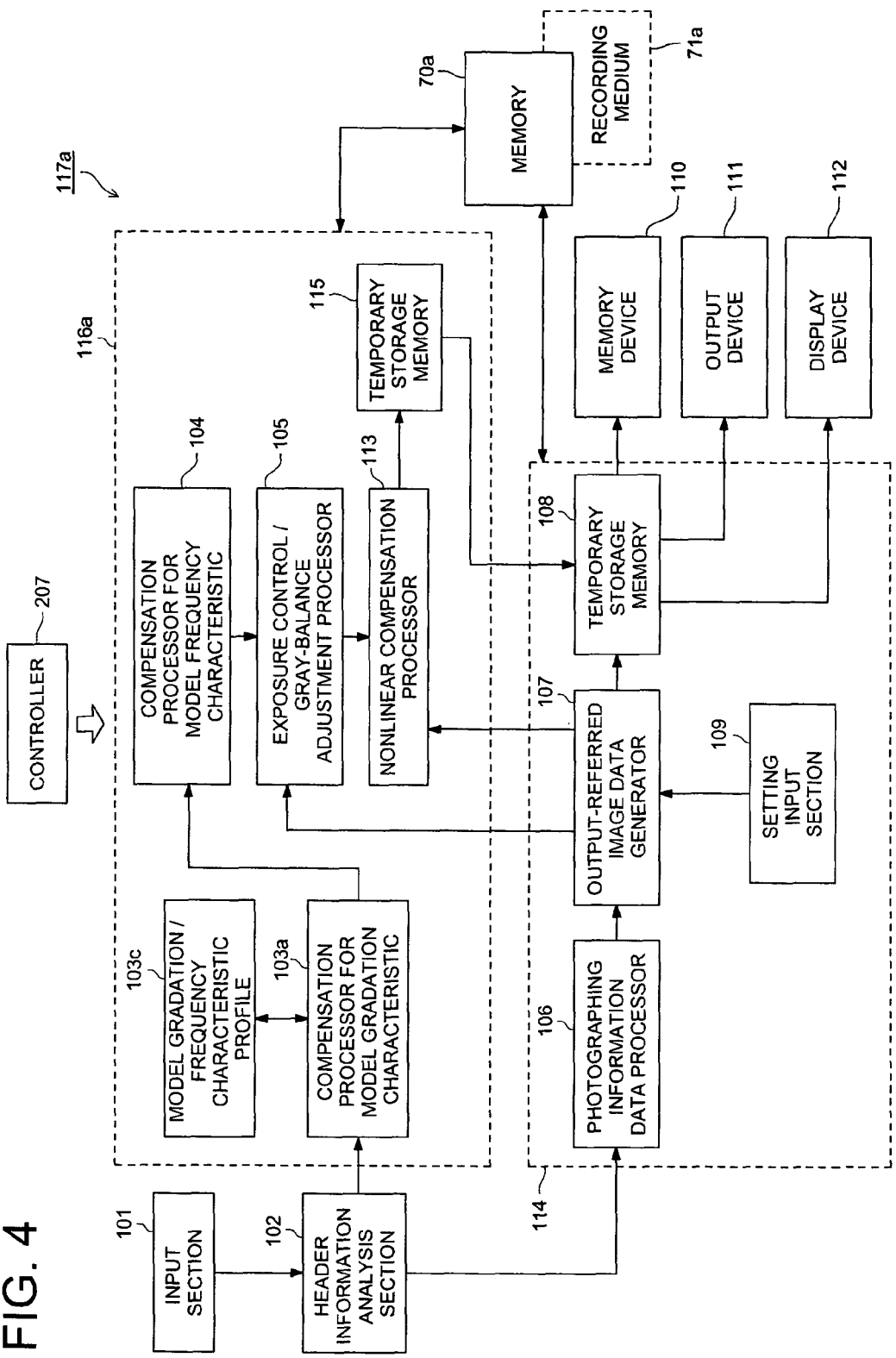
FIG. 4 is a functional block diagram of an image processing apparatus to which this invention is applied.

Up to now, the image processing apparatus 117 has been explained as a suitable example of the embodiment of this invention; however, this invention is not limited to this, but can be also applied to an image processing apparatus 117*a* shown in FIG. 4.

In addition, for simplifying the drawings, as regards the same components as those in the image processing apparatus 117 among the components of the image processing apparatus 117*a* shown in FIG. 4, the same signs as those in the image processing apparatus 117 are attached to them, and only the components different from the image processing apparatus 117 will be explained in detail. In particular, the image processing apparatus 117*a* is equipped with an image processor 116*a* comprising a model gradation/frequency characteristic profile 103*c* instead of the model gradation reproduction characteristic profile 103*b* of the image processing apparatus 117.

The image processor 117*a* is equipped with a controller 207, and practices a program recorded in a storage 70*a* or in a storage 71*a*. In particular, the image processing apparatus 117*a* practices a program stored in the storage 70*a* or in the storage 71*a* for carrying out the processings shown in the flow charts of FIG. 15 to FIG. 18.

A compensation processor for model gradation reproduction characteristic 103*a* determines compensation processing conditions for model gradation reproduction characteristic, with reference to the model gradation/frequency characteristic profile 103*c*, on the basis of information representing the model of an image-capturing device.

The compensation processor for model gradation reproduction characteristic 103*a* carries out a compensation processing for model gradation reproduction characteristic to generate scene-referred image data, on the basis of the above-mentioned compensation processing conditions for model gradation reproduction characteristic.

A compensation processor for model frequency response 104 determines compensation processing conditions for model frequency response, with reference to the model gradation/frequency characteristic profile 103*c*, on the basis of the above-mentioned scene-referred image data.

The compensation processor for model frequency response 104 applies a compensation processing for model frequency response to the scene-referred image data, to generate scene-referred image data having been subjected to a compensation processing for model frequency response characteristic, on the basis of the above-mentioned compensation processing conditions for model frequency response characteristic determined.

An exposure control/gray balance adjustment processor 105 applies an exposure control/gray balance adjustment processing to scene-referred image data having been subjected to the above-mentioned compensation processing for model frequency response characteristic, and a non-linear compensation processor 113 applies a non-linear compensation processing to the scene-referred image data having been subjected to said exposure control/gray balance adjustment processing.

A temporary storage 115 stores temporarily the scene-referred image data having been subjected to the non-linear compensation processing by the non-linear compensation processor 113 (viewing image referred image data).

(Image Processing Apparatus 117*b*)

Figure 5:
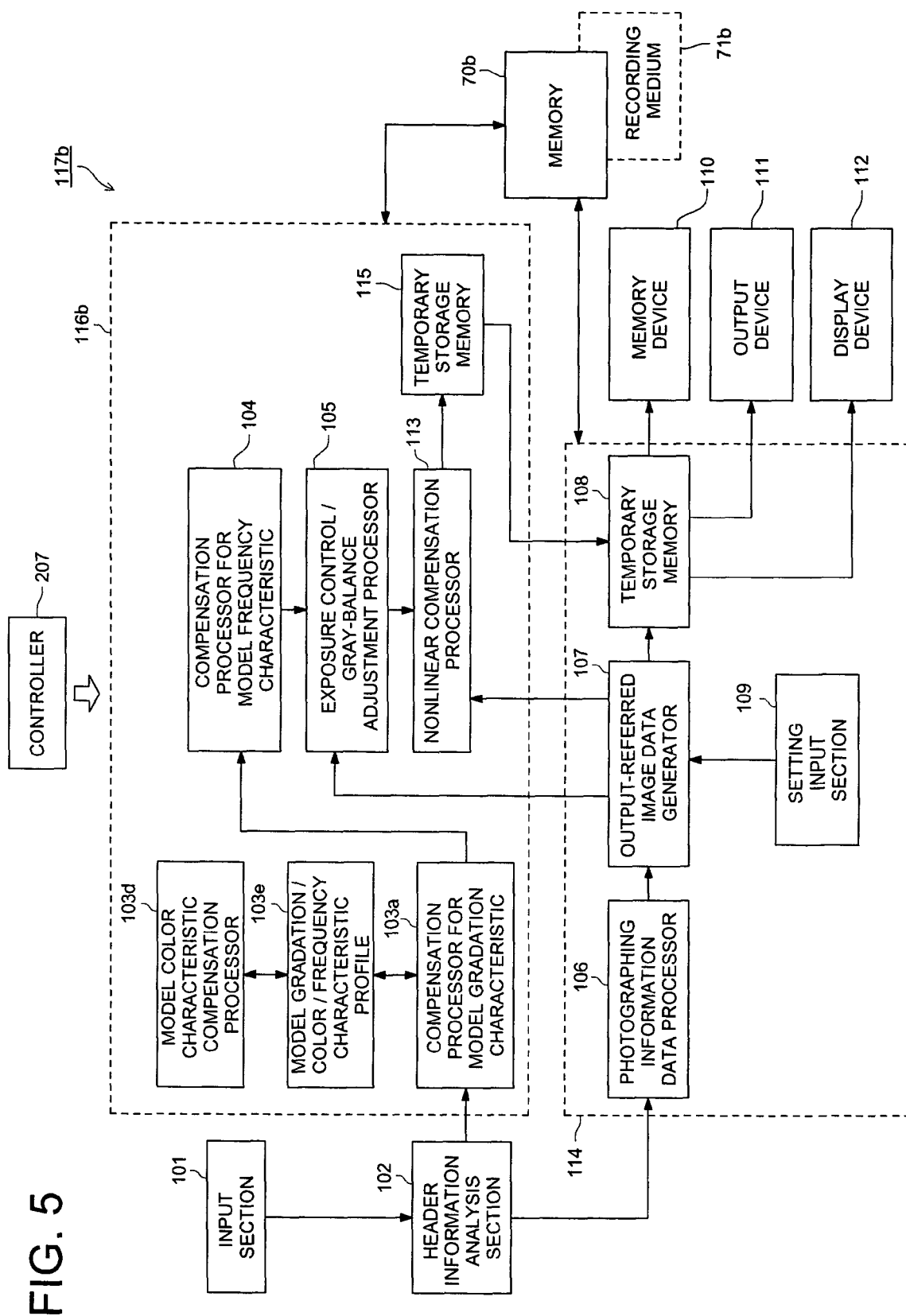
FIG. 5 is a functional block diagram of an image processing apparatus to which this invention is applied.

Further, this invention can be applied to an image processing apparatus 117*b* shown in FIG. 5.

In addition, for simplifying the drawings, as regards the same components as those in the image processing apparatus 117 and 117*a* among the components of the image processing apparatus 117*b* shown in FIG. 5, the same signs are attached to them, and only the components different from the image processing apparatus 117 or 117*a* will be explained in detail.

The image processor 117*b* is equipped with a controller 207, and practices a program recorded in a storage 70*b* or in a storage 71*b*. In particular, the image processing apparatus 117*b* practices a program stored in the storage 70*b* or in the storage 71*b* for carrying out the processings shown in the flow charts of FIG. 19 and FIG. 20.

A compensation processor for model gradation reproduction characteristic 103*a* determines compensation processing conditions for model gradation reproduction characteristic, with reference to a model gradation/color/frequency characteristic profile 103*e*, on the basis of information representing the model of an image-capturing device.

A compensation processor for model color characteristic 103*d* determines compensation processing conditions for model color characteristic, with reference to the model gradation/color/frequency characteristic profile 103*e*, on the basis of information representing the model of an image-capturing device.

The compensation processor for model gradation reproduction characteristic 103*a* carries out a compensation processing for model gradation reproduction characteristic to generate scene-referred image data, on the basis of the above-mentioned compensation processing conditions for model gradation reproduction characteristic.

In parallel with this processing, the compensation processor for model color characteristic 103*d* carries out a compensation processing for model color characteristic to generate scene-referred image data on the basis of the above-mentioned compensation processing conditions for model color characteristic.

A compensation processor for model frequency response characteristic 104 determines compensation processing conditions for model frequency response, with reference to the model gradation/color/frequency characteristic profile 103*e*, on the basis of the above-mentioned scene-referred image data generated.

The compensation processor for model frequency response characteristic 104 applies a compensation processing for model frequency response characteristic to the scene-referred image data transmitted from the compensation processor for model gradation reproduction characteristic 103*a* and the compensation processor for model color characteristic 103*d*, to generate the scene-referred image data having been subjected to the compensation processing for model frequency response, on the basis of the above-mentioned compensation processing conditions for model frequency response characteristic determined.

An exposure control/gray balance adjustment processor 105 applies an exposure control/gray balance adjustment processing to the scene-referred image data having been subjected to the above-mentioned compensation processing for model frequency response characteristic, and a non-linear compensation processor 113 applies a non-linear compensation processing to the scene-referred image data having been subjected to said exposure control/gray balance adjustment processing.

A temporary storage 115 stores temporarily the scene-referred image data having been subjected to the non-linear compensation processing by the non-linear compensation processor 113 (viewing image referred image data).

(Image Recording Apparatus 201)

Figure 6:
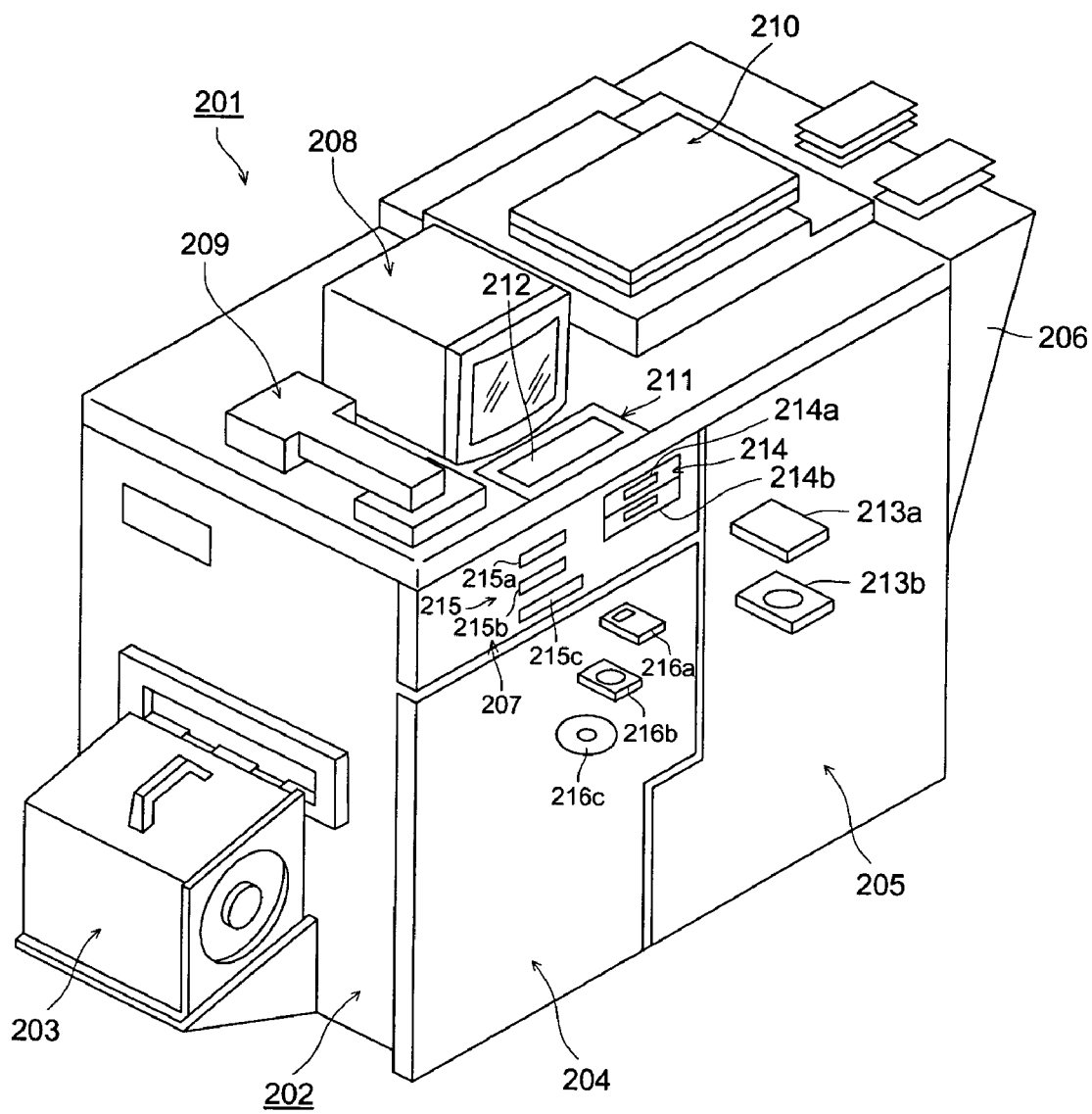
FIG. 6 is a perspective view showing the outside of an image recording apparatus to which this invention is applied.
Figure 7:
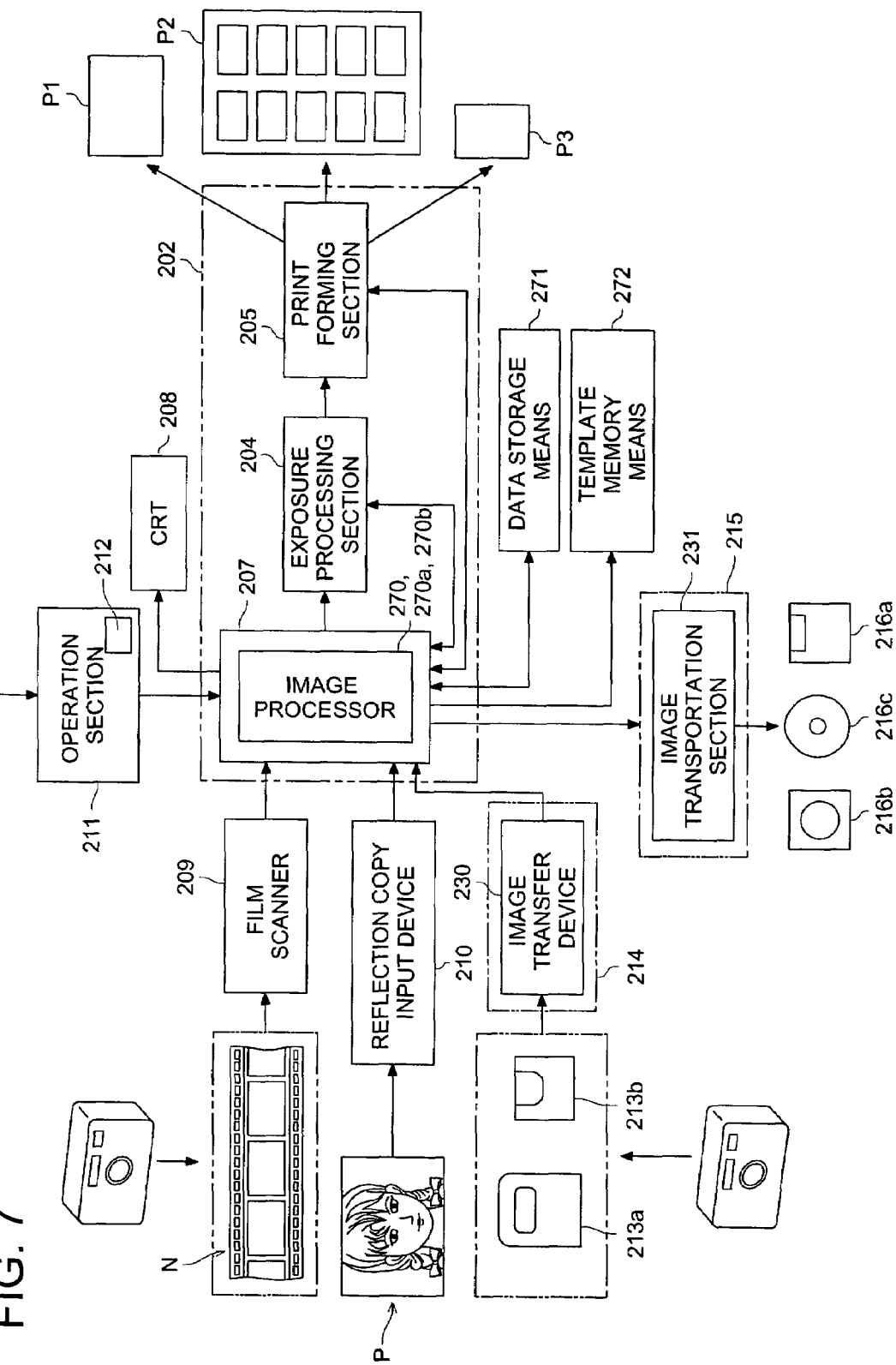
FIG. 7 is a functional block diagram of an image recording apparatus to which this invention is applied.

In the following, the structure of an image recording apparatus 201 to which this invention applied will be explained. FIG. 6 is a perspective view showing the appearance of the image recording apparatus 201, and FIG. 7 is a functional block diagram of the image recording apparatus 201.

The image recording apparatus 201 is equipped with a magazine loading part 203 at the left side of the mainframe 202, and in the inside of the mainframe 202, there are provided an exposure processing section 204 for applying an exposure to a silver halide photographic paper as an output medium, and a print forming section 205 for applying development processing to an exposed silver halide photographic paper sheet to produce prints. Prints produced are ejected onto a tray 206 provided at the right side of the mainframe 202.

Inside the mainframe 202, there is provided a control section 207 (refer to FIG. 7) at a position above the exposure processing section 204. Further, on the mainframe 202, a CRT 208 is disposed. The CRT 208 has a function to display an image whose print is to be produced on the screen.

At the left side of the CRT 208, a film scanner 209 as a transmission original reading apparatus is disposed, and at its right side, a reflection original input device 210 is disposed. For the original to be read from the film scanner unit 209 or from the reflection original input apparatus 210, photographic photosensitive materials can be cited.

For the photographic photosensitive materials, a color negative film, a color reversal film, a black-and-white negative film, a black-and-white reversal film, etc. can be cited, and frame image information photographed by an analog camera is recorded.

A film scanner in the film scanner unit 209 is capable of taking digital image data from an original and converting them into frame image data. Further, in the case where the photographic photosensitive material is a color paper, which is a silver halide photographic paper, original image information can be converted into frame image data by a flat-bed scanner in the reflection original input apparatus 210.

At the position of the controller 207 in the mainframe 202, there is provided an image data reading section 214. In the image data reading section 214, there are provided an adapter for PC card 214a and an adapter for floppy (R) disk 214b, which make it possible to load a PC card 213a and a floppy (R) disk 213b respectively.

The PC card 213a has a storage having a plurality of frames of image data picked up by a digital camera stored in it. The floppy (R) disk 213b stores a plurality of frames of image data picked up, for example, by a digital camera. At this side of the CRT 208, an operation section 211 is disposed, and in this operation section 211, there is provided an information input means 212, which is composed of a touch panel or the like, for example.

For other recording media, a multimedia card (registered trade mark), a memory stick (registered trade mark), an MD, a CD-R, etc. can be cited.

Further, the operation section 211, the CRT 208, the film scanner unit 209, the reflection original input device 210, and the image data reading section 214 has a structure that is integrally built with the mainframe 202, but it is also possible to have a structure such that any one or more of them are provided separately.

At the position of the controller 207 in the mainframe 202, an image writing section 215 is provided. In the image writing section 215, there are provided an adapter for FD 215a, an adapter for MO 215b, and an adapter for optical disk 215c. It is possible to write image information in an FD 216a, an MO 216b, and an optical disk 216c loaded in the respective adapters.

The controller 207 reads original information from the film scanner unit 209 or the reflection original input device 210 on the basis of instruction information from the information input means 212, and displays the image on the CRT 208.

The controller 207 comprises an image processor 270, which applies image processings to image data, generates image data for output, and transmits them to the exposure processing section 204. The exposure processing section 204 makes a photosensitive material exposed to an image, and sends this photosensitive material to the print forming section 205. The print forming section 205 applies development processing to the exposed photosensitive material and dries it, to produce prints P1, P2, and P3. The print P1 has the service size, the high-vision size, the panorama size, or the like, the print P2 has the A4 size, and the print P3 is a print of the calling card size or the like.

The image reading section 214 reads out the frame image data recorded in the PC card 213a or floppy (R) disk 213b. The image reading section 214 is equipped with an adapter for PC card 214a, an adapter for floppy (R) disk 214b, etc. as an image transfer means 230. The image reading section 214 reads frame image data from the PC card 213a loaded in the adapter for PC card 214a or from the floppy (R) disk 213b loaded in the adapter for floppy (R) disk 214b, and transfers them to the controller 207. For the adapter for PC card 214a, for example, a PC card reader, a PC card slot, etc. can be used.

The image writing section 215 is equipped with the adapter for FD 215a, the adapter for MO 215b, and the adapter for optical disk 215c, and the FD 216a, the MO 216b, and the optical disk 216c can be loaded in such a way as to enable data being written or read out.

A data accumulating means 217 stores image information and order information corresponding to said image information (information concerning how many prints are produced from which frame of image data, information on the print size, etc.) and accumulates them successively. The film scanner unit 209 inputs frame image data of a negative film N having been already developed, and the reflection copy input device 210 inputs frame image data of a print P obtained by a color paper being exposed to a frame image and subjected to development processing.

A template storage means 272 stores beforehand the data of at least one template for setting a composite area with a background image, an illustration image, or the like, which is a sample image, in correspondence to sample identification information D1 to D3. A frame image is combined with the designated template to become a composite image, and the sample image data based on the designated sample identification information D1 to D3 are combined with the image data and/or character data based on the order, to produce a print based on the designated sample. This image composition processing using a template is carried out by a well-known chroma key method.

Further, the image recording apparatus 201 has a structure such that sample identification information D1, D2, or D3 for designating the sample of a print is inputted from the operation section 211.

In the above, because the sample identification information D1, D2, or D3 is recorded beforehand in a print sample or in an order sheet, it is also possible to read the sample identification information D1, D2, or D3 by a reading means such as an OCR. In another way, it is also possible for an operator to directly input the sample identification information D1, D2, or D3 from a keyboard.

As described in the above, the image recording apparatus 201 records sample image data beforehand in correspondence to sample identification information D1, D2, or D3, selects the sample image data on the basis of the inputted sample identification information D1, D2, or D3, combines this selected sample image data with image data and/or character data based on the order to make a composite image, and produces a print based on the sample designated; therefore, it is possible for a user to order a print with various life-sized samples actually taken in his hand, and diversified request of wide ranging users can be answered.

Further, a communication means (not shown in the drawing) is provided in the image processor 270, which also makes it possible that image data representing a pickup image and an operation instruction such as printing are received from a computer located at a remote site through another computer in the same facilities, the Internet, or the like, and an image processing is practiced or a print is produced by a remote-control operation.

It is also possible to send image data having been subjected to an image processing of this invention and the supplementary order information, by the use of the above-mentioned communication means (not shown in the drawing) provided in the image processor 270, to a computer located at a remote site through another computer in the same facilities, the Internet, or the like.

As described in the above, the image recording apparatus 201 comprises an image data input means for taking image information recorded in various kinds of recording media and image information obtained through a scanning exposure of an image on an original document, an image processing means for processing the image data of an input image obtained from this image input means so as to give a good impression at the time of appreciation of the image, on the basis of the information on "the size of the output image" and "the size of the main photographic object in the output image", an image output means for carrying out the display of the processed image, the output of a print, writing in a recording medium, etc., and means for sending image data and the supplementary order information to another computer in the same facilities through a communication line, or to a computer located at a remote site connected through the Internet or the like.

(Image Processor 270)

Figure 8:
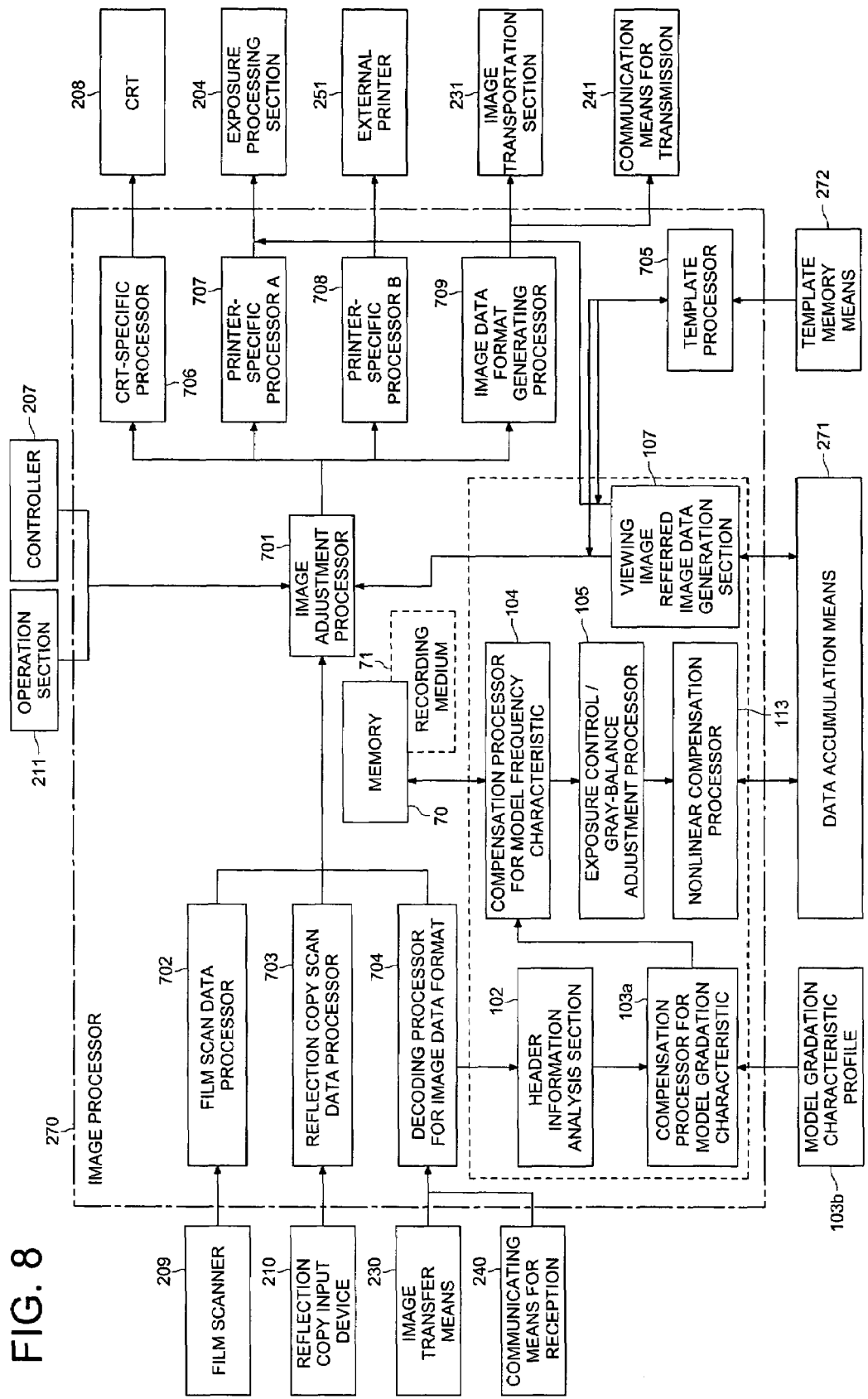
FIG. 8 is a functional block diagram of the image processing section shown in FIG. 7.

Next, the structure of the image processor 270 will be explained. FIG. 8 is a functional block diagram of the image processor 270.

In addition, for simplifying the illustration, among the structural components of the image processor 270 shown in FIG. 8, the same components as those in the image processing apparatus 117 shown in FIG. 3 are shown with the same sign attached.

The image processor 270 has a structure equipped with an image adjustment processor 701, a film scan data processor 702, a reflection copy scan data processor 703, a decoding processor for image data format 704, a template processor 705, a CRT-specific processor 706, a printer-specific processor A 707, a printer-specific processor B 708, and an image data format generating processor 709, together with a header information analysis section 102, a compensation processor for model gradation reproduction characteristic 103a, a compensation processor for model frequency response 104, an exposure control/gray balance adjustment processor 105, a photographing information data processor 106, and an viewing image referred image data generator 107 as comprised in the image processing apparatus 117 shown in FIG. 3.

Further, the image processor 270 is equipped with a storage 70 or a recording medium 71, which stores various kinds of program to be practiced by the controller 207. The storage 70 or the recording medium 71 particularly stores a program for carrying out the processings shown in the flow charts of FIG. 11 to FIG. 14.

The film scan data processor 702 applies processings such as a compensation operation peculiar to the film scanner, a negative-to-positive reversing in the case of a negative original, removal of dusts and damages, a gray balance adjustment, a contrast adjustment, removal of granular noises, and sharpness enhancement to image data inputted from the film scanner unit 209, and sends the data to the image adjustment processor 701. At the same time as this, the film size, whether the kind of the film is negative or positive, information concerning the main photographic object recorded optically or magnetically on the film, information concerning the photographing conditions (for example, the content of noted information in APS (Advanced Photo System)), etc. are sent to the image adjustment processor 701.

The reflection original scan data processor 703 applies processings such as a compensation operation peculiar to the reflection original input device, a negative-to-positive reversing in the case of a negative original, removal of dusts and damages, a gray balance adjustment, a contrast adjustment, removal of noises, and sharpness enhancement, to image data inputted from the reflection original input device 210, and sends the data to the image adjustment processor 701.

The decoding processor for image data format 704 carries out, as occasion demands, the decoding of compressed codes, the transformation of the representation method of color data, etc. for image data inputted from an image transfer means 230 and a communication means for reception 240, in accordance with the data format of said image data, to transform the data into data of a format suitable for an operation by the image processor 270, and sends the data to the image adjustment processor 701.

The designation concerning the size of an output image is inputted from the operation section 211, and in the case where a designation about the size of an output image to be sent to the communication means for reception 240 and a designation about the size of an output image embedded in the header information or tag information of image data obtained by the image transfer means 230 are made in addition to the above-mentioned designation, the decoding processor for image data format 704 detects this information and transfers it to the image adjustment processor 701.

At the time image data are inputted from the image transfer means 230 or the communication means for reception 240, when the coding processor for image data format 704 detects this, the header information analysis section 102 divides the image data into the viewing image referred image data concerned, the information representing the model of an image-capturing device attached to this viewing image referred image data, and the photographing information data.

The compensation processor for model gradation reproduction characteristic 103a determines compensation processing conditions for model gradation reproduction characteristic with reference to a model gradation reproduction characteristic profile 103b on the basis of information representing the model of an image-capturing device inputted from a header information analysis section 102. The compensation processor for model gradation reproduction characteristic 103a carries out compensation processing for model gradation reproduction characteristic to generate scene-referred image data in accordance with said compensation processing conditions for model gradation reproduction characteristic. The compensation processor for model frequency response characteristic 104 generates scene-referred image data having been subjected to a compensation processing for model frequency response characteristic on the basis of the aforesaid scene-referred image data generated through the application of compensation processing for model gradation reproduction characteristic. The exposure control/gray balance adjustment processor 105 applies an exposure control/gray balance adjustment processing to said scene-referred image data generated, and a non-linear compensation processor 113 applies a non-linear compensation processing to scene-referred image data having been subjected to said exposure control/gray balance adjustment processing, to generate viewing image referred image data. Said viewing image referred image data generated are once stored in a data accumulating means 271.

The image adjustment processor 701 transfers image processing conditions for producing viewing image referred image data adapted to the output device or output media to an viewing image referred image data generation section 107, on the basis of an instruction inputted from the operation section 211 and the control section 207. Then, the viewing image referred image data generation section 107 determines generation conditions of final viewing image referred image data, on the basis of photographing information data transmitted from the header information analysis section 102 and image processing conditions transmitted from the image adjustment processor 701.

The image adjustment processor 701, when a template processing is necessary, calls out a specified template from the template storage means 272, transfers it to the template processor 705 together with image data, and receives again the image data after template processing (composite image data combined with the template) from the template processor 705.

The image adjustment processor 701 applies image processing so as to give a good impression at the time of appreciation to the image data from the film scanner unit 209, the reflection original input device 210, the image transfer means 230, the communication means for reception 240, or the template processor 705, on the basis of an instruction inputted from the operation section 211 or the controller 207. The image adjustment processor 701 sends out digital image data for output after said image processing to the CRT-specific processor 706, the printer-specific processor A 707, the image data format generating processor 709, or the data accumulating means 271.

The CRT-specific processor 706 applies processings such as the alteration of the number of pixels and color matching as occasion demands to image data received from the image adjustment processor 701, and sends out composite image data for display combined with such information as control information requiring display to the CRT 208.

The printer-specific processor A 707 carries out compensation processing, color matching, alteration of the number of pixels, etc. specific to the printer as occasion demands, and sends out image data to the exposure processing section 204. In the case where an external printer apparatus 251 such as a large-size ink jet printer is connected with the image recording apparatus 201, the printer-specific processor B 708 is provided for each printer apparatus connected, to carry out compensation processing, color matching, alteration of the number of pixels, etc. specific to a suitable printer.

The image data format generating processor 709 applies a transformation processing into any one of various kinds of versatile image data format as represented by JPEG, TIFF, Exif, etc. to image data received from the image adjustment processor 701 as occasion demands, and transfers the image data to an image transport section 231 or a communication means for transmission 241.

Further, viewing image referred image data generated on the basis of conditions determined by the viewing image referred image data generator 107 are premised on the processing by the above-mentioned CRT-specific processor 706, printer-specific processor A 707, printer-specific processor B 708, or image data format generating processor 709. Especially, the image data format generating processor 709 attaches to image data a status file indicating that the image data are optimized for the CRT, the exposure output section, the external printer, the transmission, or the like, and transmits said image data to the above-mentioned image transport section.

The sections, namely, the film scan data processor 702, the reflection original scan data processor 703, the decoding processor for image data format 704, the image adjustment processor 701, the CRT-specific processor 706, the printer-specific processor A 707, the printer-specific processor B 708, and the image data format generating processor 709 are sections provided for the purpose of helping the comprehension of the functions of the image processor 270; it is not always required that these are actualized as physically independent devices, but for example, it is appropriate to actualize these sections as those of kinds of software processing in a single CPU.

Further, the sections, namely, the header information analysis section 102, the compensation processor for model gradation reproduction characteristic 103a, the model gradation reproduction characteristic profile 103b, the compensation processor for model frequency response characteristic 104, the exposure control/gray balance adjustment processor 105, the non-linear compensation processor 106, and the viewing image referred image data generator 107 are sections provided for the purpose of helping the comprehension of the functions of this invention in the image processor 270; it is not always required that these are actualized as physically independent devices, but for example, it is appropriate to actualize these sections as those of kinds of software processing in a single CPU.

(Image Processor 270a)

Figure 9:
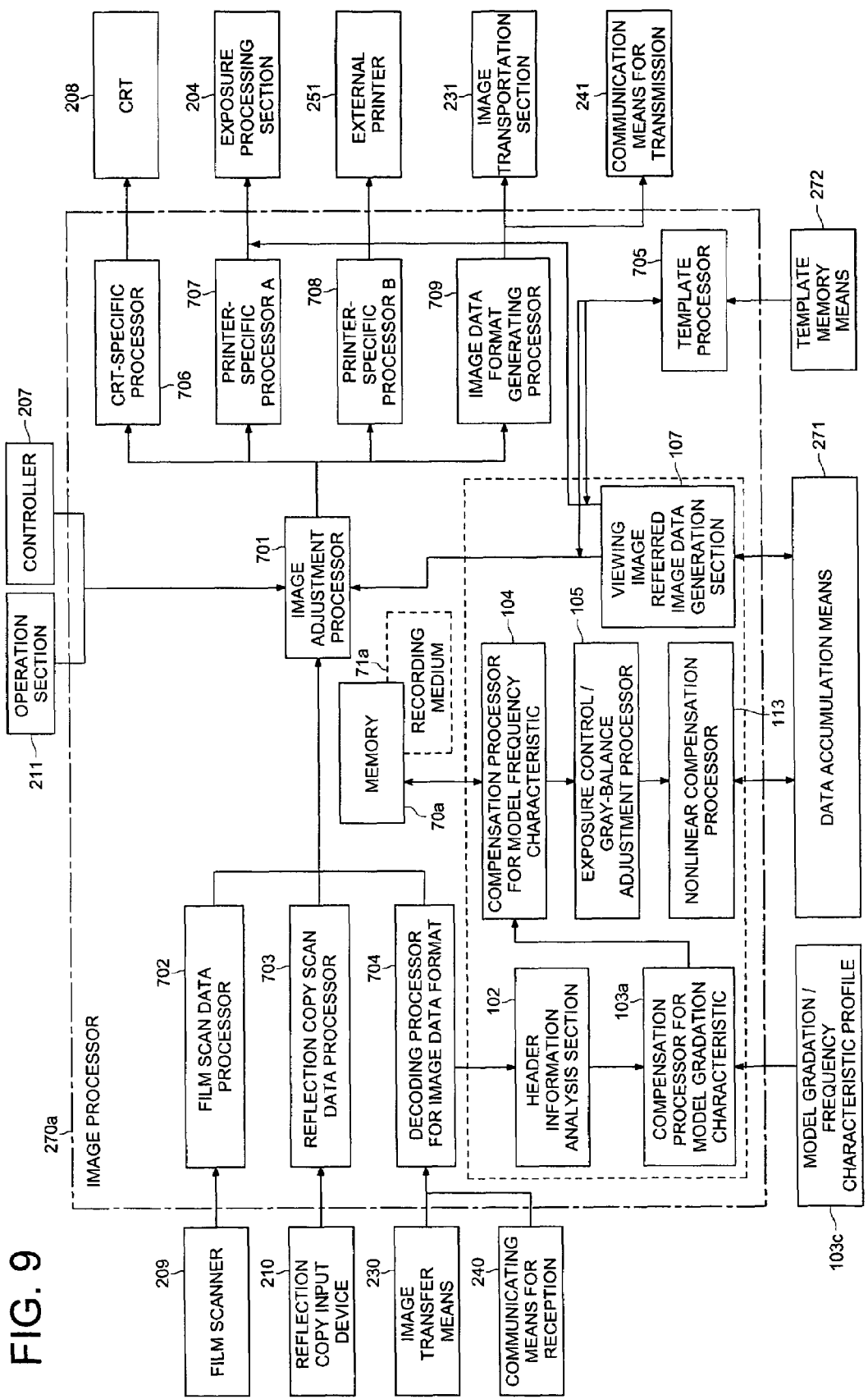
FIG. 9 is a functional block diagram of the image processing section shown in FIG. 7.

Up to now, the image processor 270 has been explained as a suitable example of the embodiment of this invention; however, this invention is not limited to this, but it can be applied to an image processor 270a shown in FIG. 9.

Incidentally, among the structural components shown in FIG. 9, to the same components as those shown in FIG. 8, the same signs are attached, and only the components different from those of the image processor 270 will be explained in detail.

The image processor 270*a* is equipped with a storage 70*a* or a recording medium 71*a*, which stores various kinds of programs to be practiced by the controller 207. The storage 70*a* or the recording medium 71*a* stores programs for carrying out processings shown in the flow chart of FIG. 15 to FIG. 18 particularly.

A compensation processor for model gradation reproduction characteristic 103*a* determines compensation processing conditions for model gradation reproduction characteristic, with reference to a model gradation/frequency characteristic profile 103*c*, on the basis of information representing the model of an image-capturing device inputted from a header information analysis section 102.

The compensation processor for model gradation reproduction characteristic 103*a* carries out a compensation processing for model gradation reproduction characteristic, to generate scene-referred image data.

A compensation processor for model frequency response characteristic 104 determines compensation processing conditions for model frequency response, with reference to the model gradation/frequency characteristic profile 103*c* on the basis of the above-mentioned scene-referred image data generated.

The compensation processor for model frequency response characteristic 104 applies a compensation processing for model frequency response characteristic to scene-referred image data in accordance with the above-mentioned compensation processing conditions determined, to generate scene-referred image data having been subjected to compensation processing for model frequency response characteristic.

An exposure control/gray balance adjustment processor 105 applies an exposure control/gray balance adjustment processing to said scene-referred image data having been generated, and a non-linear compensation processor 113 applies a non-linear compensation processing etc. to the scene-referred image data having been subjected to said exposure control/gray balance adjustment processing, to generate viewing image referred image data. Said viewing image referred image data generated are once stored in the data accumulation means 271.

(Image Processor 270*b*)

Figure 10:
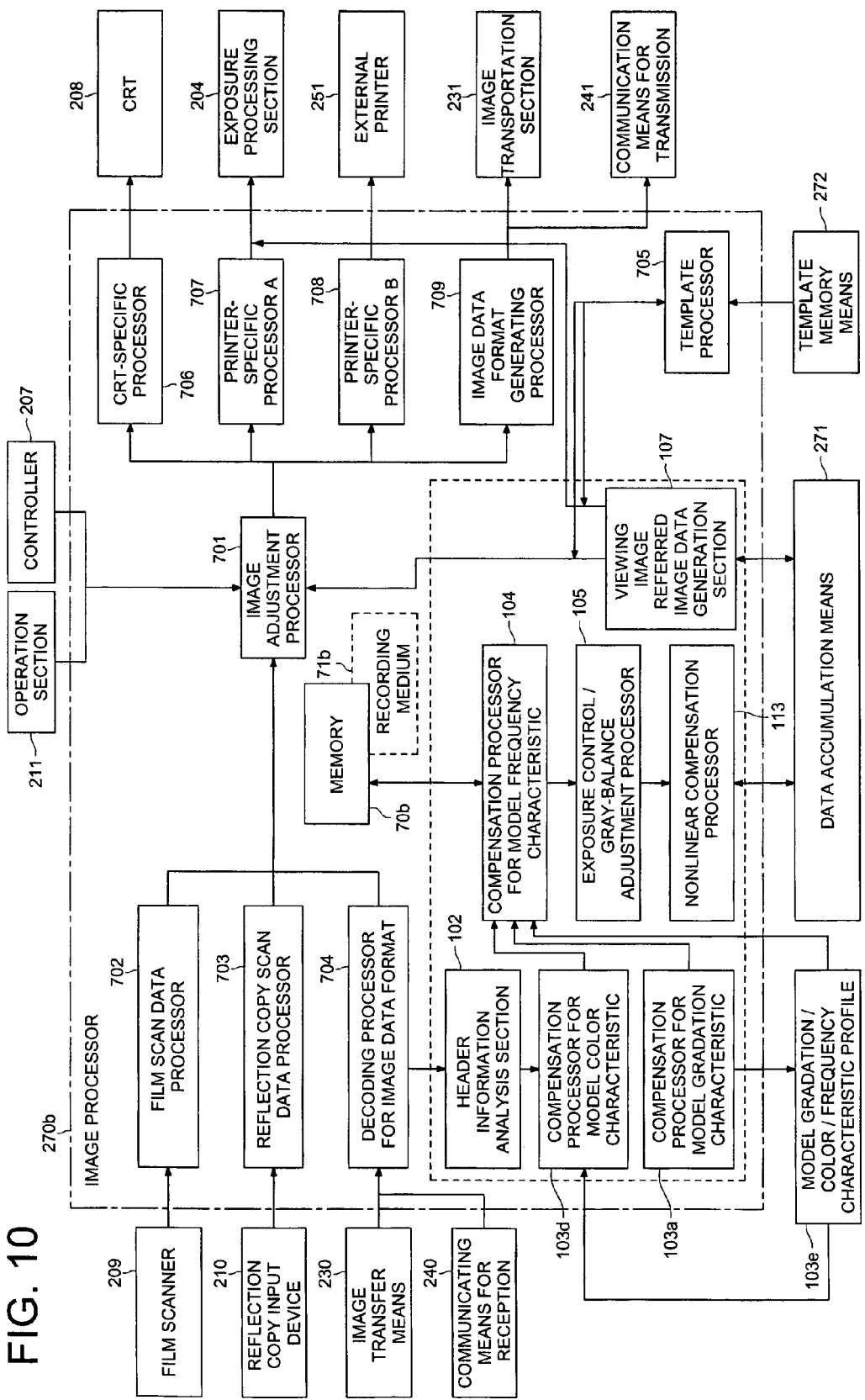
FIG. 10 is a functional block diagram of the image processing section shown in FIG. 7.

Further, this invention can be also applied to an image processor 270*b* shown in FIG. 10.

Incidentally, among the structural components shown in FIG. 10, to the same components as those of the image processors 270 and 270*a*, the same signs are attached, and only the components different from those of the image processor 270 or 270*a* will be explained in detail.

The image processor 270*b* is equipped with a storage 70*b* or a recording medium 71*b*, which stores various kinds of programs to be practiced by the controller 207. The storage 70*b* or the recording medium 71*b* stores programs for carrying out processings shown in the flow charts of FIG. 15 to FIG. 18 particularly.

A compensation processor for model gradation reproduction characteristic 103*a* determines compensation processing conditions for model gradation reproduction characteristic, with reference to a model gradation/color/frequency characteristic profile 103*e*, on the basis of information representing the model of an image-capturing device inputted from a header information analysis section 102.

The compensation processor for model gradation reproduction characteristic 103*a* applies a compensation processing for model gradation reproduction characteristic to viewing image referred image data, to generate scene-referred image data.

A compensation processor for model color reproduction characteristic 103*d* determines compensation processing conditions for model color reproduction characteristic on the basis of information representing the model of the image-capturing device concerned.

The compensation processor for model color reproduction characteristic 103*d* applies a compensation processing for model color reproduction characteristic to viewing image referred image data in accordance with the above-mentioned compensation processing conditions determined, to generate scene-referred image data.

A compensation processor for model frequency response characteristic 104 determines compensation processing conditions for model frequency response characteristic, with reference to the model gradation/color/frequency characteristic profile 103*e* on the basis of the above-mentioned scene-referred image data generated.

The compensation processor for model frequency response characteristic 104 applies a compensation processing for model frequency response characteristic to scene-referred image data in accordance with the above-mentioned compensation processing conditions determined, to generate scene-referred image data having been subjected to compensation processing for model frequency response characteristic.

An exposure control/gray balance adjustment processor 105 applies an exposure control/gray balance adjustment processing to said scene-referred image data having been generated, and a non-linear compensation processor 113 applies a non-linear compensation processing etc. to the scene-referred image data having been subjected to said exposure control/gray balance adjustment processing, to generate viewing image referred image data. Said viewing image referred image data generated are once stored in a data accumulation means 271.

(Operation of Image Processing Apparatus 117)

Figure 11:
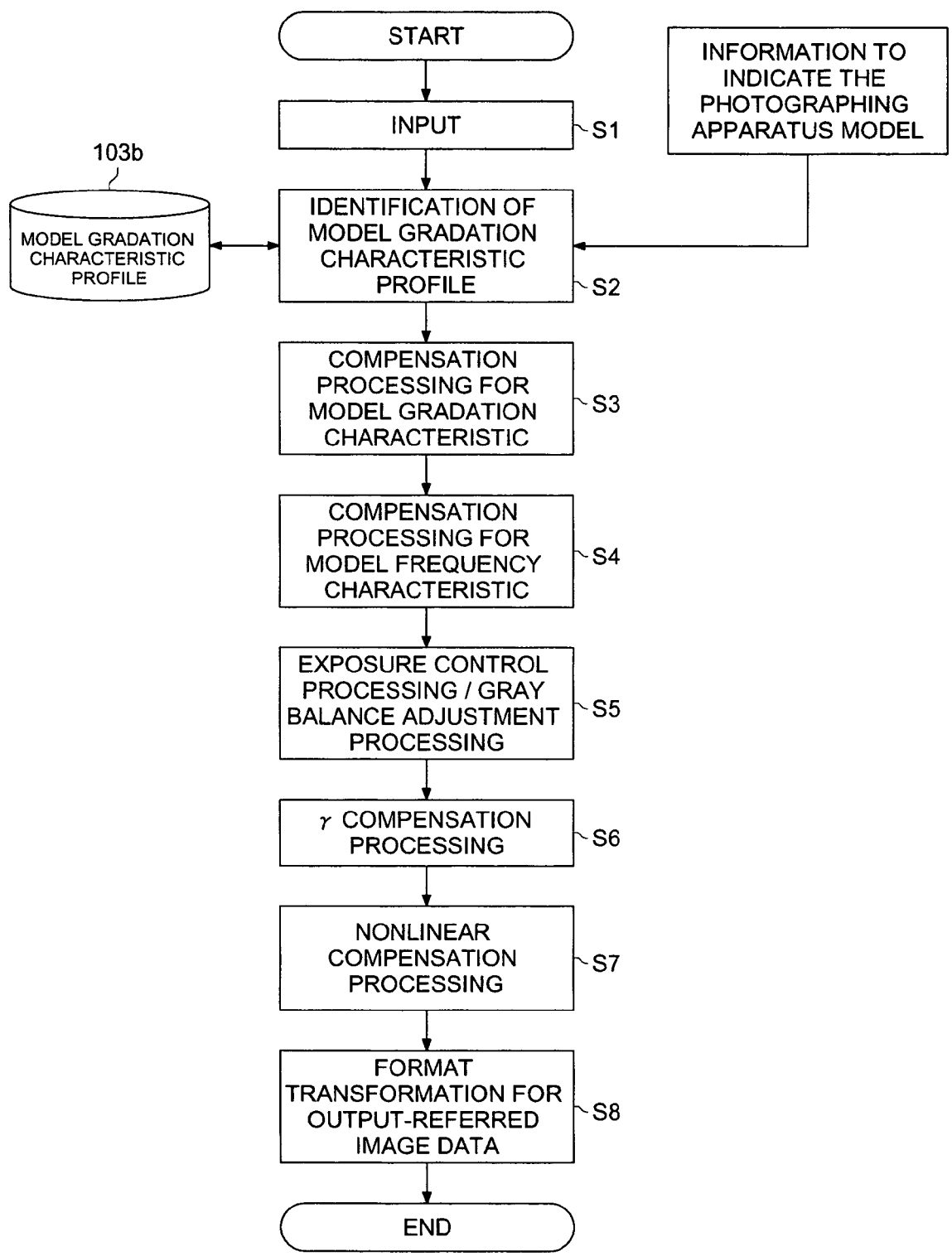
FIG. 11 is a flow chart for illustrating an image processing by means (section) of an image processing apparatus to which this invention is applied.

Next, the operation of the image processing apparatus 117 will be explained. FIG. 11 is a flow chart illustrating the image processing to be carried out by the image processing apparatus 117. In addition, because the operation of the image processor 270 is the same as the operation to be explained from now on, it will be omitted for simplifying the explanation.

Further, the content of the processing to be explained by the flow chart shown in FIG. 11 is stored in the storage 70 or in the recording medium 71 as a program to be practiced by the controller 207.

When captured-image data are inputted, for example, from the input section 101 (step S1), the controller 207 determines a pertinent model gradation reproduction characteristic profile out of the model gradation reproduction characteristic profiles 103*b*, on the basis of information representing the model of the image-capturing device by the compensation processor for model gradation reproduction characteristic 103*a* (step S2).

After the step S2, the controller 207 applies a compensation processing for model gradation reproduction characteristic to the captured-image data on the basis of the model gradation reproduction characteristic profile determined by the step S2 by the compensation processor for model gradation reproduction characteristic 103*a* (step S3).

After the step S3, the controller 207 applies a compensation processing in accordance with the inputted number of pixels to the captured-image data by the compensation processor for model gradation reproduction characteristic 103a (step S4), to generate scene-referred image data.

After the step S4, the controller 207 applies an exposure control/gray balance adjustment processing to said scene-referred image data by the exposure control/gray balance adjustment processor 105 (step S5); then, the non-linear compensation processor 113 applies successively a γ compensation processing (step S6) and non-linear compensation processing (step S7) to the scene-referred image data, to aim at the optimization of image quality in accordance with each of the output media.

After that, the controller 207 transforms the scene-referred image data having been subjected to the non-linear compensation processing into data in a data format of viewing image referred image data (step S8).

Figure 12:
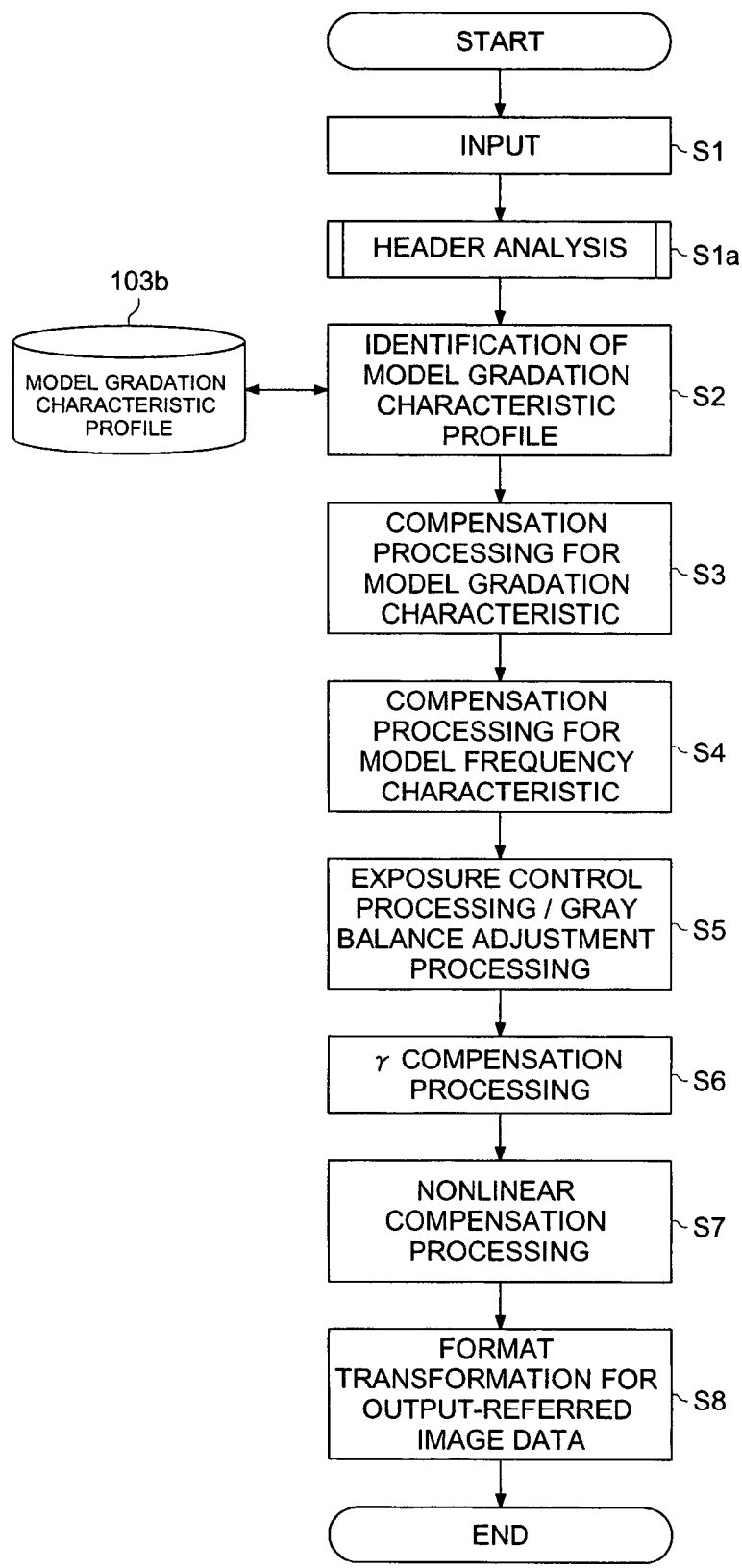
FIG. 12 is a flow chart for illustrating an image processing by means of an image processing apparatus to which this invention is applied.

In addition, the information representing the model of the image-capturing device is to be inputted by an operator; however, the way of obtaining the information is not limited to this, but it is also appropriate that the information is obtained by the header information analysis section 102 as shown in the step S1a of the flow chart shown in FIG. 12.

The flow chart shown in FIG. 12 is a flow chart as shown in FIG. 11 further having a step S1a newly added after the step S1. Accordingly, as regards the other steps in FIG. 12, the same signs are attached to them, and the explanation will be omitted.

The content of the processings to be explained by the flow chart shown in FIG. 12 is stored in the storage 70 or in the recording medium 71 as a program to be practiced by the controller 207.

In addition, the operation shown by this flow chart of FIG. 12 can be also practiced by the image processor 270.

Figure 13:
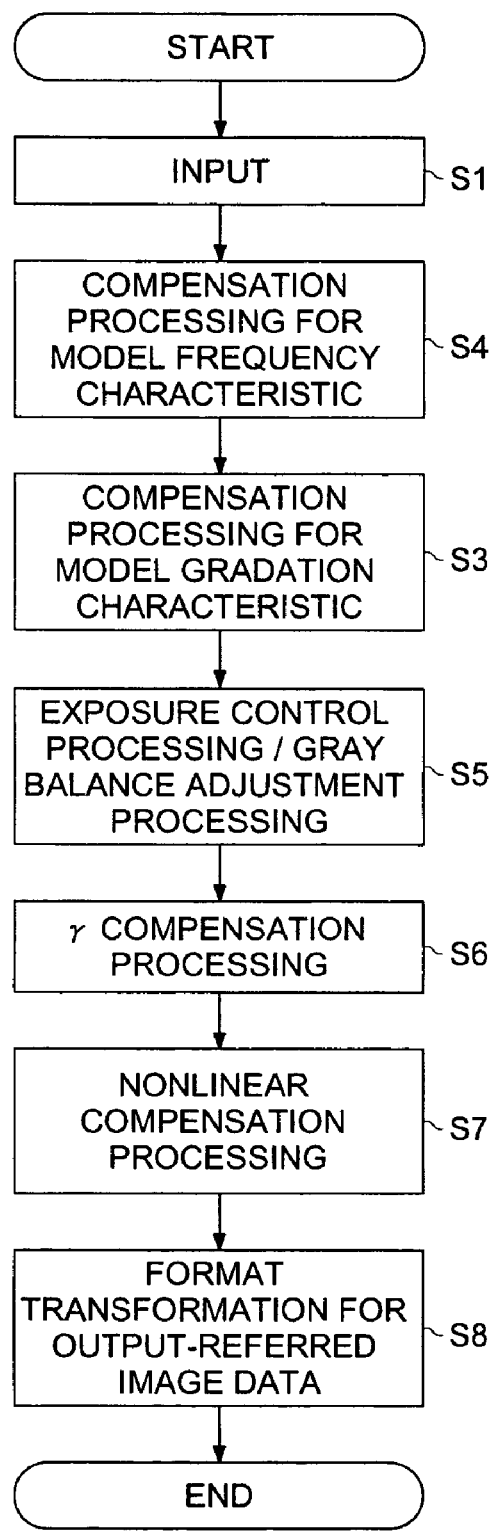
FIG. 13 is a flow chart for illustrating an image processing by means of an image processing apparatus to which this invention is applied.

Further, as shown in the flow chart of FIG. 13, it is also possible that the controller 207 carries out image processing in the way such that the step S2 is omitted from the flow chart of FIG. 11 and the order of the processings of the step S3 and the step S4 is reversed. Further, as shown in the flow chart of FIG. 14, the controller 207 carries out image processing also in such a way that the step S2 and further the step S3 are omitted from the flow chart shown in FIG. 11. Besides, in the flow charts of FIG. 13 and FIG. 14, information representing the model of the image-capturing device is to be inputted by an operator; however, the way of obtaining the information is not limited to this, but it is also appropriate to make the information be obtained by the header information analysis section 102.

Figure 14:
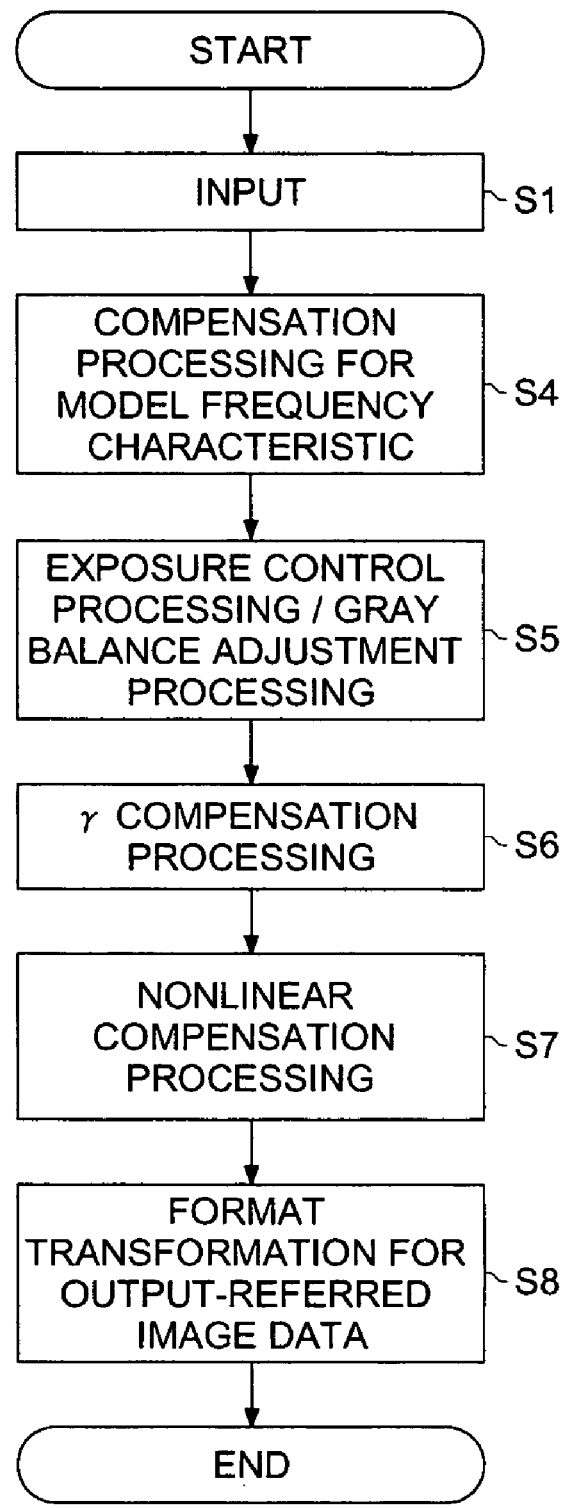
FIG. 14 is a flow chart for illustrating an image processing by means of an image processing apparatus to which this invention is applied.

The content of the processings to be explained by the flow charts shown in FIG. 13 and FIG. 14 is stored in the storage 70 or in the recording medium 71 as programs to be practiced by the controller 207.

(Operation of Image Processing Apparatus 117a)

Figure 15:
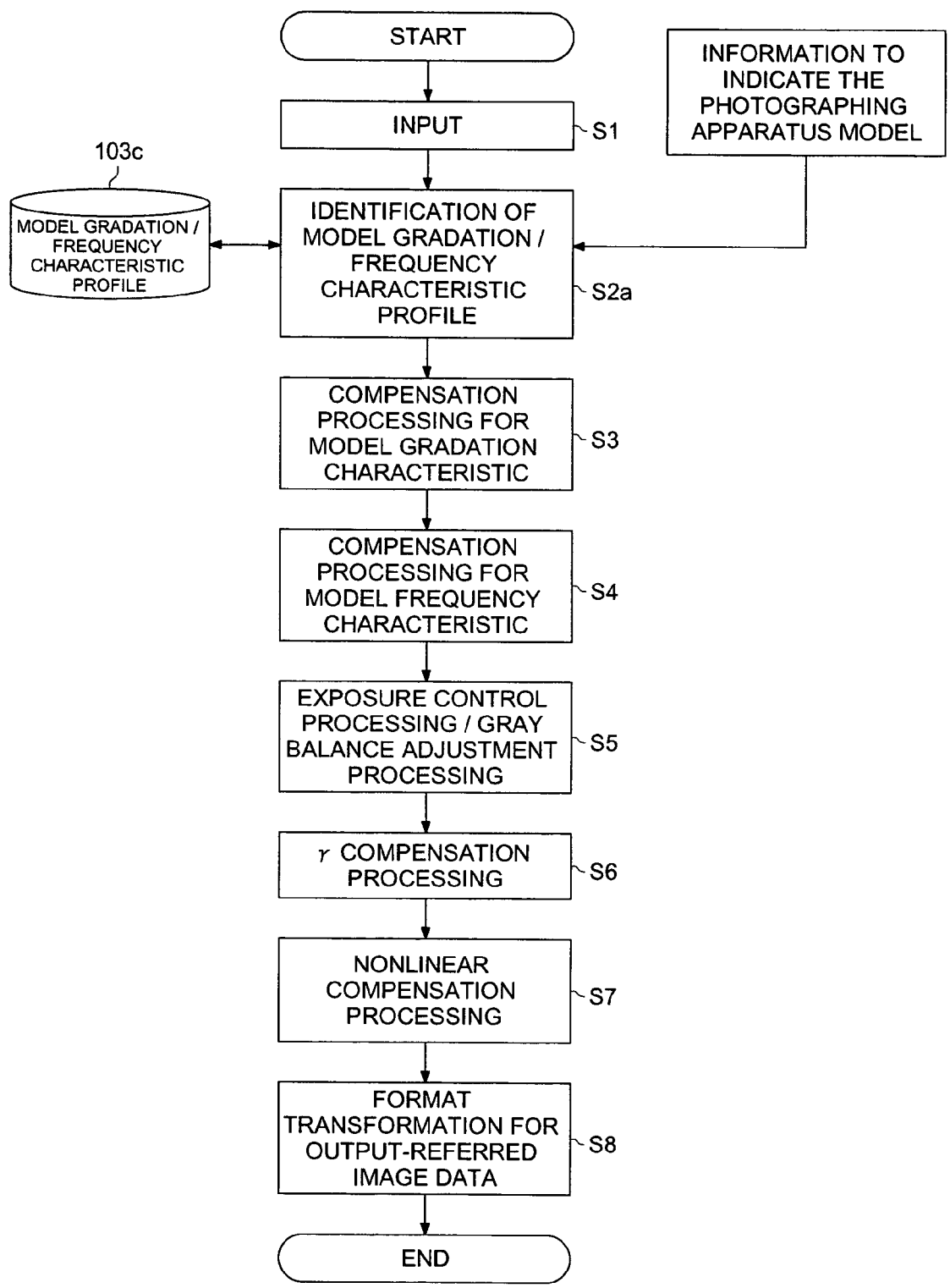
FIG. 15 is a flow chart for illustrating an image processing by means of an image processing apparatus to which this invention is applied.

Next, the operation of the image processing apparatus 117a will be explained. FIG. 15 is a flow chart illustrating the image processing by the image processing apparatus 117a. In addition, the flow chart shown in FIG. 15 is such one that the step S2 among the steps shown in FIG. 11 is replaced by the step S2a. Accordingly, as regards the other steps in FIG. 15, the same signs are attached to them, and the explanation will be omitted.

The content of the processings to be explained by the flow chart shown in FIG. 15 is stored in the storage 70a or in the recording medium 71a as a program to be practiced by the controller 207.

In addition, the operation shown by this flow chart of FIG. 15 can be also practiced by the image processor 270a.

Now, the step S2a will be explained. The controller 207 determines a model gradation reproduction characteristic profile and a model frequency response characteristic profile corresponding to the model of the pertinent image-capturing device out of the model gradation/frequency characteristic profiles 103c, on the basis of the information representing the model of the image-capturing device inputted by an operator at the step S1 by the compensation processor for model gradation reproduction characteristic 103a (S2a). At the step S3, the controller 207 corrects the gradation characteristic on the basis of said model gradation reproduction characteristic profile by the compensation processor for model gradation reproduction characteristic 103a, and in the step S4, it corrects the frequency characteristic on the basis of said model frequency response characteristic profile by the compensation processor for model frequency response characteristic 104.

Besides, the information representing the model of the image-capturing device is to be directly inputted by an operator; however, the way of obtaining the information is not limited to this, but it is also appropriate to make the information be obtained by the header information analysis section 102 as shown at the step S1a of the flow chart of FIG. 16 to be described later.

Figure 16:
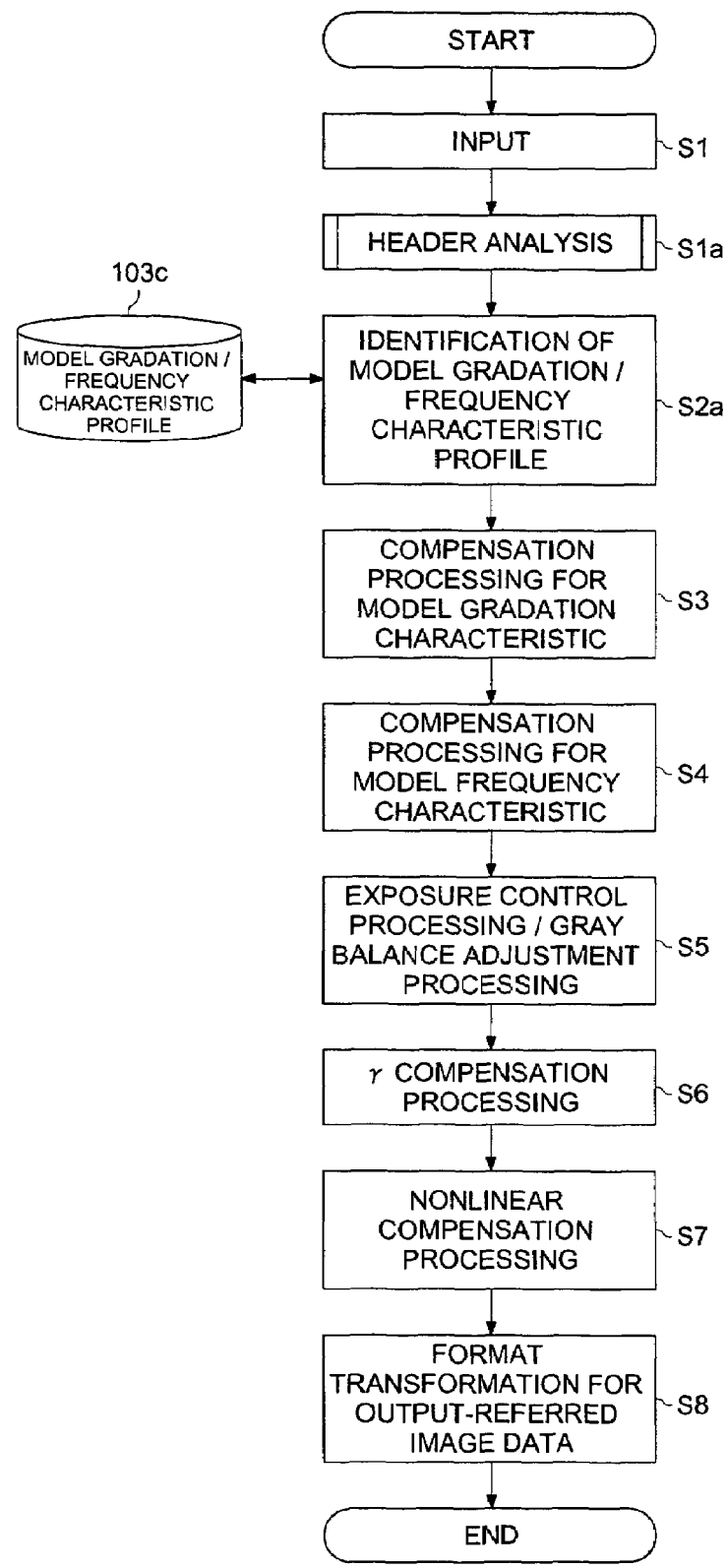
FIG. 16 is a flow chart for illustrating an image processing by means of an image processing apparatus to which this invention is applied.

The flow chart shown in FIG. 16 is such one that a step S1a of FIG. 12 is further provided after the step S1 in the flow chart of FIG. 15.

The content of the processings to be explained by the flow chart shown in FIG. 16 is stored in the storage 70a or in the recording medium 71a as a program to be practiced by the controller 207.

In addition, the operation shown by this flow chart of FIG. 16 can be also practiced by the image processor 270a.

Figure 17:
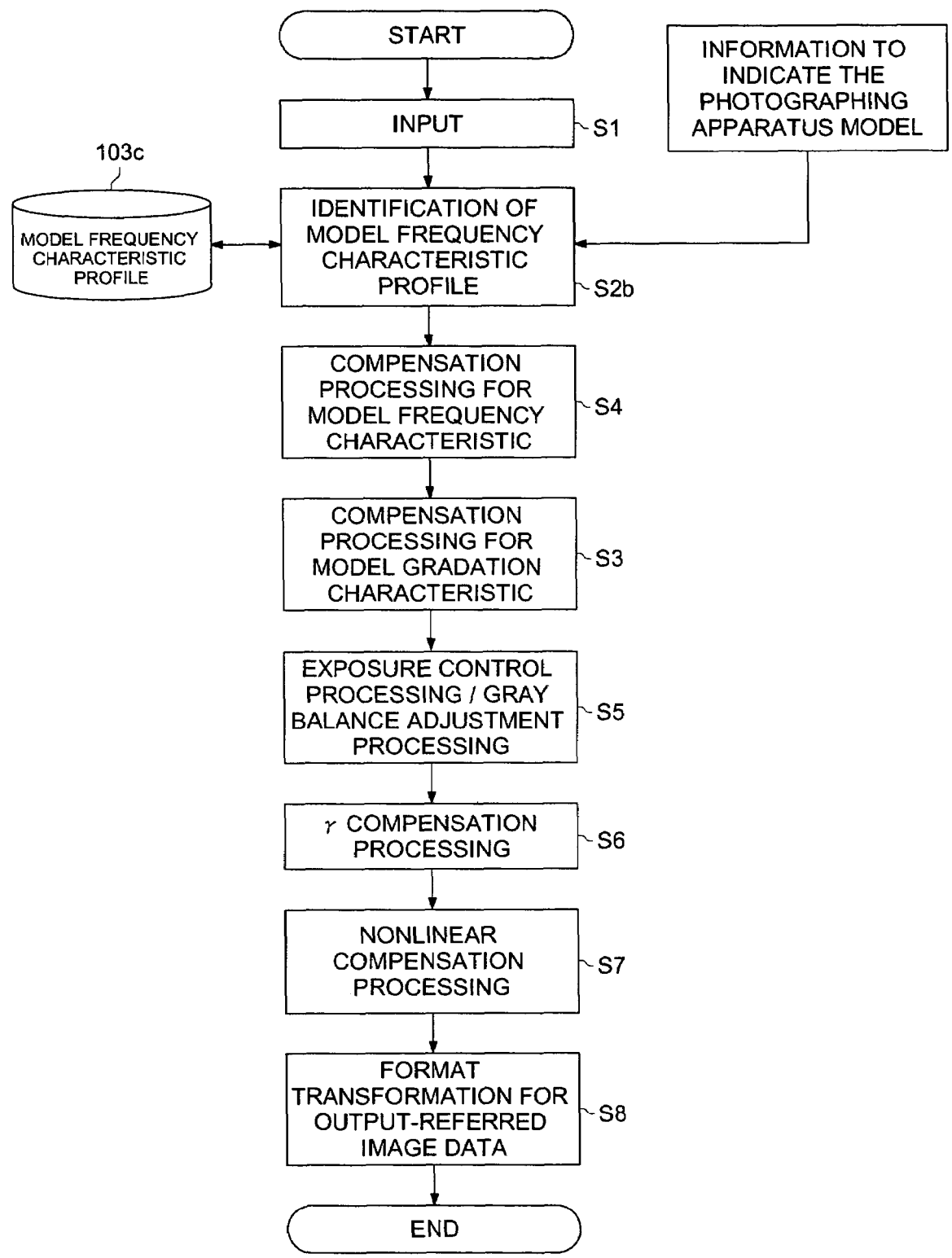
FIG. 17 is a flow chart for illustrating an image processing by means of an image processing apparatus to which this invention is applied.

Further, as shown in the flow chart of FIG. 17, it is also possible that the controller 207 carries out image processing in a way such that the step S2b for carrying out a processing to determine the pertinent model frequency response characteristic profile out of the model frequency response characteristic profiles (the drawing is omitted) on the basis of information representing the model of the image-capturing device is comprised instead of the step S2a of FIG. 15 and the order of the processings of the step S3 and the step S4 is reversed. Further, as shown in the flow chart of FIG. 18, the controller 207 carries out image processing also in such a way that the step S3 is omitted from the flow chart shown in FIG. 17. Besides, in the flow charts of FIG. 17 and FIG. 18, information representing the model of the image-capturing device is to be inputted by an operator; however, the way of obtaining the information is not limited to this, but it is also appropriate to make the information be obtained by the header information analysis section 102.

Figure 18:
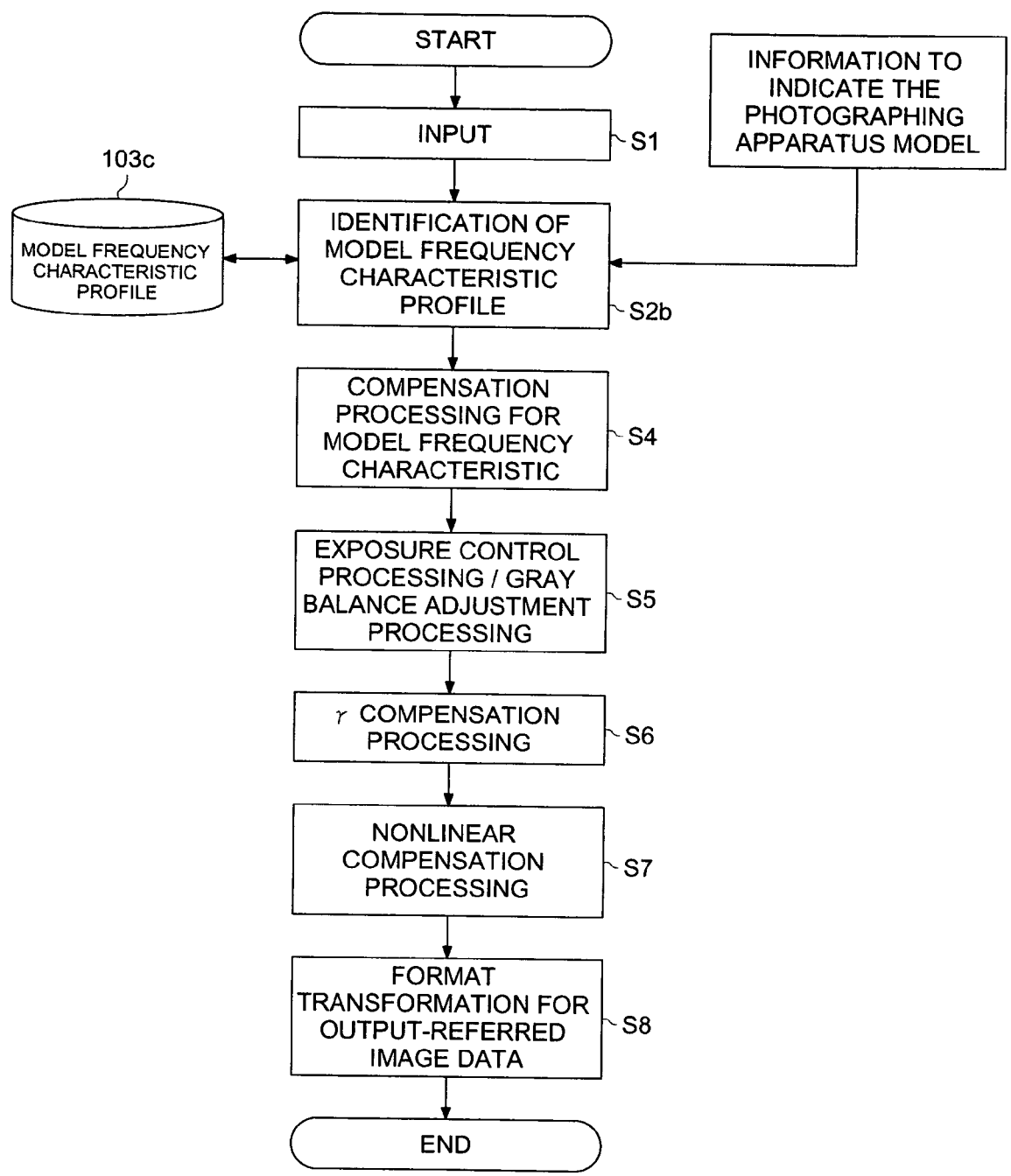
FIG. 18 is a flow chart for illustrating an image processing by means of an image processing apparatus to which this invention is applied.

The content of the processings to be explained by the flow charts shown in FIG. 17 and FIG. 18 is stored in the storage 70a or in the recording medium 71a as programs to be practiced by the controller 207.

(Operation of Image Processing Apparatus 117b)

Figure 19:
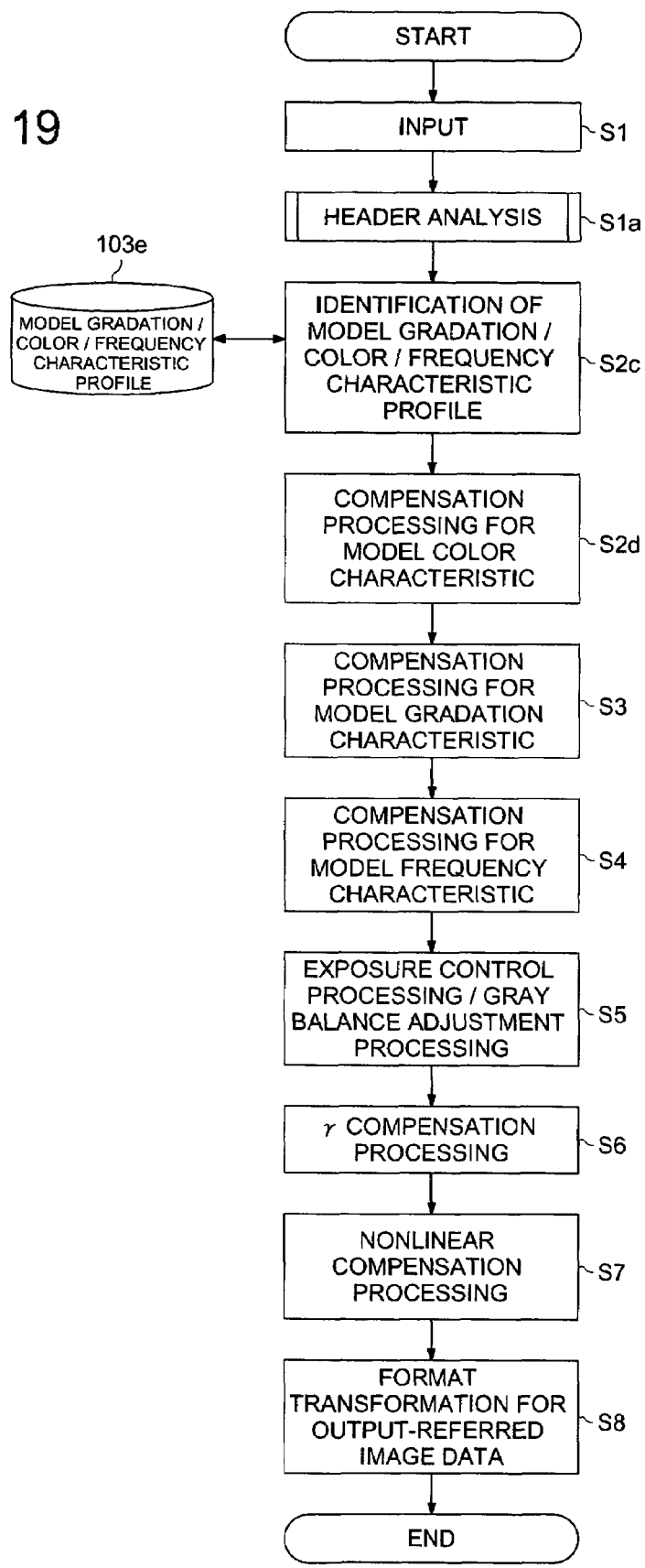
FIG. 19 is a flow chart for illustrating an image processing by means of an image processing apparatus to which this invention is applied.

Next, the operation of the image processing apparatus 117b will be explained. FIG. 19 is a flow chart illustrating the image processing by the image processing apparatus 117b. In addition, the flow chart shown in FIG. 19 is such one that the step S2 among the above-mentioned steps shown in FIG. 11 is replaced by the step S2c, a step S1a explained in the above is provided at the next stage of the step S1, and a step S2d is provided at the previous stage of the step S3. Accordingly, as regards the other steps in FIG. 19, the same signs are attached to them, and the explanation will be omitted.

The content of the processings to be explained by the flow chart shown in FIG. 19 is stored in the storage 70b or in the recording medium 71b as a program to be practiced by the controller 207.

In addition, the operation shown by this flow chart of FIG. 19 can be also practiced by the image processor 270b.

First, the step S1a will be explained. The controller 207 obtains information representing the model of the image-capturing device from the header of the image data by the header information analysis section 102 (step S1a).

Next, the step S2a will be explained. The controller 207 determines a model gradation reproduction characteristic profile, a model color reproduction characteristic profile, and a model frequency response characteristic profile corresponding to the model of the pertinent image-capturing device out of the model gradation/color/frequency characteristic profiles 103e, on the basis of the above-mentioned information representing the model of the image-capturing device by the compensation processor for model gradation reproduction characteristic 103a (S2c).

Next, the step S2c will be explained. The controller 207 applies a compensation processing for model color reproduction characteristic to the image data on the basis of the model color reproduction characteristic profile determined by the step S2c by the compensation processor for model color reproduction characteristic 103d.

Figure 20:
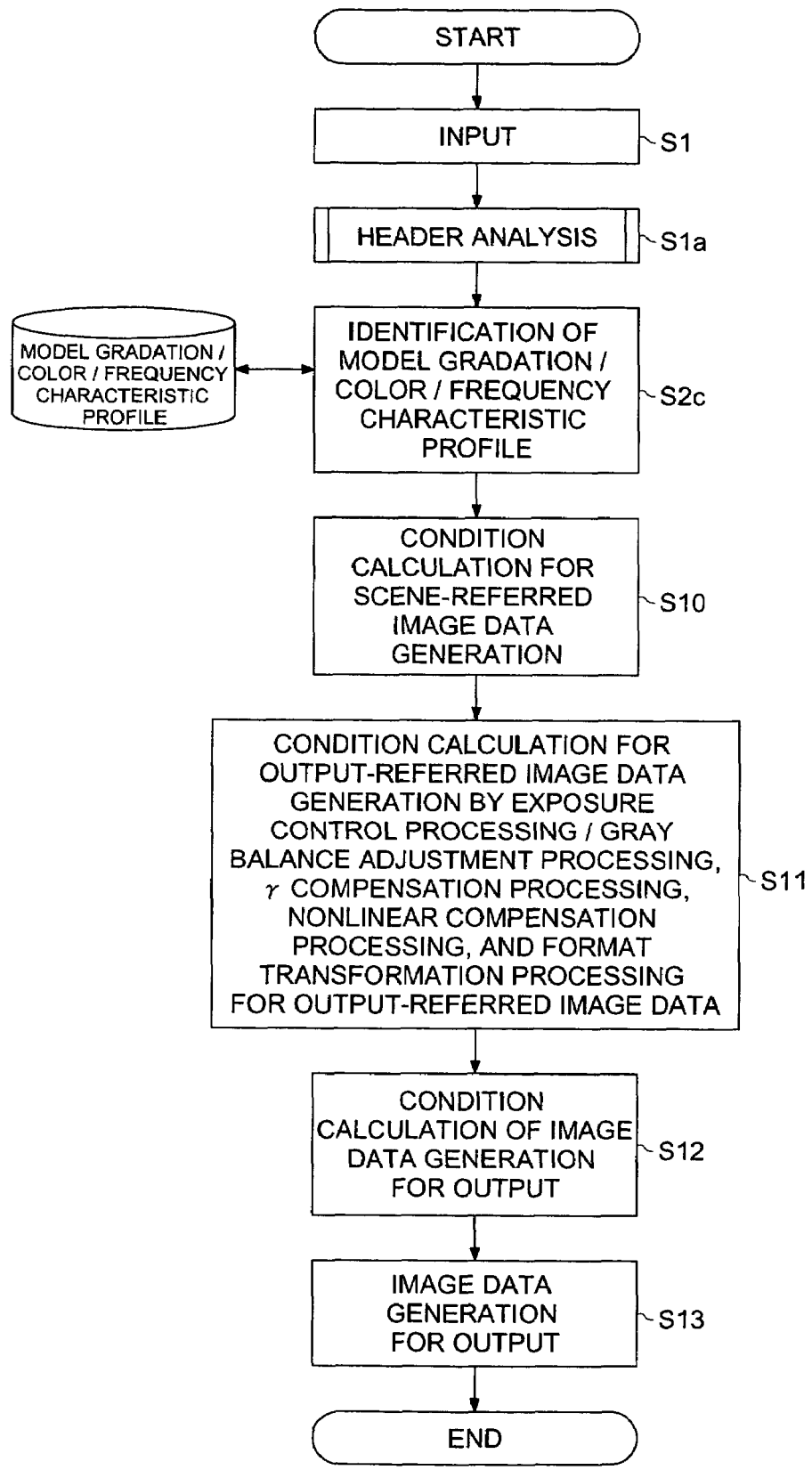
FIG. 20 is a flow chart for illustrating an image processing by means of an image processing apparatus to which this invention is applied.

Besides, the image processing apparatus 117b (or the image processor 270b) can also carry out the image processing shown in the flow chart of FIG. 20. The content of the processing illustrated by the flow chart shown in FIG. 20 is stored in the storage 70b or in the recording medium 71b as a program to be practiced by the controller 207.

On the basis of the information representing the model of the image-capturing device obtained by the processing of the steps S1 and S1a, the controller 207 determines a model gradation reproduction characteristic profile, a model color reproduction characteristic profile, and a model frequency response characteristic profile corresponding to the model of the pertinent image-capturing device out of the model gradation/color/frequency characteristic profiles 103e, on the basis of the above-mentioned information representing the model of the image-capturing device by the compensation processor for model gradation reproduction characteristic 103a (S2c).

After that, on the basis of the above-mentioned model gradation reproduction characteristic profile determined, the controller 207 calculates condition data for generating scene-referred image data on the basis of each of the model gradation reproduction characteristic profile, the model color reproduction characteristic profile, and the model frequency response characteristic profile, by the compensation processor for model gradation reproduction characteristic 103a, the compensation processor for the model frequency response characteristic 104, and the compensation processor for model color reproduction characteristic 103d (step S10).

After that, the controller 207 calculates condition data for carrying out an exposure control/gray balance control processing, a γ compensation processing, a non-linear compensation processing, and a transformation processing of the data format into viewing image referred image data, by the viewing image referred image data generator 107 (step S11). In addition, as regards the steps S10 and S11, the order of processing may be reversed, or they may be practiced parallel.

After the steps S10 and S11, on the basis of the above-mentioned condition data, the controller 207 calculates condition data for generating image data for output by the viewing image referred image data generator 107 (step S12), and generates image data for output on the basis of said condition data calculated (step S13).

As explained up to now, the image processing apparatus 117 carries out the compensation for the frequency response characteristic, and further, for the gradation reproduction characteristic and color reproduction characteristic for each image-capturing device, before it produces viewing image referred image data by the exposure control/gray balance adjustment processing, the γ characteristic compensation processing, the non-linear compensation processing, etc.

Accordingly, even from image data obtained through photographing by image-capturing device having different designs of frequency response characteristic respectively, viewing image referred image data for producing high-grade prints can be stably obtained independently of the kinds of the image-capturing device.

Besides, the above-mentioned description in this embodiment of the invention shows a concrete example of an image processing method, a recording medium having a program for practicing said image processing method, an image processing apparatus, and an image recording apparatus of this invention, and this invention should not be limited to this. The image processing apparatus 117, 117a, and 117b of this embodiment and the detailed structure and the detailed operation of the image recording apparatus 201 can be suitably altered within the range not departing from the substance of this invention.

EFFECT OF THE INVENTION

By this invention, image processing for producing image data for printing with a stable quality with respect to many kinds of image-capturing device can be accomplished.

As a particularly desirable mode of the image forming method of this invention, by making it have a structure composed of at least the three steps, namely, the first step of making the compensation for the transformation characteristic of the image-capturing device, the second step of practicing an exposure control processing and a gray balance adjustment processing, and the third step of practicing a gradation processing, and making the process proceed successively from the first step to the third step, a higher accuracy and efficiency can be achieved.

What is claimed is:
1. An image processing method comprising:
subjecting captured-image data outputted from an image-capturing device to an optimization processing for appreciation to produce viewing image referred image data; and
conducting a pre-processing before the optimization processing is carried out; wherein, the pre-processing comprises to transform the frequency characteristic of the captured-image data into the scene referred frequency characteristic by removing the effect of a frequency characteristic specific to the image-capturing device from the frequency characteristic of the captured-image data,
wherein the frequency characteristic specific to the image-capturing device is a model frequency characteristic specific to an image-capturing device model,
wherein the pre-processing further comprises to transform the gradation characteristic of the captured-image data into a scene-referred gradation characteristic by removing the effect of a gradation characteristic specific to the image-capturing device from the gradation characteristic of the captured-image data.

2. The image processing method of claim 1, wherein the frequency characteristic specific to the image-capturing device is a model frequency characteristic specific to an image-capturing device model.

3. The image processing method of claim 1, wherein the gradation characteristic specific to the image-capturing device is a model gradation characteristic specific to an image-capturing device model.

4. The image processing method of claim 3, wherein the information on the model gradation characteristic is obtained from the captured-image data.

5. The image processing method of claim 1, wherein the frequency characteristic specific to the image-capturing device is a model frequency characteristic specific to an image-capturing device model, and the gradation characteristic specific to the image-capturing device is a model gradation characteristic specific to the image-capturing device model.

6. The image processing method of claim 1, wherein the information on the model frequency characteristic is obtained from the captured-image data.

7. The image processing method of claim 1, wherein the frequency characteristic of the captured-image data is transformed into the scene-referred frequency characteristic by compensating for the difference in the frequency band between each of the image-capturing device.

8. The image processing method of claim 1, wherein when the frequency characteristic of the captured-image data is transformed into the scene-referred frequency characteristic, the frequency characteristic of the captured-image data is transformed into a predetermined standard frequency characteristic.

9. The image processing method of claim 8, wherein the predetermined standard frequency characteristic is a frequency characteristic such that the resolution vs. frequency varies linearly.

10. The image processing method of claim 8, wherein the predetermined standard frequency characteristic is a frequency characteristic such that resolution vs. frequency varies in accordance with the visual characteristic of the human eyes.

11. The image processing method of claim 1, wherein in the course of subjecting captured-image data outputted from an image-capturing device to an optimization processing for appreciation to produce viewing image referred image data, after the captured-image data are subjected to an exposure control processing for correcting the brightness and a gray balance adjustment processing for correcting the color bias, the captured-image data are subjected to a gradation compensation processing for correcting the gradation.

12. The image processing method of claim 11, wherein when the gradation compensation processing is carried out, the captured-image data are corrected to become non-linear.

13. The image processing method of claim 1, wherein the pre-processing further comprises a processing to transform the color characteristic of the captured-image data into the scene-referred color space characteristic by removing the effect of the color characteristic specific to the image-capturing device from the color characteristic of the captured-image data.

14. The image processing method of claim 13, wherein the color characteristic specific to the image-capturing device is a model color characteristic specific to an image-capturing device model.

15. An image processing method comprising:
subjecting captured-image data outputted from an image-capturing device to an optimization processing for appreciation to produce viewing image referred image data;
generating condition data for outputting the captured-image data to an output medium on the basis of condition data for carrying out a pre-processing before the optimization processing is carried out, the pre-processing comprising to transform the frequency characteristic of the captured-image data into the scene-referred frequency characteristic by removing the effect of frequency characteristic specific to the image-capturing device from the frequency characteristic of the captured-image data, and on the base of condition data for carrying out the optimization processing,
wherein the frequency characteristic specific to the image-capturing device is a model frequency characteristic specific to an image-capturing device model,
wherein the pre-processing further comprises to transform the gradation characteristic of the captured-image data into a scene-referred gradation characteristic by removing the effect of a gradation characteristic specific to the image-capturing device from the gradation characteristic of the captured-image data.

16. The image processing method of claim 15, wherein the frequency characteristic specific to the image-capturing device is a model frequency characteristic specific to an image-capturing device model.

17. The image processing method of claim 15, wherein the gradation characteristic specific to the image-capturing device is a model gradation characteristic specific to an image-capturing device model.

18. The image processing method of claim 17, wherein the information on the model gradation characteristic is obtained from the captured-image data.

19. The image processing method of claim 15, wherein the frequency characteristic specific to the image-capturing device is a model frequency characteristic specific to an image-capturing device model, and the gradation characteristic specific to the image-capturing device is a model gradation characteristic specific to the image-capturing device model.

20. The image processing method of claim 15, wherein the information on the model frequency characteristic is obtained from the captured-image data.

21. The image processing method of claim 15, wherein the frequency characteristic of the captured-image data is transformed into the scene-referred frequency characteristic by compensating for the difference in the frequency band between each of the image-capturing device.

22. The image processing method of claim 15, wherein when the frequency characteristic of the captured-image data is transformed into the scene-referred frequency characteristic, the frequency characteristic of the captured-image data is transformed into a predetermined standard frequency characteristic.

23. The image processing method of claim 22, wherein the predetermined standard frequency characteristic is a frequency characteristic such that the resolution vs. frequency varies linearly.

24. The image processing method of claim 22, wherein the predetermined standard frequency characteristic is a frequency characteristic such that resolution vs. frequency varies in accordance with the visual characteristic of the human eyes.

25. The image processing method of claim 15, wherein in the course of subjecting captured-image data outputted from an image-capturing device to an optimization processing for appreciation to produce viewing image referred image data, after the captured-image data are subjected to an exposure control processing for correcting the brightness and a gray balance adjustment processing for correcting the color bias, the captured-image data are subjected to a gradation compensation processing for correcting the gradation.

26. The image processing method of claim 25, wherein when the gradation compensation processing is carried out, the captured-image data are corrected to become non-linear.

27. The image processing method of claim 15, wherein the pre-processing further comprises a processing to transform the color characteristic of the captured-image data into the scene-referred color space characteristic by removing the effect of the color characteristic specific to the image-capturing device from the color characteristic of the captured-image data.

28. The image processing method of claim 27, wherein the color characteristic specific to the image-capturing device is a model color characteristic specific to an image-capturing device model.

29. An image processing apparatus for subjecting captured-image image data outputted from an image-capturing device to an optimization processing for appreciation to produce viewing image referred image data, comprising:
a storage section for storing model frequency characteristics of a plurality of image-capturing device models;
an acquisition section for obtaining a model frequency response characteristic corresponding to the designated image-capturing device out of the model frequency response characteristics stored in the storage section;
a frequency characteristic compensation section for transforming the frequency characteristic of the captured-image data into the scene-referred frequency characteristic by removing the effect of the obtained model frequency characteristic from the frequency characteristic of the captured-image data to correct the frequency characteristic of the captured-image data; and
a control section for controlling to carry out a pre-processing so that the frequency characteristic compensation section corrects the frequency characteristic of captured-image data, before the optimization processing is carried out.

30. The image processing apparatus of claim 29, wherein the information on the model frequency characteristic is obtained from the captured-image data.

31. The image processing apparatus of claim 29, wherein the processing of transforming the frequency characteristic of the captured-image data into the scene-referred frequency characteristic is a processing of compensating for the difference in the frequency band between each of the image-capturing device.

32. The image processing apparatus of claim 29, wherein the processing of transforming the frequency characteristic of the captured-image data into the scene-referred frequency characteristic is a processing of transforming the frequency characteristic of the captured-image data into a predetermined standard frequency characteristic.

33. The image processing apparatus of claim 32, wherein the predetermined standard frequency characteristic is a frequency characteristic in which resolution varies linearly against frequency.

34. The image processing apparatus of claim 32, wherein the predetermined standard frequency characteristic is a frequency characteristic such that resolution vs. frequency varies in accordance with the visual characteristic of the human eyes.

35. The image processing apparatus of claim 29, wherein in the course of the optimization processing, the control section controls to generate the viewing image referred image data through compensating the gradation after the captured-image data has been corrected in the brightness and in the color bias.

36. The image processing apparatus of claim 35, wherein the processing of compensating the gradation comprises a non-linear compensation processing.

37. An image processing apparatus for subjecting captured-image data outputted from an image-capturing device to an optimization processing for appreciation to produce viewing image referred image data, comprising:
a storage section for storing model frequency characteristics and model gradation characteristics of a plurality of image-capturing device models;
an acquisition section for obtaining a model frequency characteristic and a model gradation characteristic corresponding to the designated image-capturing device out of the model frequency characteristics and model gradation characteristics stored in the storage section;
a frequency characteristic compensation section for transforming the frequency characteristic of the captured-image data into the scene-referred frequency characteristic by removing the effect of the obtained model frequency response characteristic from the frequency characteristic of the captured-image data to correct the frequency characteristic of the captured-image data;
a gradation characteristic compensation section for transforming the gradation characteristic of the captured-image data into the scene-referred gradation characteristic by removing the effect of the obtained model gradation characteristic from the gradation characteristic of the captured-image data to correct the gradation characteristic of captured-image data; and
a control section for controlling to carry out a pre-processing so that the frequency characteristic compensation section corrects the frequency characteristic of captured-image data and the gradation characteristic compensation section corrects the gradation characteristic of captured-image data, before the optimization processing is carried out.

38. The image processing apparatus of claim 37, wherein the information on the model gradation characteristic is obtained from the captured-image data.

39. The image processing apparatus of claim 37, further comprising a color characteristic compensation section for correcting the gradation characteristic of the captured-image data, through transforming the color characteristic of the captured-image data into the scene-referred color space characteristic, by removing the effect of the color characteristic specific to the image-capturing device from the color characteristic of the captured-image data.

40. The image processing apparatus of claim 39, wherein the color characteristic specific to the image-capturing device is the model color characteristic specific to an image-capturing device model.

41. An image processing apparatus for subjecting captured-image data outputted from an image-capturing device to an optimization processing for appreciation to produce viewing image referred image data, comprising:

a storage section for storing model frequency characteristics of a plurality of image-capturing device models;

an acquisition section for obtaining a model frequency response characteristic corresponding to the designated image-capturing device out of the model frequency response characteristics stored in the storage section;

a pre-processing condition calculating section for calculating condition data for carrying out a pre-processing to transform the frequency characteristic of the captured-image data into the scene-referred frequency characteristic by removing the effect of the obtained model frequency response characteristic from the frequency characteristic of the captured-image data;

an optimization condition calculating section for calculating condition data for carrying out the optimization processing, an output condition calculating section for calculating condition data for outputting the captured-image data onto an output medium on the basis of the condition data calculated by the pre-processing condition calculating section and the optimization condition calculating section; and an image data generating section for generating image data for output on the basis of the condition data calculated by the output condition calculating section.

42. The image processing apparatus of claim 41, wherein the information on the model frequency characteristic is obtained from the captured-image data.

43. The image processing apparatus of claim 41, wherein the processing of transforming the frequency characteristic of the captured-image data into the scene-referred frequency characteristic is a processing of compensating for the difference in the frequency band between each of the image-capturing device.

44. The image processing apparatus of claim 41, wherein the processing of transforming the frequency characteristic of the captured-image data into the scene-referred frequency characteristic is a processing of transforming the frequency characteristic of the captured-image data into a predetermined standard frequency characteristic.

45. The image processing apparatus of claim 44, wherein the predetermined standard frequency characteristic a frequency characteristic in which resolution varies linearly against frequency.

46. The image processing apparatus of claim 44, wherein the predetermined standard frequency characteristic is a frequency characteristic such that resolution vs. frequency varies in accordance with the visual characteristic of the human eyes.

47. The image processing apparatus of claim 41, wherein in the course of the optimization processing the optimization condition calculating section calculates condition data for generating the viewing image referred image data through compensating the gradation after correcting the brightness and the color bias of the aforesaid captured-image data.

48. The image processing apparatus of claim 47, wherein the processing of compensating the gradation comprises a non-linear compensation processing.

49. An image processing apparatus for subjecting captured-image data outputted from an image-capturing device to an optimization processing for appreciation to produce viewing image referred image data, comprising:

a storage section for storing model frequency characteristics and model gradation characteristics of a plurality of image-capturing device models;

an acquisition section for obtaining a model frequency characteristic and a model gradation characteristic corresponding to the designated image-capturing device out of the model frequency response characteristics and model gradation characteristics stored in the storage section;

a pre-processing condition calculating section for calculating condition data for carrying out a pre-processing for transforming the frequency characteristic of the captured-image data into the scene-referred frequency characteristic by removing the effect of the obtained model frequency characteristic from the frequency characteristic of the captured-image data, and transforming the gradation characteristic of the captured-image data into the scene-referred gradation characteristic by removing the effect of the obtained model gradation characteristic from the gradation characteristic of the captured-image data;

an optimization condition calculating section for calculating condition data for carrying out the optimization processing;

an output condition calculating section for calculating condition data for outputting the captured-image data onto an output medium on the basis of the condition data calculated by the pre-processing condition calculating section and the optimization condition calculating section; and an image data generating section for generating image data for output on the basis of the condition data calculated by the output condition calculating means.

50. The image processing apparatus of claim 49, wherein the information on the model gradation characteristic is obtained from the captured-image data.

51. The image processing apparatus of claim 49, further comprising a color characteristic compensation section for correcting the gradation characteristic of the captured-image data, through transforming the color characteristic of the captured-image data into the scene-referred color space characteristic, by removing the effect of the color characteristic specific to the image-capturing device from the color characteristic of the captured-image data.

52. The image processing apparatus of claim 51, wherein the color characteristic specific to the image-capturing device is the model color characteristic specific to an image-capturing device model.

53. An image recording apparatus for subjecting captured-image data outputted from an image-capturing device to an optimization processing for appreciation to produce viewing image referred image data, and for forming an image represented by the viewing image referred image data on an output medium, comprising:

a storage section for storing model frequency characteristics of a plurality of image-capturing device models;

an acquisition section for obtaining a model frequency response characteristic corresponding to the designated image-capturing device out of the model frequency response characteristics stored in the storage section;

a frequency characteristic compensation section for transforming the frequency characteristic of the captured-image data into the scene-referred frequency characteristic by removing the effect of the obtained model frequency characteristic from the frequency characteristic of the captured-image data to correct the frequency characteristic of the captured-image data;

a control section for controlling to carry out a pre-processing so that the frequency characteristic compensation section corrects the frequency characteristic of captured-image data, before the optimization processing is carried out.

54. An image recording apparatus for subjecting captured-image data outputted from an image-capturing device to an optimization processing for appreciation to produce viewing image referred image data, and for forming an image represented by the viewing image referred image data on an output medium, comprising:

a storage section for storing model frequency characteristics and model gradation characteristics of a plurality of image-capturing device models;

an acquisition section for obtaining a model frequency characteristic and a model gradation characteristic corresponding to the designated image-capturing device out of the model frequency characteristics and model gradation characteristics stored in the storage section;

a frequency characteristic compensation section for transforming the frequency characteristic of the captured-image data into the scene-referred frequency characteristic by removing the effect of the obtained model frequency response characteristic from the frequency characteristic of the captured-image data to correct the frequency characteristic of the captured-image data;

a gradation characteristic compensation section for transforming the gradation characteristic of the captured-image data into the scene-referred gradation characteristic by removing the effect of the obtained model gradation characteristic from the gradation characteristic of the captured-image data to correct the gradation characteristic of captured-image data; and a control section for controlling to carry out a pre-processing so that the frequency characteristic compensation section corrects the frequency characteristic of captured-image data and the gradation characteristic compensation section corrects the gradation characteristic of captured-image data, before the optimization processing is carried out.

55. The image processing apparatus of claim 54, further comprising a color characteristic compensation section for correcting the gradation characteristic of the captured-image data, through transforming the color characteristic of the captured-image data into the scene-referred color space characteristic, by removing the effect of the color characteristic specific to the image-capturing device from the color characteristic of the captured-image data.

56. The image recording apparatus of claim 55, wherein the color characteristic specific to the image-capturing device is a model color characteristic specific to an image-capturing device model.

57. An image recording apparatus for subjecting captured-image data outputted from an image-capturing device to an optimization processing for appreciation to produce viewing image referred image data, and for forming an image represented by the viewing image referred image data on an output medium, comprising:

a storage section for storing model frequency characteristics of a plurality of image-capturing device models;

an acquisition section for obtaining a model frequency response characteristic corresponding to the designated image-capturing device out of the model frequency response characteristics stored in the storage section;

a pre-processing condition calculating section for calculating condition data for carrying out a pre-processing to transform the frequency characteristic of the captured-image data into the scene-referred frequency characteristic by removing the effect of the obtained model frequency response characteristic from the frequency characteristic of the captured-image data;

an optimization condition calculating section for calculating condition data for carrying out the optimization processing, an output condition calculating section for calculating condition data for outputting the captured-image data onto an output medium on the basis of the condition data calculated by the pre-processing condition calculating section and the optimization condition calculating section; and an image data generating section for generating image data for output on the basis of the condition data calculated by the output condition calculating section.

58. An image recording apparatus for subjecting captured-image data outputted from an image-capturing device to an optimization processing for appreciation to produce viewing image referred image data, and for forming an image represented by the viewing image referred image data on an output medium, comprising:

a storage section for storing model frequency characteristics and model gradation characteristics of a plurality of image-capturing device models;

an acquisition section for obtaining a model frequency characteristic and a model gradation characteristic corresponding to the designated image-capturing device out of the model frequency response characteristics and model gradation characteristics stored in the storage section;

a pre-processing condition calculating section for calculating condition data for carrying out a pre-processing for transforming the frequency characteristic of the captured-image data into the scene-referred frequency characteristic by removing the effect of the obtained model frequency characteristic from the frequency characteristic of the captured-image data, and transforming the gradation characteristic of the captured-image data into the scene-referred gradation characteristic by removing the effect of the obtained model gradation characteristic from the gradation characteristic of the captured-image data;

an optimization condition calculating section for calculating condition data for carrying out the optimization processing;

an output condition calculating section for calculating condition data for outputting the captured-image data onto an output medium on the basis of the condition data calculated by the pre-processing condition calculating section and the optimization condition calculating section; and an image data generating section for generating image data for output on the basis of the condition data calculated by the output condition calculating means.

59. The image processing apparatus of claim 58, further comprising a color characteristic compensation section for correcting the gradation characteristic of the captured-image data, through transforming the color characteristic of the captured-image data into the scene-referred color space characteristic, by removing the effect of the color characteristic specific to the image-capturing device from the color characteristic of the captured-image data.

60. The image recording apparatus of claim 59, wherein the color characteristic specific to the image-capturing device is a model color characteristic specific to an image-capturing device model.

61. A computer readable recording medium capable of being read by a computer, which carries out an image processing for subjecting captured-image data outputted from an image-capturing device to an optimization processing for appreciation to produce viewing image referred image data, wherein the recording medium is recorded a program code for actualizing a function to carry out a pre-processing comprising to transform the frequency characteristic of the captured-image data into the scene-referred frequency characteristic by removing the effect of the frequency characteristic specific to the image-capturing device from the frequency characteristic of the captured-image data, before the practice of the aforesaid optimization processing, wherein the frequency characteristic specific to the image-capturing device is a model frequency characteristic specific to an image-capturing device model, wherein the pre-processing further comprises to transform the gradation characteristic of the captured-image data into a scene-referred gradation characteristic by removing the effect of a gradation characteristic specific to the image-capturing device from the gradation characteristic of the captured-image data.

62. The computer readable recording medium of claim 61, wherein the frequency characteristic specific to the image-capturing device is a model frequency characteristic specific to an image-capturing device model.

63. The computer readable recording medium of claim 61, wherein the gradation characteristic specific to the image-capturing device is a model gradation characteristic specific to an image-capturing device model.

64. The computer readable recording medium of claim 61, wherein the frequency characteristic specific to the image-capturing device is a model frequency characteristic specific to an image-capturing device model, and the gradation characteristic specific to the image-capturing device is a model gradation characteristic specific to the image-capturing device model.

65. The computer readable recording medium of claim 61, wherein the pre-processing further comprises a processing to transform the color characteristic of the captured-image data into the scene-referred color space characteristic by removing the effect of the color characteristic specific to the image-capturing device from the color characteristic of the captured-image data.

66. The computer readable recording medium of claim 65, wherein the color characteristic specific to the image-capturing device is a model color characteristic specific to the image-capturing device model.

67. A recording medium capable of being read by a computer, which carries out an image processing for subjecting captured-image data outputted from an image-capturing device to an optimization processing for appreciation to produce viewing image referred image data, wherein the recording medium is recorded a program code for actualizing a function for generating condition data for outputting the captured-image data onto an output medium on the basis of condition data for carrying out a pre-processing before the optimization processing is carried out, the pre-processing comprising to transform the frequency characteristic of the captured-image data into the scene-referred frequency characteristic by removing the effect of frequency characteristic specific to the image-capturing device from the frequency characteristic of the captured-image data, and on the base of condition data for carrying out the optimization processing, wherein the frequency characteristic specific to the image-capturing device is a model frequency characteristic specific to an image-capturing device model, wherein the pre-processing further comprises to transform the gradation characteristic of the captured-image data into a scene-referred gradation characteristic by removing the effect of a gradation characteristic specific to the image-capturing device from the gradation characteristic of the captured-image data.

68. The computer readable recording medium of claim 67, wherein the frequency characteristic specific to the image-capturing device is a model frequency characteristic specific to an image-capturing device model.

69. The computer readable recording medium of claim 67, wherein the gradation characteristic specific to the image-capturing device is a model gradation characteristic specific to an image-capturing device model.

70. The computer readable recording medium of claim 67, wherein the frequency characteristic specific to the image-capturing device is a model frequency characteristic specific to an image-capturing device model, and the gradation characteristic specific to the image-capturing device is a model gradation characteristic specific to the image-capturing device model.

71. The computer readable recording medium claim 67 wherein the pre-processing further comprises a processing to transform the color characteristic of the captured-image data into the scene-referred color space characteristic by removing the effect of the color characteristic specific to the image-capturing device from the color characteristic of the captured-image data.

72. The computer readable recording medium of claim 71, wherein the color characteristic specific to the image-capturing device is a model color characteristic specific to an image-capturing device model.

* * * * *